US010623754B2

(12) United States Patent
Hirabayashi et al.

(10) Patent No.: US 10,623,754 B2
(45) Date of Patent: Apr. 14, 2020

(54) INFORMATION PROCESSING DEVICE AND METHOD

(71) Applicant: SONY CORPORATION, Tokyo (JP)

(72) Inventors: Mitsuhiro Hirabayashi, Tokyo (JP); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/158,609

(22) Filed: Oct. 12, 2018

(65) Prior Publication Data
US 2019/0045200 A1 Feb. 7, 2019

Related U.S. Application Data

(62) Division of application No. 15/321,968, filed as application No. PCT/JP2015/067234 on Jun. 16, 2015, now Pat. No. 10,187,648.

(30) Foreign Application Priority Data

Jun. 30, 2014 (JP) .................................. 2014-135147

(51) Int. Cl.
*H04N 19/46* (2014.01)
*H04N 19/187* (2014.01)
(Continued)

(52) U.S. Cl.
CPC ............. *H04N 19/187* (2014.11); *H04N 5/76* (2013.01); *H04N 5/92* (2013.01); *H04N 19/167* (2014.11);
(Continued)

(58) Field of Classification Search
CPC ........... H04N 19/187; H04N 21/85406; H04N 21/8456; H04N 21/816; H04N 21/26258;
(Continued)

(56) References Cited

U.S. PATENT DOCUMENTS

| | | | | | |
|---|---|---|---|---|---|
| 2,959,351 A | * | 11/1960 | Hamilton | .............. | G06F 11/085 711/4 |
| 5,649,102 A | * | 7/1997 | Yamauchi | ................ | G06F 9/52 709/213 |

(Continued)

FOREIGN PATENT DOCUMENTS

| | | |
|---|---|---|
| CN | 103583050 A | 2/2014 |
| GB | 2492396 A | 1/2013 |

(Continued)

OTHER PUBLICATIONS

Text of ISO/IEC 23009-1:2012 DAM 1 Support for Event Messages and Extended Audio Channel Configuration, International Organisation for Standardisation, 23009-1 Editors, pp. 1-37, Nov. 2012, Shanghai, China.

(Continued)

*Primary Examiner* — Shan E Elahi
(74) *Attorney, Agent, or Firm* — Paratus Law Group, PLLC

(57) ABSTRACT

The present technology relates to an information processing device and a method capable of adaptively providing a partial image of an image in each layer of an image constituted by a plurality of layers. The information processing device of the present technology generates a file that stores information on a whole of a base layer of encoded data produced by layer encoding of image data, information on each of partial areas of an image of the base layer, information on a whole of an enhancement layer of the encoded data, and information on each of partial areas of an image of the enhancement layer such that each of the information is stored in corresponding one of tracks different from each other. The present technology is applicable to an information processing device, an image processing device, (Continued)

an image encoding device, or an image decoding device, for example.

12 Claims, 49 Drawing Sheets

(51) Int. Cl.
    *H04N 5/76*     (2006.01)
    *H04N 5/92*     (2006.01)
    *H04N 19/30*     (2014.01)
    *H04N 21/2343*     (2011.01)
    *H04N 21/262*     (2011.01)
    *H04N 21/81*     (2011.01)
    *H04N 21/845*     (2011.01)
    *H04N 21/854*     (2011.01)
    *H04N 19/167*     (2014.01)
    *H04N 19/423*     (2014.01)

(52) U.S. Cl.
    CPC ........... *H04N 19/30* (2014.11); *H04N 19/423* (2014.11); *H04N 19/46* (2014.11); *H04N 21/234327* (2013.01); *H04N 21/26258* (2013.01); *H04N 21/816* (2013.01); *H04N 21/8456* (2013.01); *H04N 21/85406* (2013.01)

(58) Field of Classification Search
    CPC ......... H04N 21/234327; H04N 19/167; H04N 19/46; H04N 19/423; H04N 5/92; H04N 5/76; H04N 19/30
    USPC .................................................. 375/240.08
    See application file for complete search history.

(56) References Cited

U.S. PATENT DOCUMENTS

| | | | | |
|---|---|---|---|---|
| 7,139,594 | B2* | 11/2006 | Nagatomo | H04L 51/38 455/566 |
| 8,676,855 | B2* | 3/2014 | Ushiyama | G06F 21/64 707/797 |
| 9,948,963 | B2* | 4/2018 | Hwang | H04N 21/234327 |
| 2004/0204145 | A1* | 10/2004 | Nagatomo | H04L 51/38 455/566 |
| 2005/0018911 | A1* | 1/2005 | Deever | H04N 19/597 382/232 |
| 2005/0249283 | A1 | 11/2005 | Kajiwara et al. | |
| 2006/0072838 | A1 | 4/2006 | Chui et al. | |
| 2008/0018746 | A1* | 1/2008 | Kawanami | H04N 1/2112 348/207.99 |
| 2009/0252232 | A1 | 10/2009 | Kishi et al. | |
| 2010/0020886 | A1 | 1/2010 | Raveendran et al. | |
| 2010/0158401 | A1* | 6/2010 | Shiraishi | G06K 9/00228 382/243 |
| 2010/0281063 | A1* | 11/2010 | Ushiyama | G06F 21/64 707/797 |
| 2013/0077694 | A1* | 3/2013 | Terada | H04N 19/70 375/240.18 |
| 2013/0308707 | A1* | 11/2013 | Raveendran | H04N 5/144 375/240.24 |
| 2014/0082054 | A1 | 3/2014 | Denoual et al. | |
| 2014/0229657 | A1* | 8/2014 | Karamov | G06F 12/0246 711/103 |
| 2015/0195532 | A1 | 7/2015 | Nakagami | |
| 2015/0208074 | A1 | 7/2015 | Takahashi et al. | |
| 2016/0014413 | A1 | 1/2016 | Sato | |

FOREIGN PATENT DOCUMENTS

| | | |
|---|---|---|
| JP | 2004-274758 A | 9/2004 |
| JP | 2005-130470 A | 5/2005 |
| JP | 2007-097147 A | 4/2007 |
| JP | 2017-515336 A | 6/2017 |
| WO | WO 2012/168365 A1 | 12/2012 |
| WO | WO 2014/057131 A1 | 4/2014 |
| WO | WO 2015/144735 A1 | 10/2015 |

OTHER PUBLICATIONS

Makar et al., Real-Time Video Streaming With Interactive Region-of-Interest, Proceedings of 2010 IEEE 17th International Conference on Image Proceeding, pp. 4437-4440, Sep. 26-29, 2010, Hong Kong.

Mavlankar et al., An Interactive Region-Of-Interest Video Streaming System for Online Lecture Viewing, Proceedings of 2010 IEEE 18th International Packet Video Workshop, pp. 64-71, Dec. 13-14, 2014, Hong Kong.

Jan. 17, 2018, Partial European Search Report issued for related EP application No. 15814032.7.

Feuvre et al., Support for efficient tile access in the HEVC File Format, International Organization for Standardization ISO/IEC JTC1/SC29/WG11 Coding of Moving Pictures and Audio, Apr. 2013, Incheon, South Korea.

Apr. 17, 2018, European Search Report issued for related EP Application No. 15814032.7.

Kim et al., Context-aware Prefetching Scheme for Interactive Multimedia Services based on HTTP Adaptive Streaming, 2016 2$^{nd}$ IEEE International Conference on Computer and Communications, 2016, pp. 2123-2128, IEEE.

Schierl et al., Transport and Storage Systems for 3-D Video Using MPEG-2 Systems, RTP, and ISO File Format, Proceedings of the IEEE, Dec. 23, 2010, pp. 671-683, vol. 99 No. 4, Apr. 2011, IEEE.

Feb. 19, 2019, Chinese Office Action issued for related CN Application No. 201580034347.0.

May 16, 2019, Japanese Office Action issued for related JP Application No. 2016-531241.

Jun. 12, 2019, European Search Report issued for related EP Application No. 19167354.0.

\* cited by examiner

INFORMATION PROCESSING DEVICE AND METHOD

CROSS REFERENCE TO PRIOR APPLICATION

This application is a divisional of U.S. patent application Ser. No. 15/321,968 (filed on Dec. 23, 2016), which is a National Stage Patent Application of PCT International Patent Application No. PCT/JP2015/067234 (filed on Jun. 16, 2015) under 35 U.S.C. § 371, which claims priority to Japanese Patent Application No. 2014-135147 (filed on Jun. 30, 2014), which are all hereby incorporated by reference in their entirety.

TECHNICAL FIELD

The present technology relates to an information processing device and a method, and more particularly to an information processing device and a method capable of adaptively providing a partial image of an image in each layer of an image constituted by a plurality of layers.

BACKGROUND ART

As a content distribution technology utilizing hypertext transfer protocol (HTTP), moving picture experts group—dynamic adaptive streaming over HTTP (MPEG-DASH) has been standardized in recent years (for example, see Non-patent Document 1). This MPEG-DASH adopts an adaptive bitrate streaming (ABS) technology which stores a plurality of encoded data in a content server as data representing identical content by different bitrates, and allows a client to select one of the plurality of encoded data in accordance with a network band and reproduce the selected data.

Incidentally, it has been considered to adaptively select a partial image corresponding to a part of an entire image and distribute the selected partial image, rather than distribute the entire image. For example, it has been considered to distribute a partial image selected from an entire image by an image data receiving terminal, and control a size of a partial image to be distributed in accordance with performance of a terminal (such as processing capability of CPU and size of display), a transmission channel, a server loading state, and other conditions.

In addition, it has been considered to adopt layer encoding to efficiently encode an image constituted by a plurality of layers by using prediction between layers or the like, for example.

CITATION LIST

Non-Patent Document

[Non-Patent Document 1] MPEG-DASH (Dynamic Adaptive Streaming over HTTP)(URL:http://mpeg.chiariglione.org/standards/mpeg-dash/media-presentation-description-and-segment-formats/text-isoiec-23009-12012-dam-1)

SUMMARY OF THE INVENTION

Problems to be Solved by the Invention

However, conventional MPEG-DASH standards only have a concept of switching nitrates, and therefore is difficult to achieve adaptive provision of partial image data, i.e., adaptive provision by selecting an arbitrary partial image in an arbitrary layer of an image constituted by a plurality of layers, and providing data on the selected partial image while utilizing tile structures of the respective layers.

The present technology has been proposed in consideration of the aforementioned circumstances. An object of the present technology is to realize adaptive provision of a partial image of an image in each layer of an image constituted by a plurality of layers.

Solutions To Problems

An aspect of the present technology is directed to an information processing device comprising a file generation unit that generates a file that stores information on a whole of a base layer of encoded data produced by layer encoding of image data, information on each of partial areas of an image of the base layer, information on a whole of an enhancement layer of the encoded data, and information on each of partial areas of an image of the enhancement layer such that each of the information is stored in corresponding one of tracks different from each other.

The file generation unit may store, in the track storing the information on the whole of the base layer, encoding information indicating an encoding system of the base layer. The file generation unit may store, in each of the tracks storing the information on the partial areas of the base layer, encoding information indicating that the corresponding track stores only the information on the corresponding partial area of the base layer. The file generation unit may store, in the track storing the information on the whole of the enhancement layer, encoding information indicating an encoding system of the enhancement layer. The file generation unit may store, in each of the tracks storing the information on the partial areas of the enhancement layer, encoding information indicating that the corresponding track stores only the information on the corresponding partial area of the enhancement layer.

The file generation unit may store, in the track storing the information on the whole of the base layer, information indicating reference to the tracks storing the information on the partial areas of the base layer, and information indicating a type of the reference. The file generation unit may store, in each of the tracks storing the information on the partial areas of the base layer, information indicating reference to the track storing the information on the whole of the base layer, and information indicating a type of the reference. The file generation unit may store, in the track storing the information on the whole of the enhancement layer, information indicating reference to the track storing the information on the whole of the base layer and information indicating a type of the reference, and information indicating reference to the tracks storing the information on the partial areas of the enhancement layer and information indicating a type of the reference. The file generation unit may store, in each of the tracks storing information on the partial areas of the enhancement layer, information indicating reference to the track storing the information on the whole of the enhancement layer, and information indicating a type of the reference.

The file generation unit may further store, in each of the tracks storing the information on the partial areas of the enhancement layer, information indicating reference to the track storing the information on the partial area of the base layer in correspondence with the corresponding partial area of the enhancement layer, and information indicating a type of the reference.

The file generation unit may store, in each of the tracks storing the information on the whole of the layers, a sample of reference information for the encoded data on the partial areas of the corresponding layer. The file generation unit may store, in each of the tracks storing the information on the partial areas of the layers, a sample of the encoded data on the corresponding partial area.

The file generation unit may store, in each of the tracks storing the information on the partial areas of the layers, position information indicating a position of the corresponding partial area.

The file generation unit may generate the file for each of the tracks.

The file generation unit may generate the file for each of the layers.

The file generation unit may generate a file storing all of the tracks.

An aspect of the present technology is directed to an information processing method generating a file that stores information on a whole of a base layer of encoded data produced by layer encoding of image data, information on each of partial areas of an image of the base layer, information on a whole of an enhancement layer of the encoded data, and information on each of partial areas of an image of the enhancement layer such that each of the information is stored in corresponding one of tracks different from each other.

A different aspect of the present technology is directed to an information processing device comprising a metadata generation unit that generates metadata that contains information on a whole of a base layer of encoded data produced by layer encoding of image data, information on each of partial areas of an image of the base layer, information on a whole of an enhancement layer of the encoded data, and information on each of partial areas of an image of the enhancement layer.

The information storing information on the whole of the base layer may contain encoding information indicating an encoding system of the base layer. The information on each of the partial areas of the base layer may contain encoding information indicating that only the information on the corresponding partial area of the base layer is contained. The information on the whole of the enhancement layer may contain encoding information indicating an encoding system of the enhancement layer. The information on each of the partial areas of the enhancement layer may contain encoding information indicating that only the information on the corresponding partial area of the enhancement layer is contained.

The information on the whole of the base layer may contain information indicating reference to the information on the partial areas of the base layer, and information indicating a type of the reference. The information on each of the partial areas of the base layer may contain information indicating reference to the information on the whole of the base layer, and information indicating a type of the reference. The information on the whole of the enhancement layer may contain information indicating reference to the information on the whole of the base layer and information indicating a type of the reference, and information indicating reference to the information on the partial areas of the enhancement layer and information indicating a type of the reference. The information on each of the partial areas of the enhancement layers may contain information indicating reference to the information on the whole of the enhancement layer, and information indicating a type of the reference.

The information on each of the partial areas of the enhancement area may further contain information indicating reference to the information on the partial area of the base layer in correspondence with the corresponding partial area of the enhancement layer, and information indicating a type of the reference.

Each of the information on the partial areas of the base layer, and the information on the partial areas of the enhancement layer may contain position information indicating a position of the corresponding partial area.

The metadata generation unit may set, in the information on the whole of the base layer, a file that stores a sample of reference information for the encoded data of the partial areas of the base layer. The metadata generation unit may set, in the information on each of the partial areas of the base layer, a file that stores a sample of the encoded data of the corresponding partial area of the base layer. The metadata generation unit may set, in the information on the whole of the enhancement layer, a file that stores a sample of reference information for the encoded data of the partial areas of the enhancement layer. The metadata generation unit may set, in the information on each of the partial areas of the enhancement layer, a file that stores a sample of the encoded data of the corresponding partial area of the enhancement layer.

The metadata generation unit may set a file that stores the encoded data of the base layer in an order higher than the information on the whole of the base layer and the information on the partial areas of the base layer. The metadata generation unit may set a file that stores the encoded data of the enhancement layer in an order higher than the information on the whole of the enhancement layer and the information on the partial areas of the enhancement layer.

The metadata generation unit may set a file that stores the encoded data of ail of the layers in an order higher than the information on the whole of the base layer, the information on the partial areas of the base layer, the information on the whole of the enhancement layer, and the information on the partial areas of the enhancement layer.

The metadata generation unit may set the information on the whole of the base layer, the information on the partial areas of an image of the base layer, the information on the whole of the enhancement layer, and the information on the partial areas of an image of the enhancement layer such that each of the information is set in corresponding one of adaptation sets different from each other, or in corresponding one of sub representations different from each other.

A different aspect of the present technology is directed to an information processing method generating metadata that contains information on a whole of a base layer of encoded data produced by layer encoding of image data, information on each of partial areas of an image of the base layer, information on a whole of an enhancement layer of the encoded data, and information on each of partial areas of an image of the enhancement layer.

According to the aspect of the present technology, generated is a file that stores information on a whole of a base layer of encoded data produced by layer encoding of image data, information on each of partial areas of an image of the base layer, information on a whole of an enhancement layer of the encoded data, and information on each of partial areas of an image of the enhancement layer such that each of the information is stored in corresponding one of tracks different from each other.

According to the different aspect of the present technology, generated is metadata that contains information on a whole of a base layer of encoded data produced by layer encoding of image data, information on each of partial areas of an image of the base layer, information on a whole of an enhancement layer of the encoded data, and information on each of partial areas of an image of the enhancement layer.

Effects of the Invention

According to the present technology, image processing is achievable. In addition, according to the present technology, adaptive provision of a partial image of an image in each layer of an image constituted by a plurality of layers is achievable.

MODE FOR CARRYING OUT THE INVENTION

Modes for carrying out the present disclosure (hereinafter referred to as embodiments) are described hereinbelow. Note that the respective embodiments are described in the following order.
1. First Embodiment (filing per tile)
2. Second Embodiment (reference between layers per tile)
3. Third Embodiment (filing per layer)
4. Fourth Embodiment (filing all layers)
5. Fifth Embodiment (distribution system)
6. Sixth Embodiment (computer)
<1. First Embodiment>
<DASH>

As a content distribution technology utilizing hypertext transfer protocol (HTTP), there has been known moving picture experts group—dynamic adaptive streaming over HTTP (MPEG-DASH) as described in Non-patent Document 1, for example. This MPEG-DASH adopts an adaptive bitrate streaming (ABS) technology which stores a plurality of encoded data in a content server as data representing identical content by different nitrates, and allows a client to select one of the plurality of encoded data in accordance with a network band and reproduce the selected data.

Figure 1:
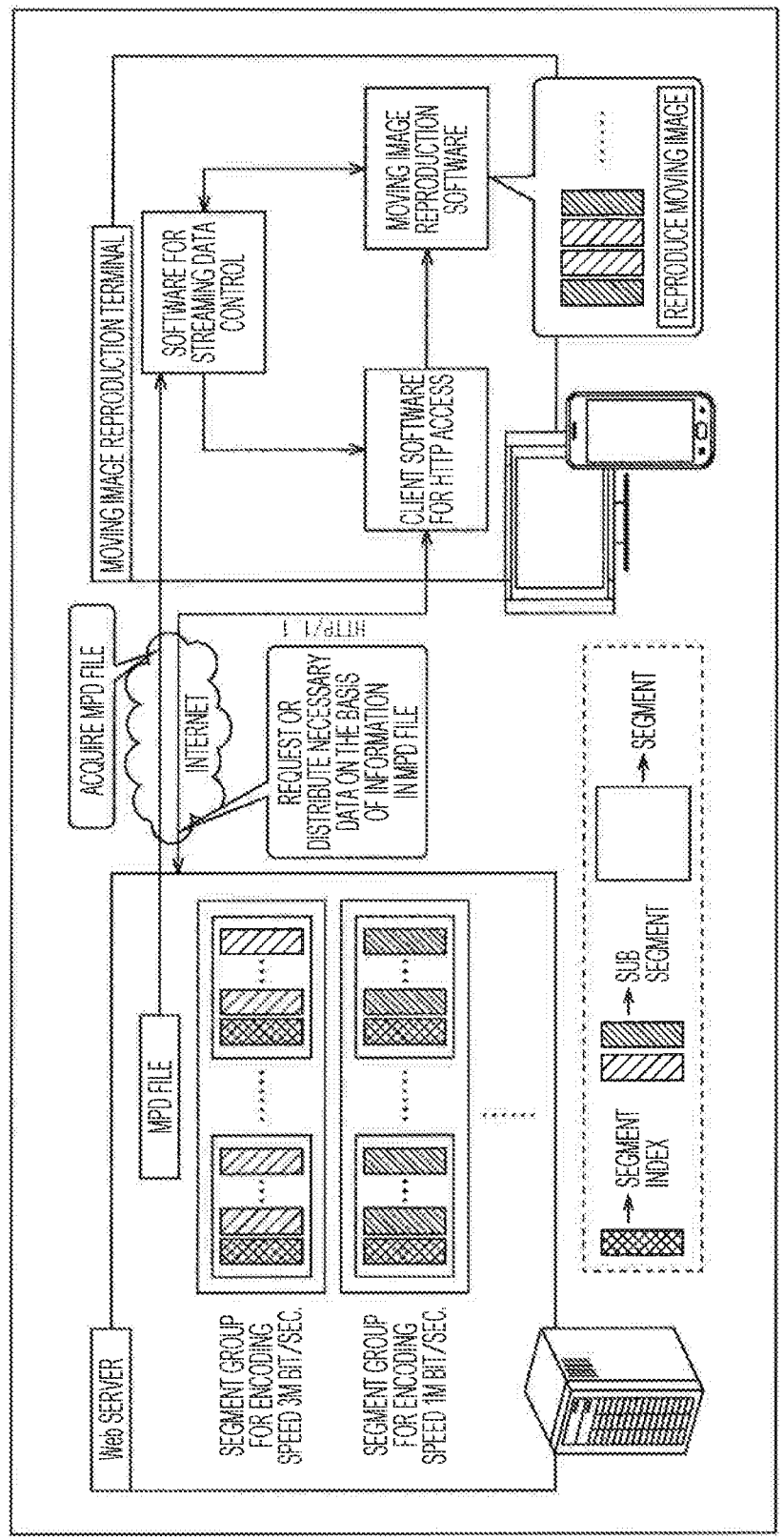
FIG. 1 is a view illustrating an outline of MPEG-DASH.

Content transfer procedures according to DASH are hereinafter described with reference to FIG. 1. Initially, software for streaming data control included in a content receiving side moving image reproduction terminal selects a media presentation description (MPD) file of desired content, and acquires the selected file from a web server. MPD is metadata which manages distributed content such as moving images and voices.

The software for streaming data control of the moving image reproduction terminal having received the MPD analyzes the MPD, and performs control to acquire data (DASH segments) satisfying quality of a communication line, performance of the moving image reproduction terminal, and other conditions of the desired content from the web server. Client software for HTTP access acquires the DASH segments from the web server under this control by using HTTP. Moving image reproduction software reproduces the content thus acquired.

Figure 2:
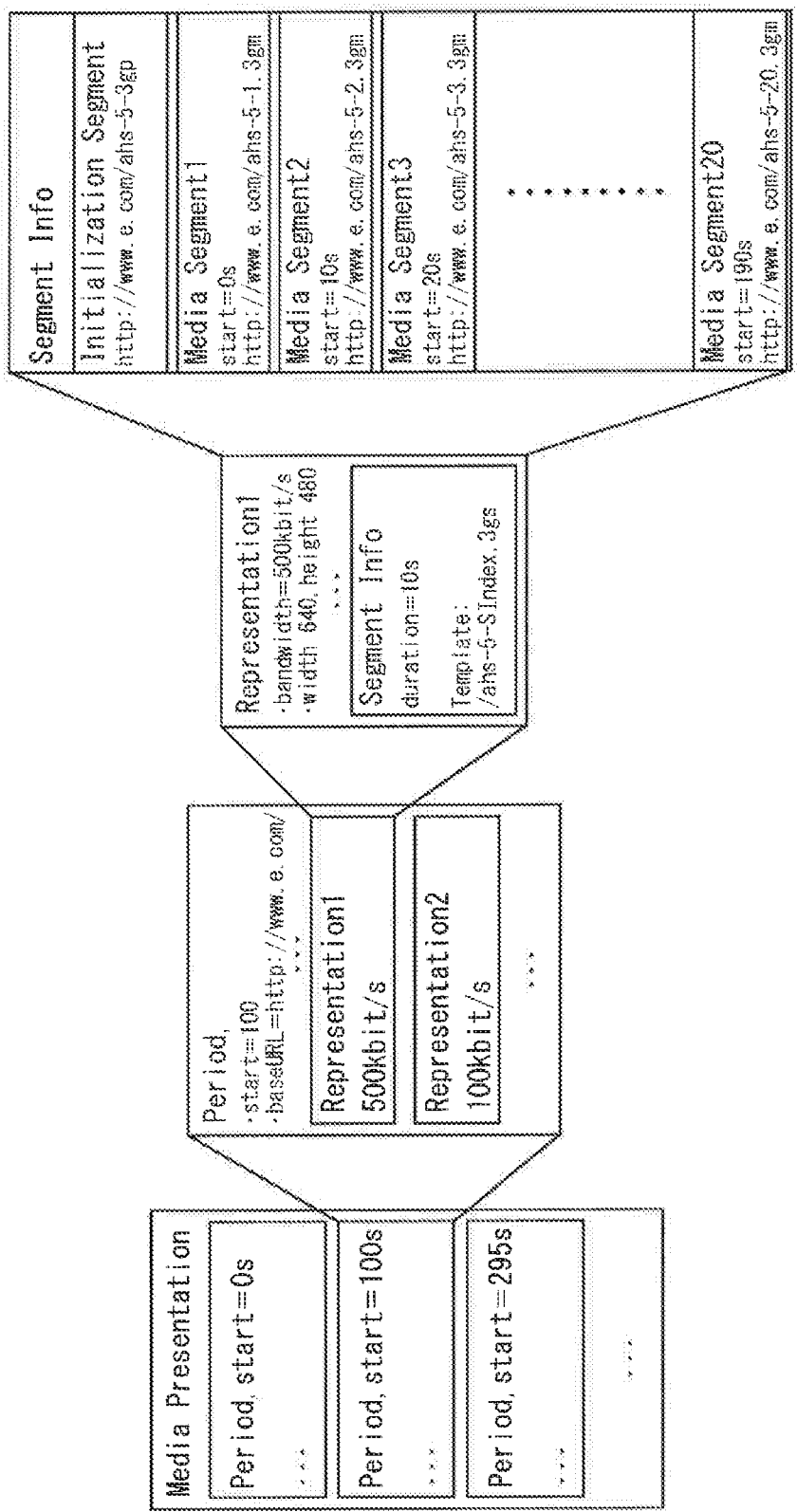
FIG. 2 is a view illustrating a configuration example of MPD.

MPD has a configuration illustrated in FIG. 2, for example. For analysis (parse) of MPD, a client selects an optimum from attributes of representations (Representations) contained in periods (Periods) of the MPD (Media Presentation in FIG. 2).

The client reads an initial segment (Segment) of the selected representation (Representation) to acquire an initialization segment (Initialization Segment), and processes the acquired initialization segment (Initialization Segment). Thereafter, the client acquires a subsequent segment (Segment), and reproduces the subsequent segment (Segment).

Figure 3:
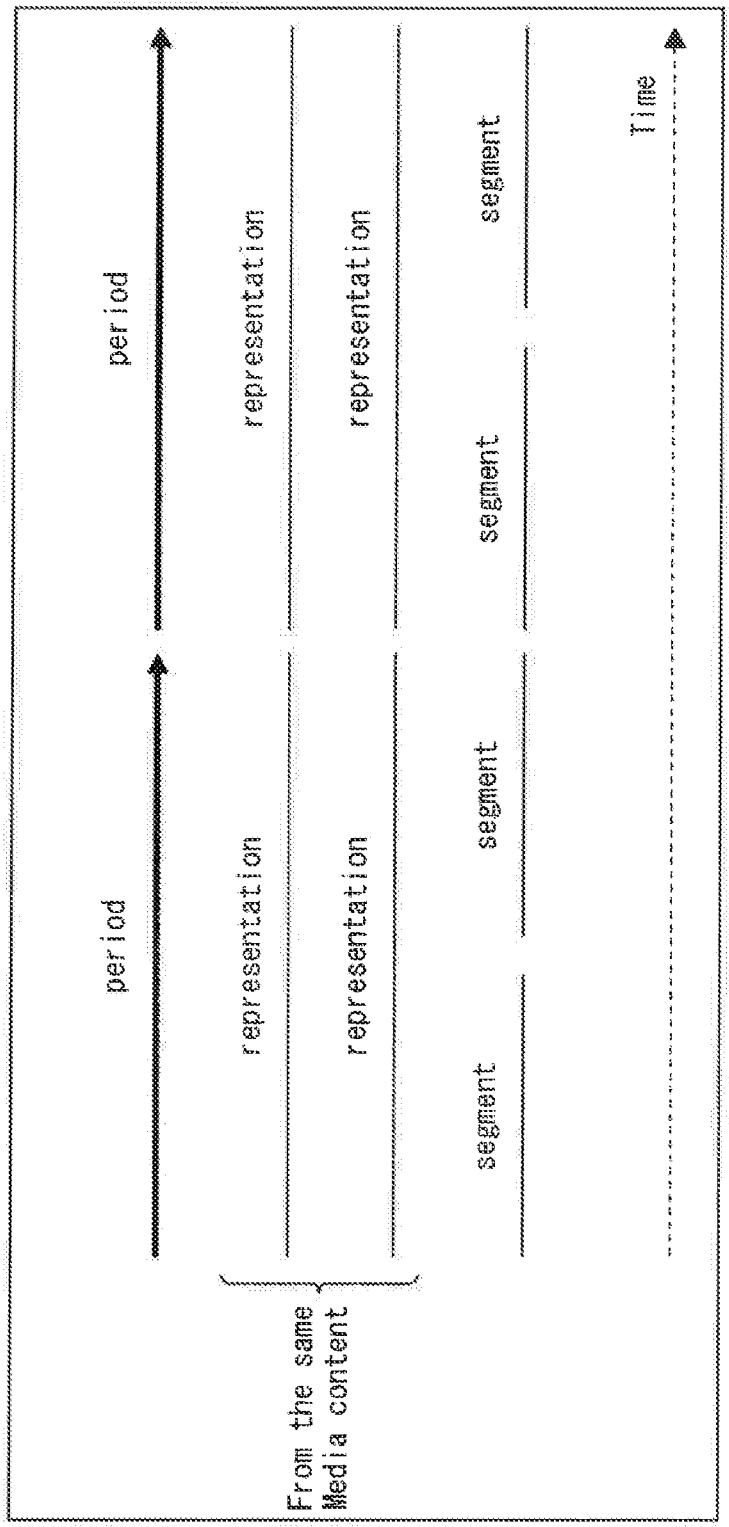
FIG. 3 is a view illustrating time segmentation of content.

Note that a relationship between a period (Period), a representation (Representation), and a segment (Segment) is expressed as illustrated in FIG. 3. More specifically, one media content is managed for each period (Period) corresponding a unit of data in a time direction, while each period (Period) is managed for each segment (Segment) corresponding to a unit of data in a time direction. In addition, each period (Period) may be constituted by a plurality of representations (Representations) having different attributes such as bitrates.

Figure 4:
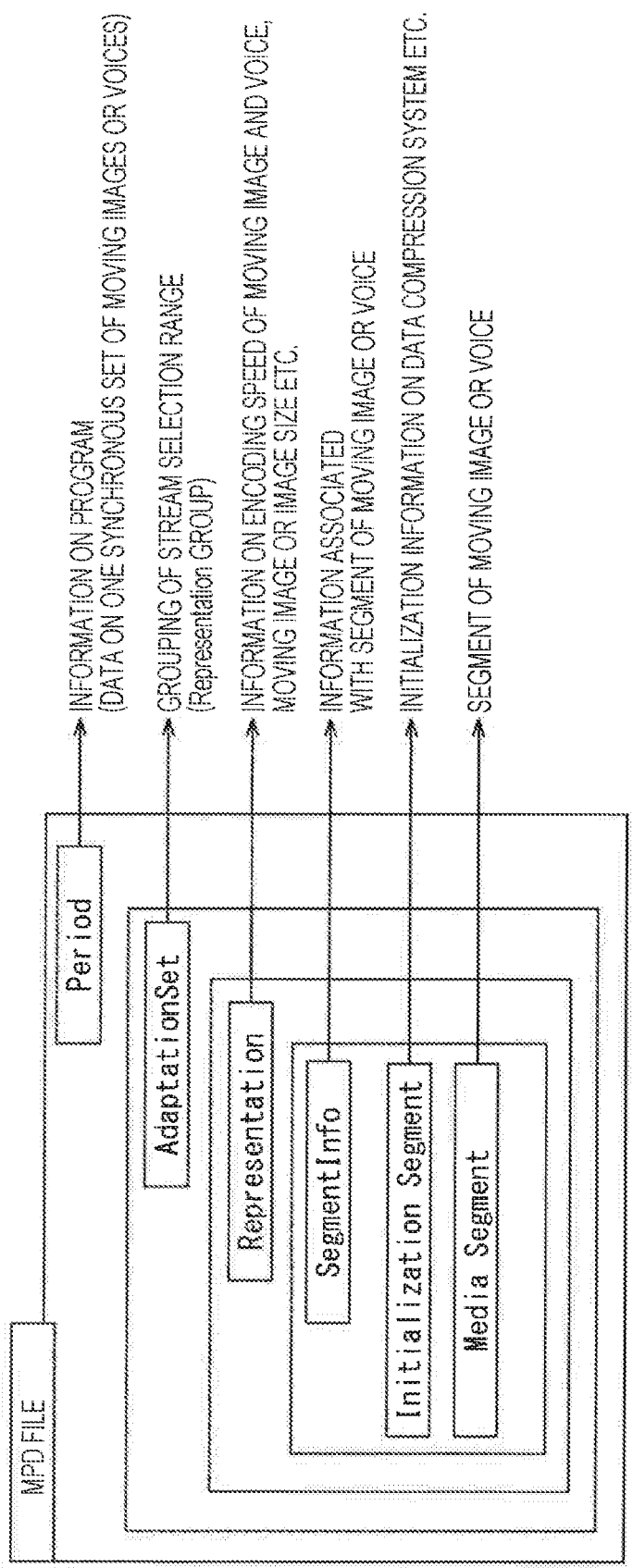
FIG. 4 is a view illustrating an example of a layer structure in an order of Period and lower in MPD.
Figure 5:
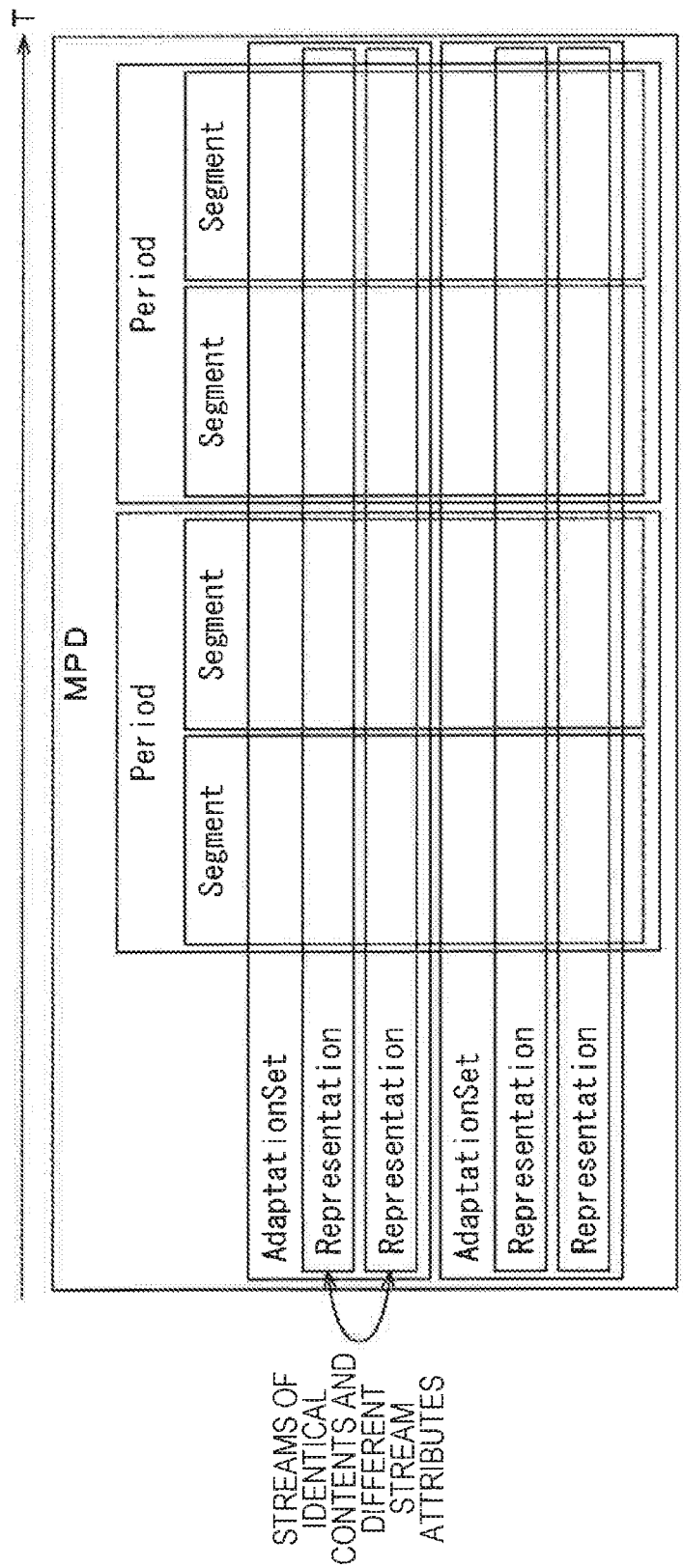
FIG. 5 is a view illustrating a configuration example of a MPD file on a time axis.

Accordingly, a file of the MPD (also referred to as MPD file) has a layer structure illustrated in FIG. 4 in an order of period (Period) and lower. FIG. 5 further illustrates an example of the structure of the MPD arranged on a time axis. As apparent from the example illustrated in FIG. 5, a plurality of representations (Representations) are present for an identical segment (Segment). The client adaptively selects any one of the representations to acquire appropriate stream data in accordance with a communication environment, self-capacity of decoding and other conditions, and reproduces the acquired stream data.

<Tile Structure>

Conventional DASH as described above adaptively controls distribution of data contained in an entire image. However, it has been considered to adaptively select and distribute a partial image corresponding to a part of an entire image, rather than distribute the entire image. For example, it has been considered to distribute a partial image selected from an entire image by an image data receiving terminal, and control a size of a partial image to be distributed in accordance with performance of a terminal (such as processing capability of CPU and size of display), a transmission channel, a server loading state, and other conditions.

For realizing adaptive distribution of a partial image as described above, a concept of a tile has been adopted. A tile is a partial area corresponding to a division of an entire image divided in a predetermined layout (such as size, shape, and number). An image of a tile is hereinafter referred to as a tile image. When an entire image is divided into tiles beforehand as described above, adaptive distribution of a partial image is easily realizable only by selecting a tile image to be distributed. In this case, a partial image is constituted by a single or a plurality of tile images.

For distribution by utilizing HTTP as in the case of DASH, image data is encoded, whereafter bit streams of the encoded data are filed and distributed (published as files). In case of an entire image having a tile structure as described above, image data is encoded independently for each the image. In this case, encoded data for each tile may be constituted by one bit stream as in an example illustrated in A of FIG. 6.

Figure 6:
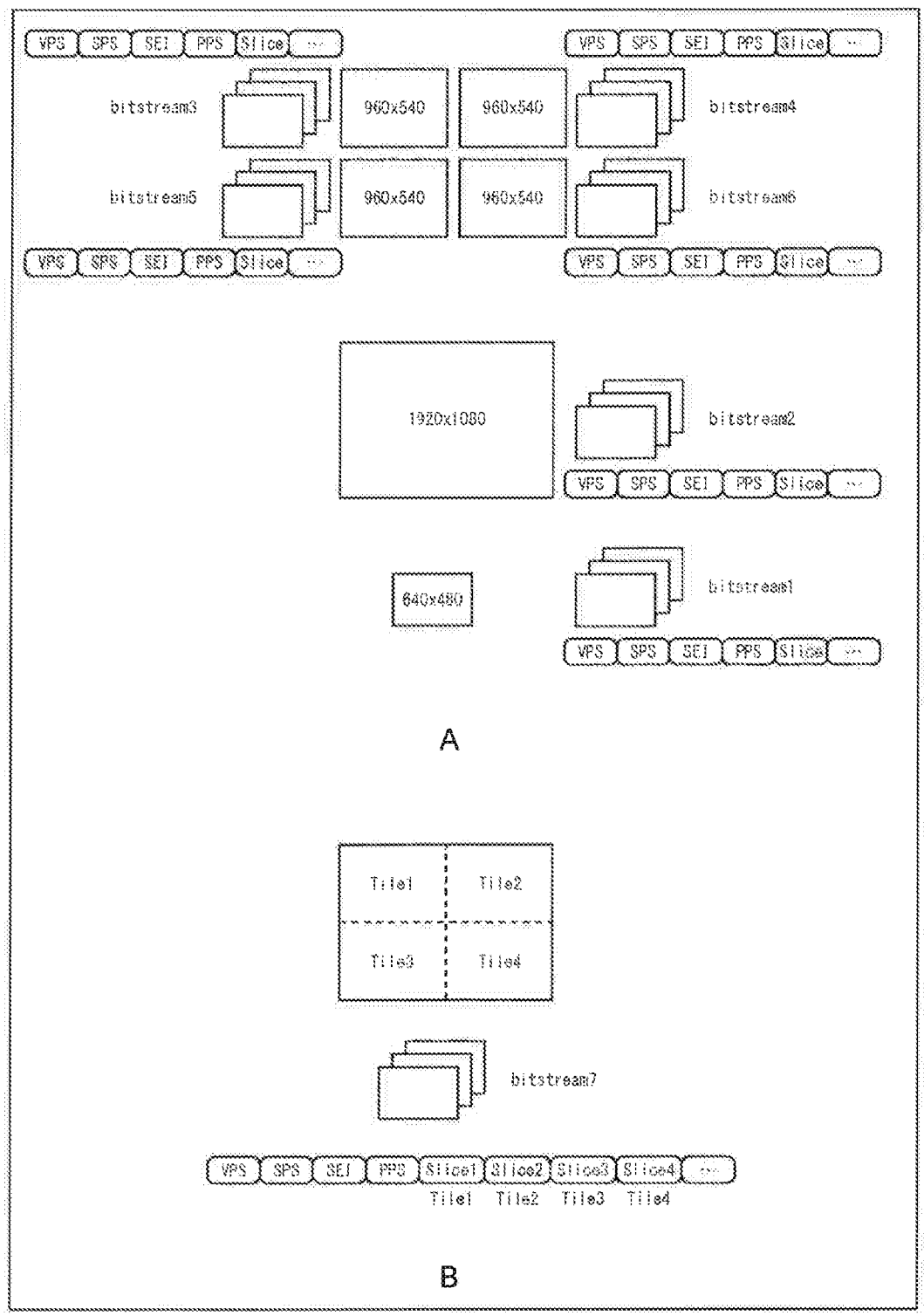
FIG. 6 is a view illustrating examples of bit streams of tile images.

According to the example in A of FIG. 6, a 640×480 size entire image, a 1980×1080 size entire image, and 960×540 size tile images corresponding to two divisions of the latter entire image in a vertical direction and two divisions of the latter entire image in a horizontal direction (four partial images) are prepared as distribution images. Data in the 640×480 size entire image is encoded into one bit stream (bitstream1), while data in the 1980×1080 size entire image is also encoded into one bit stream (bitstream2). Apart from these data, data in each of the 960×540 size tile images is encoded independently from each other into one bit stream (bitstream3 through bitstream6).

Header information such as video parameter set (PPS), sequence parameter set (SIDS), supplemental enhancement information (SEI), and picture parameter set (PPS) is added to each of the bit streams. The respective bit streams of the image data are arranged for each slice (Slice).

This structure allows selection of a tile image to be distributed based on selection of a bit stream to be distributed from bitstream3 through bitstream6. Moreover, the structure of the example in A of FIG. 6 allows distribution of each tile image in a manner similar to distribution of an entire image.

Incidentally, an encoding system such as high efficiency video coding (HEVC) supports a structure called tiles dividing an entire image, and performs encoding independently for each tile. For example, decoding may be performed in a manner acquiring only an image of a tile corresponding to a part of the entire image. In other words, decoding may be performed in a manner acquiring only a partial image corresponding to a part of the entire image.

By utilizing a function of this encoding system, encoded data corresponding to a plurality of tile images may be collected into one bit stream (bitstream7) as illustrated in an example in B of FIG. 6. More specifically, a tile to be distributed as described above is encoded while handled as a tile supported by the encoding system. In this case, data corresponding to respective tiles are arranged as slices (Slices) in the bit stream.

<MP4 File>

Figure 7:
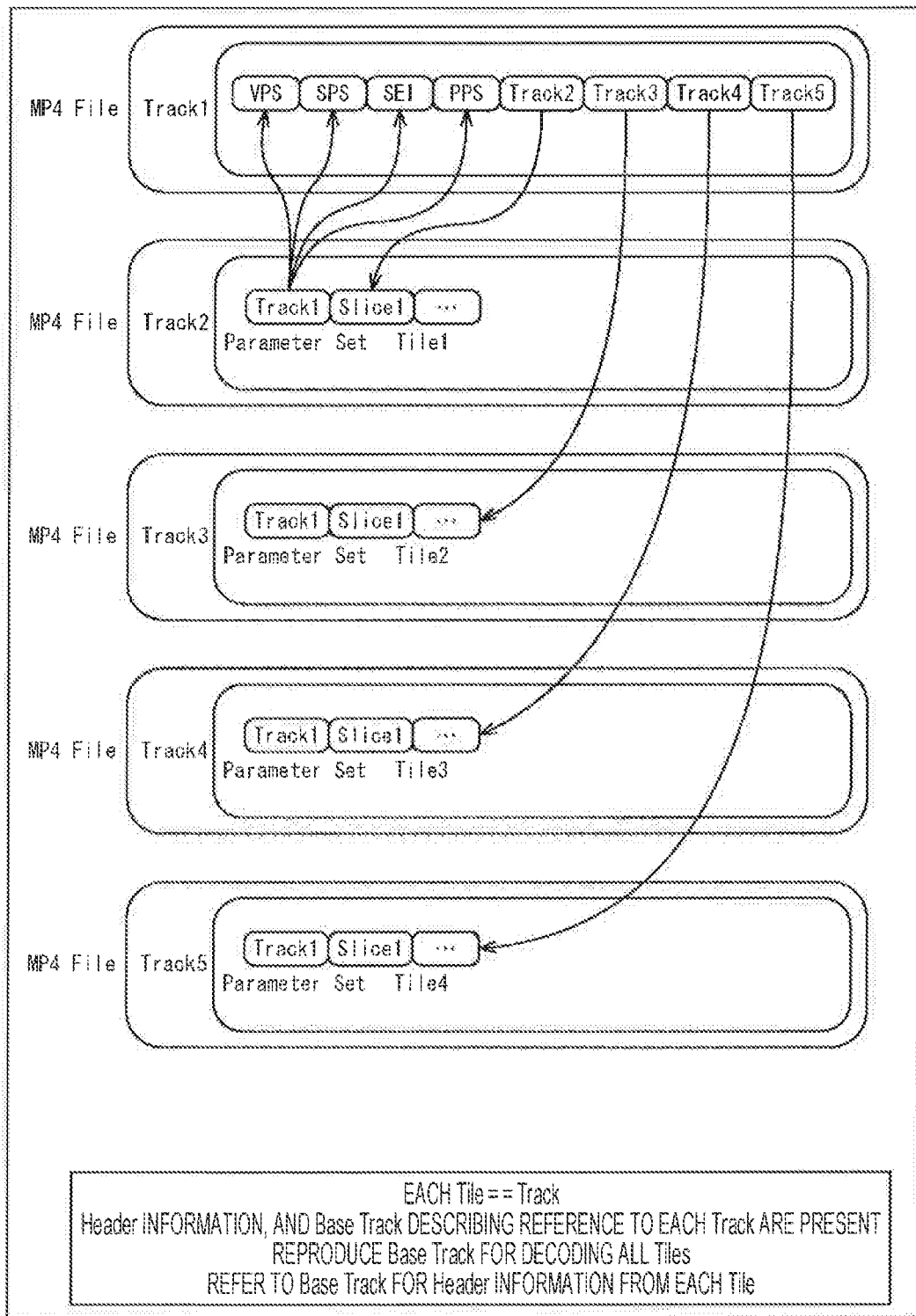
FIG. 7 is a view illustrating an example of MP4 files of tile images.

As described above, a bit stream to be distributed is filed in an MP4 file format or the like, for example. In this case, bit streams of respective tiles may be filed in different files for each as in an example illustrated in FIG. 7. A bit stream of each tile is managed in units of track. In addition, header (Header) information on each tile, and a base track (Base track) describing reference to each track are provided, and filed in a fie different from the bit streams of the respective tiles. For decoding all tiles, the base track is reproduced. For decoding tiles for each, the base track is referred to for header information.

Figure 8:
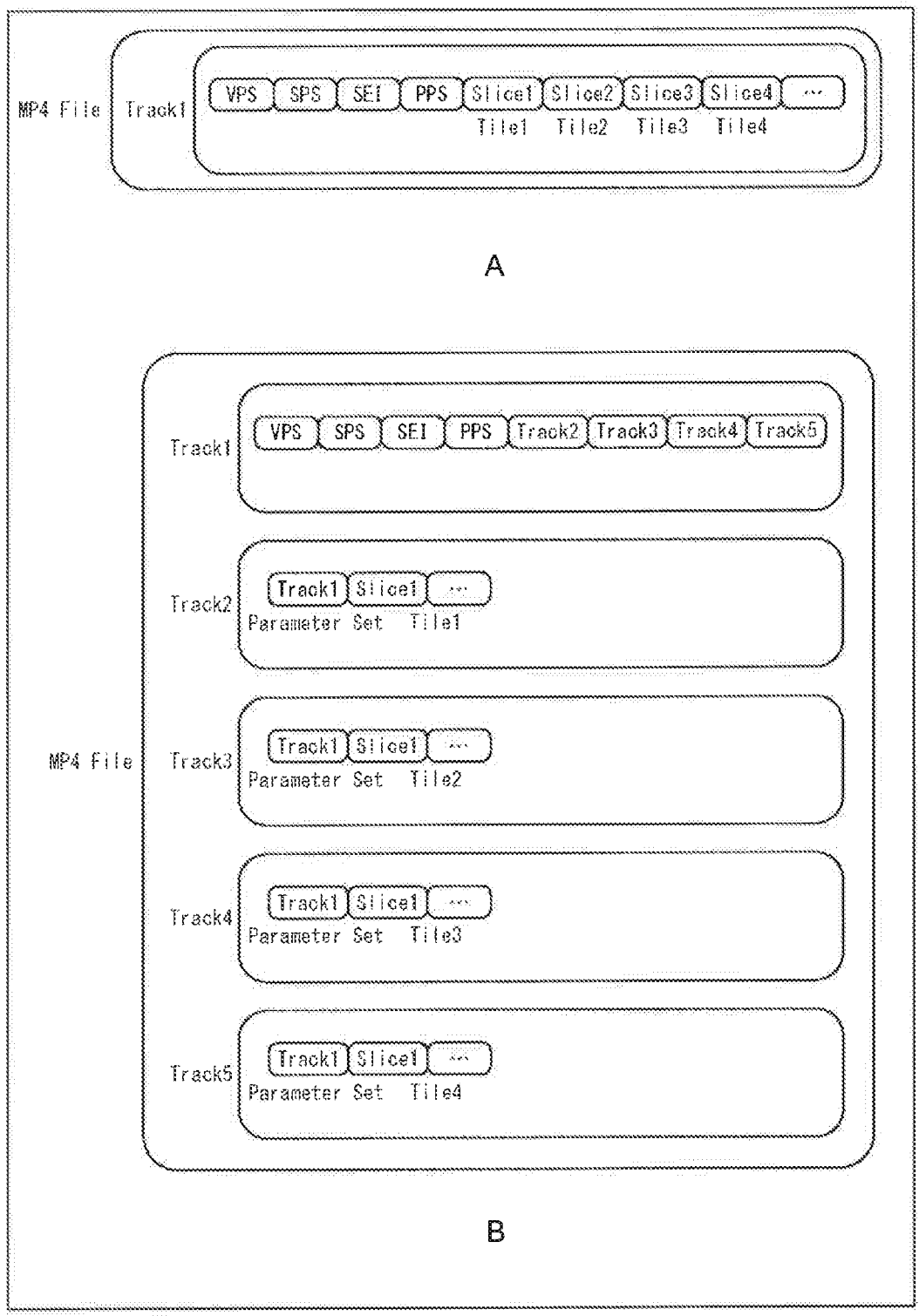
FIG. 8 is a view illustrating a different example of MP4 files of tile images.

As in an example illustrated in FIG. 8, bit streams of respective tiles may be collected into one file. In this case, respective data corresponding to the respective tiles may be collected and managed as one track as illustrated in A of FIG. 8, or may be managed as different tracks for each as illustrated in B of FIG. 8. In this case, header (Header) information for each tile, and a base track (Base Track) describing reference to each track are provided similarly to the case illustrated in FIG. 7.

<MP4 File Formal>

Figure 9:
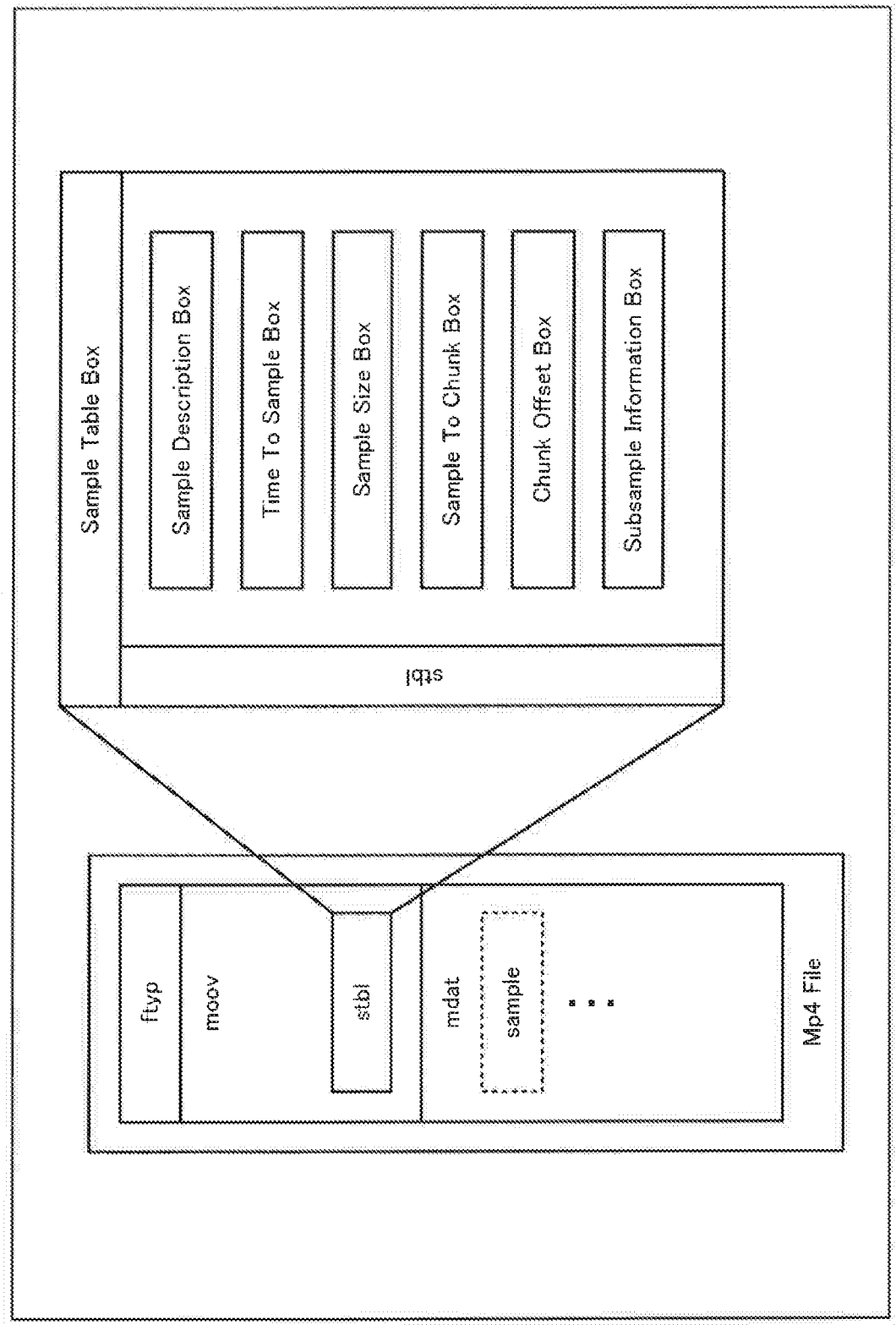
FIG. 9 is a view illustrating a configuration example of an MP4 file format.

An outline of an MP4 file format is hereinafter described. As illustrated in FIG. 9, an MP4 file in conformity to MPEG-DASH contains ftyp, mcov, and mdat.

As illustrated in FIG. 9, data on each sample (picture) of HEVC is stored in mdat as AV data.

In addition, management information is stored in a sample table box (Sample Table Box (stbl)) for each sample (such as picture).

As illustrated in FIG. 9, the sample table box (Sample Table Box) contains a sample description box (Sample Description Box), a time to sample box (Time To Sample Box), a sample size box (Sample Size Box), a sample to chunk box (Sample To Chunk Box), a chunk offset box (Chunk Offset Box), and a subsample information box (Subsample Information Box).

The sample description box stores information on codec, image size and the like. For example, information such as encoding parameters is stored in an HEVC sample entry within the sample description box.

The time to sample box stores information on time of a sample. The sample size box stores information on a size of a sample. The sample to chunk box stores information on a position of data in a sample. The chunk offset box stores information on offset of data. The subsample information box stores information on a subsample.

<Division Method>

Figure 10:
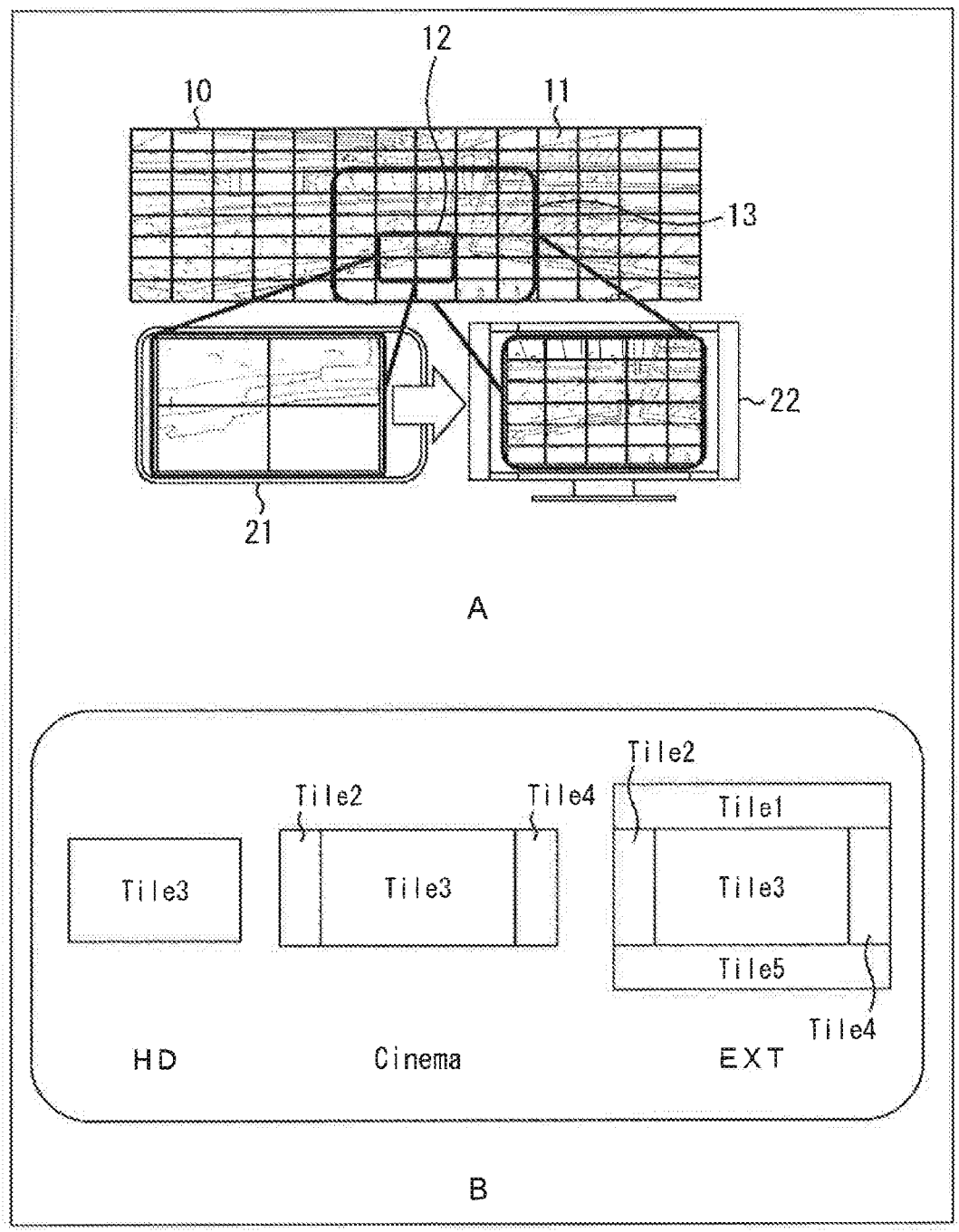
FIG. 10 is a view illustrating an example of a division size.

Tiles may be equal divisions of an entire image as illustrated in an example in A of FIG. 10, or may be unequal divisions of an entire image as illustrated in an example in B of FIG. 10. In other words, image sizes of respective tile images constituting an entire image may be either a uniform size, or different sizes.

<Application>

Examples of an application having this tile structure may include an application which controls a size of a partial image to be displayed.

It is assumed that an entire image 10 illustrated in A of FIG. 10 is tiled and divided into a plurality of tile images 11 having an identical size. For displaying this image on a mobile device 21 having a small display size, for example, an application displays partial images 12 constituted by four (2×2) tile images. On the other hand, for displaying this image on a television signal receiver (TV) 22 having a large display size, for example, an application displays partial images 13 constituted by thirty (6×5) tile images. It is therefore considered to use such an application which controls an image size of a partial image to be displayed in accordance with performance or the like of a terminal which displays images.

In case of an example illustrated in B of FIG. 10, image sizes of respective tile images are not equalized, An application displays an image of a tile 3 (Tile3) to display an image haying HD resolution, displays images of a tile 2 (Tile2) through a tile 4 (Tile4) to display images having cinema resolution, and displays :images of a tile 1 (Tile1) through a tile 5 (Tile5) to display larger images in an extended size (EXT). It is therefore considered to use such an application which controls resolution or an aspect ratio of a display image by controlling an image size of a partial image to be displayed.

This adaptive control over a size of a partial image to be distributed (control over the number of tile images to be distributed) in accordance with an image size of a partial image to be displayed eliminates the necessity of distribution of a not-displayed unnecessary part of the image to these applications. This control therefore adaptively controls loads on a server, a terminal, a transmission path and the like, and reduces a rise of unnecessary loads.

<Adaptive Provision of Tile Image>

For adaptively providing data on a partial image, i.e., selecting an arbitrary partial image and providing data on the selected partial image by utilizing tile structure of images, for example, partial image information corresponding to information on a partial image constituting a part of an entire image is inserted into MPD, for example.

A partial image to be provided may be an arbitrary image as long as a part of an entire image constitutes the partial image. A shape, a size and the like of the partial image may be arbitrarily determined. For example, a partial image may be an arbitrary part as long as the part is encodable independently from other parts. It is assumed hereinafter that a partial image is an image in units of tile as described above for convenience of explanation. More specifically, it is assumed that a partial image is constituted by one or a plurality of tile images.

Figure 11:
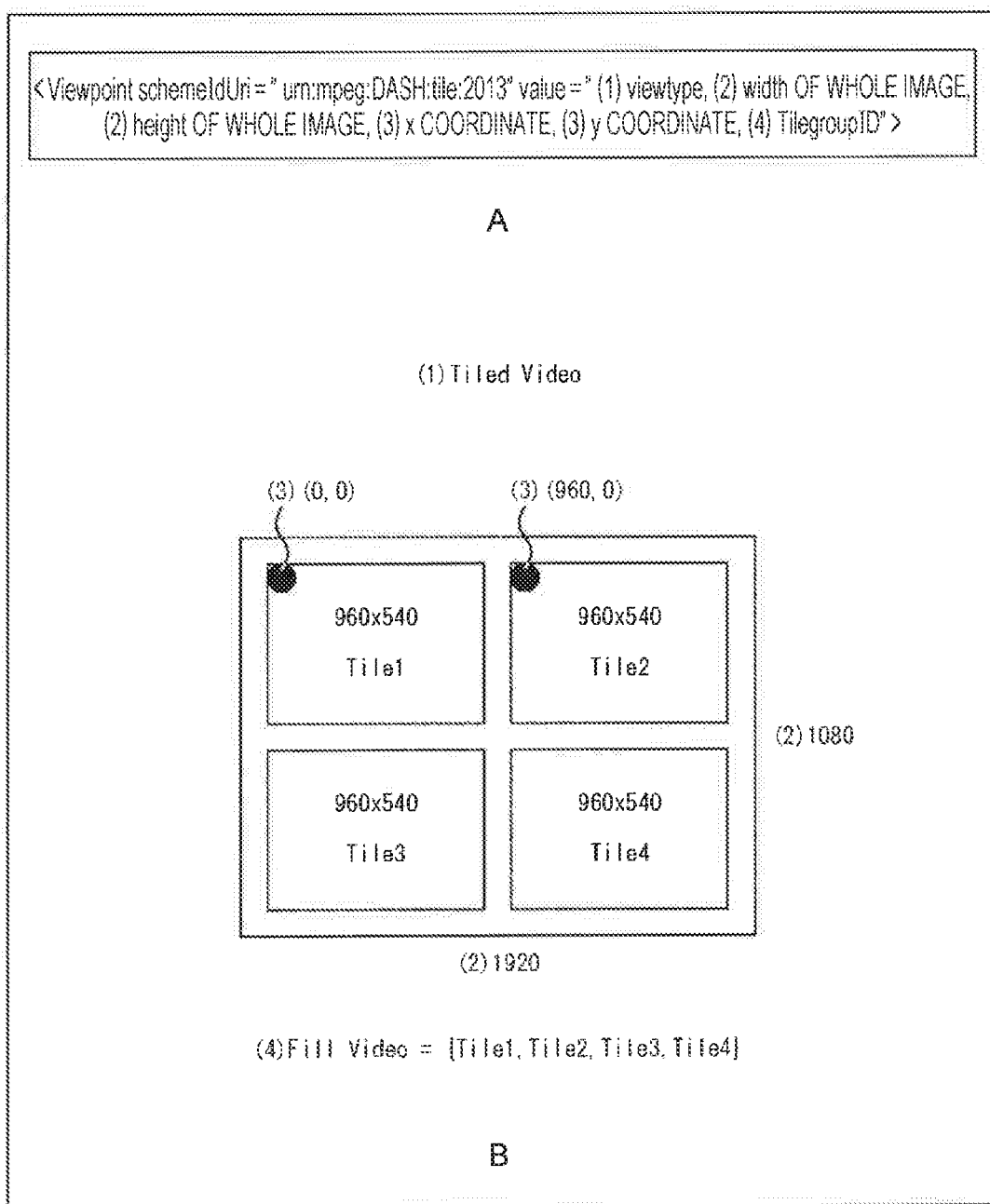
FIG. 11 is a view illustrating an example of extended data.

For example, description for a tile is defined as illustrated in A of FIG. 11 while utilizing a descriptor type element (DescriptorType element) in MPD. In addition, a view type (viewtype) indicating a type of an image shown by a corresponding element is defined as illustrated in B of FIG. 11, for example.

<Adaptive Provision of Tile Images in Plural Layers>

Incidentally, examples of an image encoding and decoding system include a layer encoding and layer decoding system which efficiently encodes an image constituted by a plurality of layers by using prediction between layers or other methods.

In this layer encoding and layer decoding system for image distribution or other purposes, adaptive provision of a partial image in each of a plurality of layers is needed. According to conventional MPEG-DASH standards, however, adaptive provision of partial image data in a plurality of layers is difficult.

For overcoming this problem, there is generated a file which stores information on a whole of a base layer of encoded data generated by layer encoding of image data, information on respective partial areas of an image of the base layer, information on a whole of an enhancement layer of encoded data, and information on respective partial areas of an image of the enhancement layer such that each of the information is stored in corresponding one of tracks different from each other.

It is also allowed to store, in the track storing the information on the whole of the base layer, encoding information indicating an encoding system of the baser layer, to store, in each of the tracks storing the information on the partial areas of the base layer, encoding information indicating that the corresponding track stores only the information on the corresponding partial area of the base layer; to store, in the track storing the information on the whole of the enhancement layer, encoding information indicating an encoding system of the enhancement layer, and to store, in each of the tracks storing the information on the partial areas of the enhancement layer, encoding information indicating that the corresponding track stores only information on the corresponding partial area of the enhancement layer.

It is further allowed to store, in the track storing the information on the whole of the base layer, information indicating reference to the respective tracks storing the information on the partial areas of the base layer, and information indicating a type of the reference, to store, in each of the tracks storing the information on the partial areas of the base layer, information indicating reference to the track storing the information on the whole of the base layer, and information indicating a type of the reference, to store, in the track storing information on the whole of the enhancement layer, information indicating reference to the track storing the information on the whole of the base layer and information indicating a type of the reference, and information indicating reference to the tracks storing the information on the partial areas of the enhancement layer and information indicating a type of the reference, and to store, in each of the tracks storing the information on the partial areas of the enhancement layer, information indicating reference to the track storing the information on the whole of the enhancement layer, and information indicating a type of the reference.

This configuration allows adaptive provision of a partial image of an image in each layer of an image constituted by a plurality of layers.

In addition, there is generated metadata which contains information on a whole of a base layer of encoded data generated by layer encoding of image data, information on each of partial areas of an image of the base layer, information on a whole of an enhancement layer of the encoded data, and information on each of partial areas of an image of the enhancement layer.

Note as follows: the information storing information on the whole of the base layer may contain encoding information indicating an encoding system of the base layer; the information on each of partial areas of the base layer may contain encoding information indicating that only information on the corresponding partial area of the base layer is contained; the information storing the whole of the enhancement layer may contain encoding information indicating an encoding system of the enhancement layer; and the information on each of partial areas of the enhancement layer may contain encoding information indicating that only information on the corresponding partial area of the enhancement layer is contained.

In addition, the information on the whole of the base layer may contain information indicating reference to the information on the partial areas of the base layer and information indicating a type of the reference. The info ration on each of the partial areas of the base layer may contain information indicating reference to the information on the whole of the base layer and information on a type of the reference. The information on the whole of the enhancement layer may contain information indicating reference to the information on the whole of the base layer and information indicating a type of the reference, and information indicating reference to the information on the partial areas of the enhancement layer and information indicating a type of the reference. The information on the partial areas of the enhancement layer may contain information indicating reference to the information on the whole of the enhancement layer and information on a type of the reference.

This configuration allows adaptive provision of a partial image of an image in each layer of an image constituted by a plurality of layers.

<Use Case>

Described herein is an example of the present technology which performs layer encoding of double-layered image data constituted by a base layer and an enhancement layer by utilizing prediction between layers, and distributes the encoded image data. Needless to say, the number of layers of image data may be arbitrarily determined, such as three layers or more. In addition, it is assumed that an image of a base layer has a high correlation with an image of an enhancement layer (both images are basically, identical images except for predetermined image parameters such as resolution), and has resolution lower than resolution of the image of the enhancement layer.

It is further assumed that an image of each layer is divided into four tiles (partial areas) in total (two in vertical direction and two in horizontal direction) for convenience of explanation. Needless to say, the number of divided tiles in an image of each layer may be arbitrarily determined.

Figure 12:
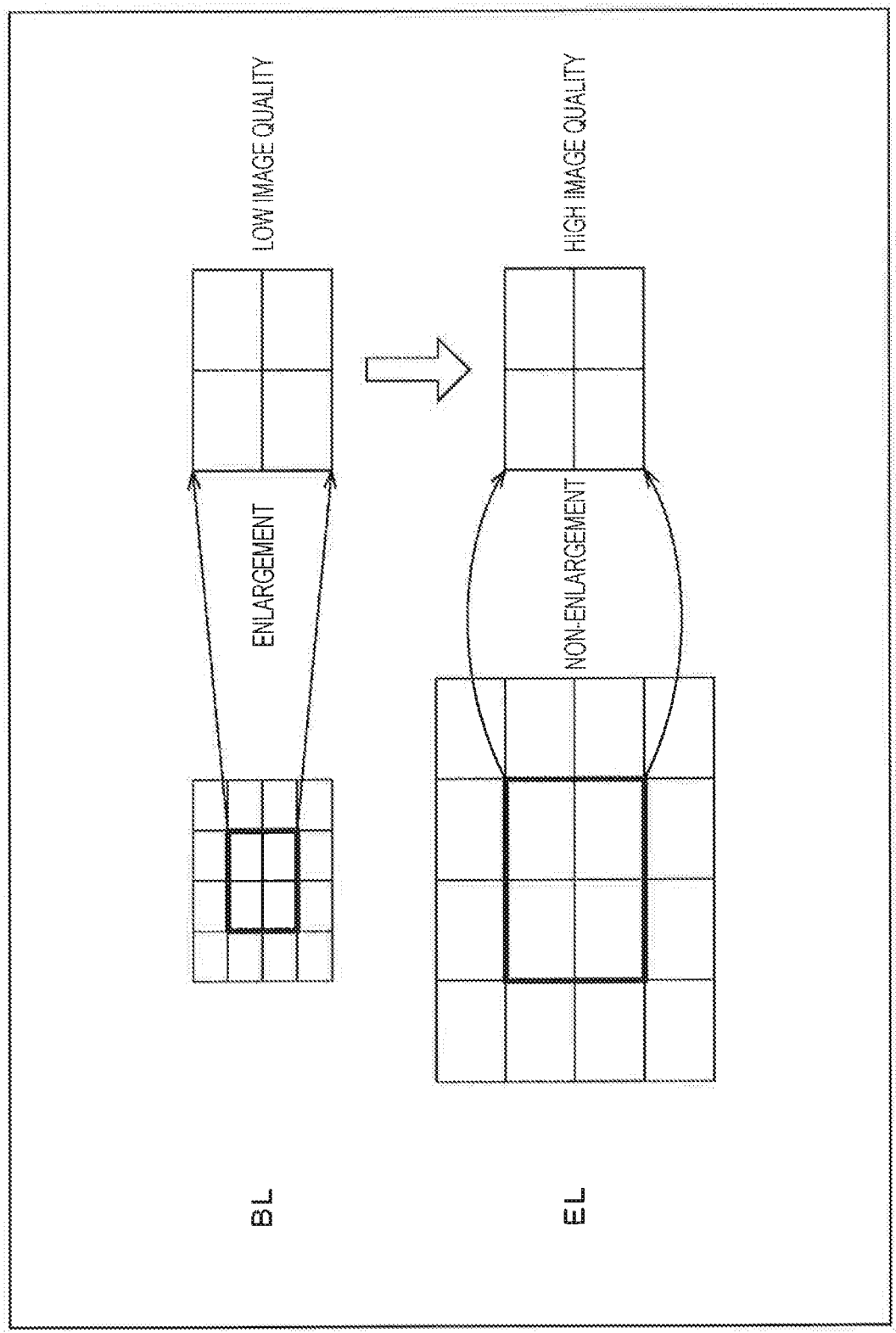
FIG. 12 is a view illustrating an example of layer switching.

An example of use of this layer encoding is initially described. For enlarged display of an image of a base layer (BL) having low resolution (low image quality) as in an example illustrated in FIG. 12, for example, partial tiles are extracted and enlarged to an original image size. In this case, an enlargement rate of display of partial tiles extracted from an image of an enhancement layer (EL) having high resolution (high image quality) may become lower than the foregoing enlargement rate of the base layer. According to the example illustrated in FIG. 12, the necessity of enlargement is eliminated when the images of the enhancement layer are used. Accordingly, while contents of images to be displayed are substantially equivalent in both the layers, image quality of the enhancement layer becomes higher in display.

In this situation, deterioration of image quality decreases (image quality of provided images improves) when images to be distributed are switched from the base layer to the enhancement layer.

According to conventional MPEG-DASH, prepared streams to be distributed are switchable between low-resolution streams and high-resolution streams in accordance with situations.

According to this data distribution, however, data is generally distributed sufficiently earlier than display timing such that data for several seconds to several tens of seconds, for example, is retained in a buffer on a receiving side for stabilization of image reproduction even in streaming distribution, for example.

Accordingly, when a stream to be distributed in an image at a time T1 is switched (switched from stream 1 to stream 2) in a manner described above as illustrated in A of FIG. 13, for example, all data in the stream 1 accumulated in the buffer from the time T1 to a time T2 is discarded. Thereafter, distribution of data in the stream 2 starts from the time T2.

Switching in an opposite direction (from stream 2 to stream 1) is similarly performed. When a stream to be 30 distributed in an image at a time T3 is switched from the stream 2 to the stream 1, for example, all of data in the stream 2 accumulated in the buffer from the time T3 to a time T4 is discarded. Thereafter, distribution of data in the stream 1 starts from the time T3.

Accordingly, data in the buffer is discarded and wasted every time a stream to be distributed is switched. Moreover, data remaining in the buffer becomes zero, in which condition of reproduction may become unstable.

Figure 13:
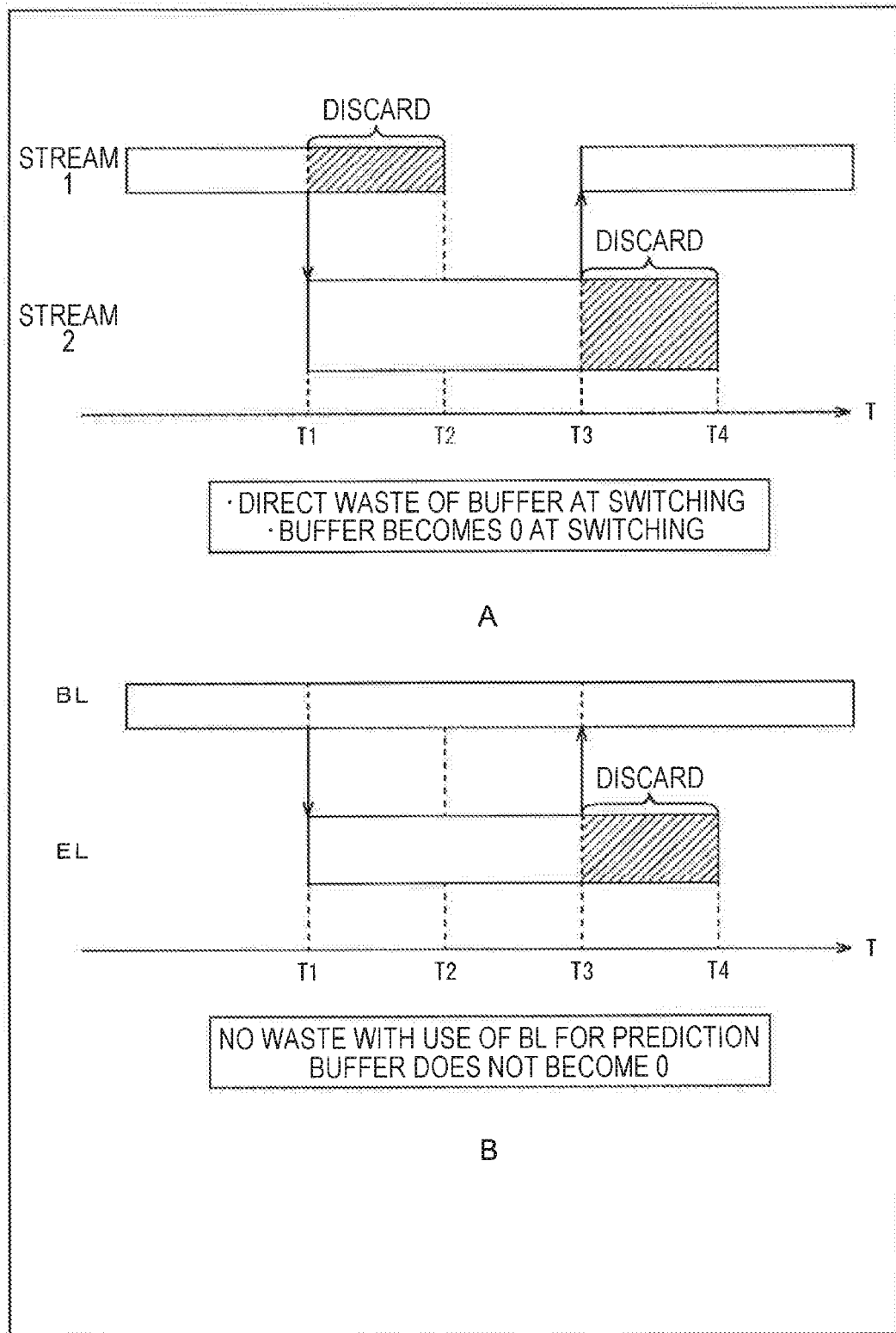
FIG. 13 is a view illustrating an example of layer switching.

According to layer-encoded data, however, a stream of a base layer constantly distributed as illustrated in B of FIG. 13. A stream of an enhancement layer is distributed only when an image of the enhancement layer is displayed.

Accordingly, the necessity of discarding data in the buffer is eliminated at the time of switching of an image for display from a base layer to an enhancement layer. In other words, encoded data of the base layer accumulated in the buffer is continuously used after switching. Moreover, prediction between layers has been performed for a start of distribution of a stream of an enhancement layer. In this case, a data volume of the stream of the enhancement layer becomes smaller than a data volume of the stream 2 in A of FIG. 13. In this case, data in the buffer does not become zero. Accordingly, image display is more stabilized than in the case of A of FIG. 13 even after the time T1 of switching.

This is also applicable to switching in an opposite direction (from enhancement layer to base layer). When an image to be displayed is switched from an enhancement layer to a base layer at the time T3, for example, all of data on the enhancement layer accumulated in the buffer from the time T3 to the time T4 is discarded. However, a volume of data to be discarded is smaller than a volume of discarded data in the stream 2 in A of FIG. 13. In addition, data in the base layer has been distributed before the time T3, wherefore data in the buffer does not become zero. Accordingly, image display is more stabilized than in the case of A of FIG. 13 even after the time T3 of switching.

The following effects are offered, for example, by realizing adaptive provision of a partial image of an image in each layer of an image constituted by a plurality of layers. The functions of the following effects are realized in a distribution format, such as an MP4 file and MPD, according to the present technology.

<File Generation Device>

Figure 14:
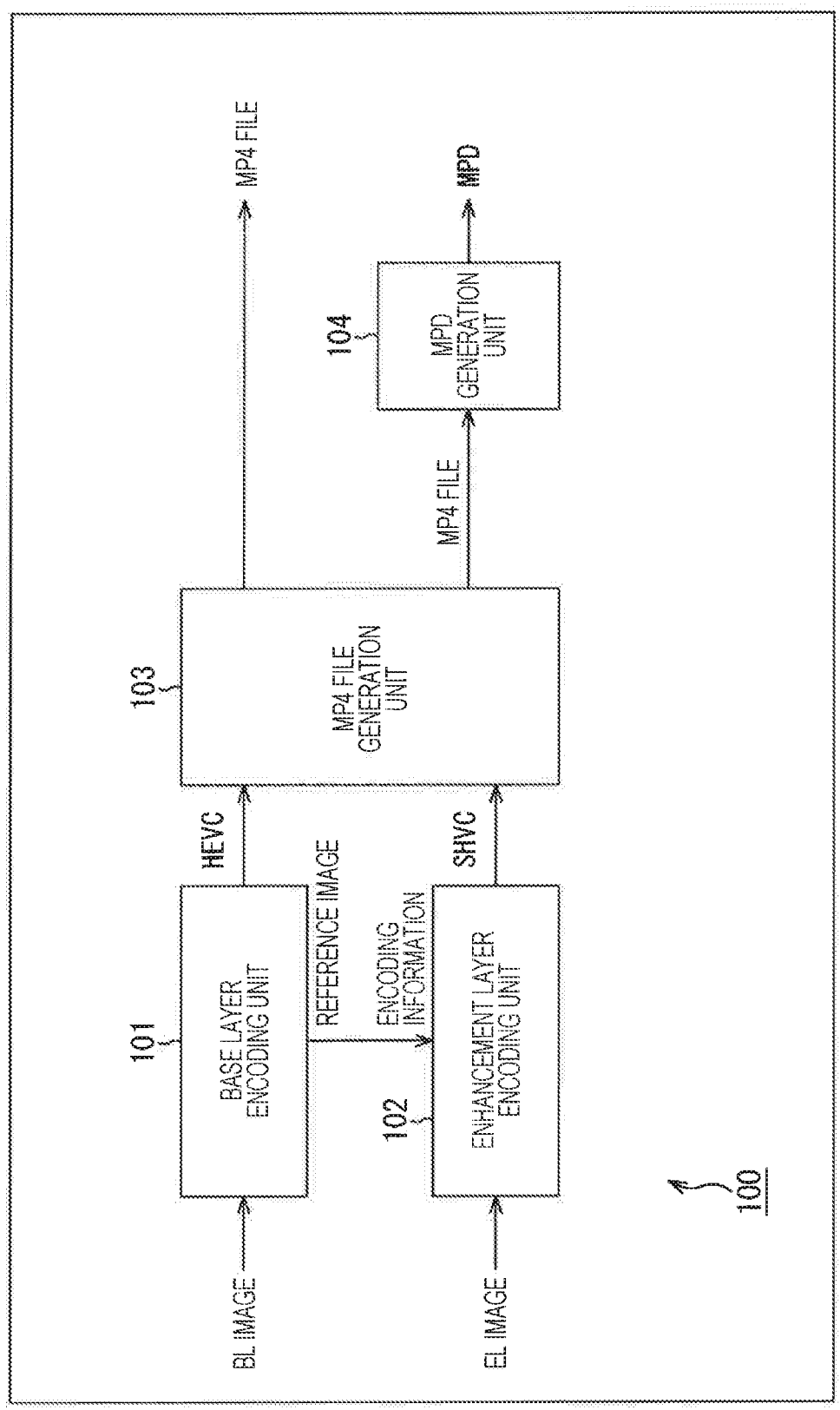
FIG. 14 is a block diagram illustrating a general configuration example of a file generation device.

A device which generates MP4 files and MPD described above is hereinafter described. FIG. 14 is a block diagram illustrating a general configuration example of a file generation device corresponding to an information processing device according to an embodiment to which the present technology has been applied. A file generation device 100 in FIG. 14 is a device which generates MP4 files for storing encoded data in respective layers obtained by layer encoding of an image of a base layer (base layer (BL) image) and an image of a enhancement layer (enhancement layer (EL) image), and generates MPD for controlling distribution of MP4 files thus generated.

As illustrated in FIG. 3, the file generation device 100 includes a base layer encoding unit 101, an enhancement layer encoding unit 102, an MP4 file generation unit 103, and an MPD generation unit 104.

The base layer encoding unit 101 encodes an input base layer image (BL image) by a predetermined encoding system (such as HEVC) to generate base layer encoded data. The base layer encoding unit 101 supplies generated base layer encoded data (HEVC) to the MP4 file generation unit 103. The base layer encoding unit 101 further supplies a base layer image such as decoded image) to the enhancement layer encoding unit 102 as a reference image. The base layer encoding unit 101 further supplies encoding information to the enhancement layer encoding unit 102 as information about encoding.

The enhancement layer encoding unit 102 encodes an input enhancement layer image (EL image) by a predetermined encoding system (such as SHVC) to generate enhancement layer encoded data. In this case, the enhancement layer encoding unit 102 performs prediction between layers on the basis of a reference image and encoding information supplied from the base layer encoding unit 101. This prediction reduces a drop of encoding efficient. The enhancement layer encoding unit 102 supplies generated enhancement layer encoded data (SHVC) to the MP4 file generation unit 103.

The MP4 file generation unit 103 generates a file (MP4 file) which stores base layer encoded data (HEVC) supplied from the base layer encoding unit 101, and enhancement layer encoded data (SHVC) supplied from the enhancement layer encoding unit 102. The MP4 file generation unit 103 stores the base layer encoded data (HEVC) and the enhancement layer encoded data (SHVC) in different tracks of MP4 files. The MP4 file generation unit 103 outputs generated MP4 files. The MP4 file generation unit 103 further supplies generated MP4 files to the MPD generation unit 104.

The MPD generation unit 104 generates MPD which controls distribution of MP4 files supplied from the MP4 file generation unit 103. The MPD generation unit 104 outputs the generated MP4 files.

<Configuration Example of MP4 File>

Figure 15:
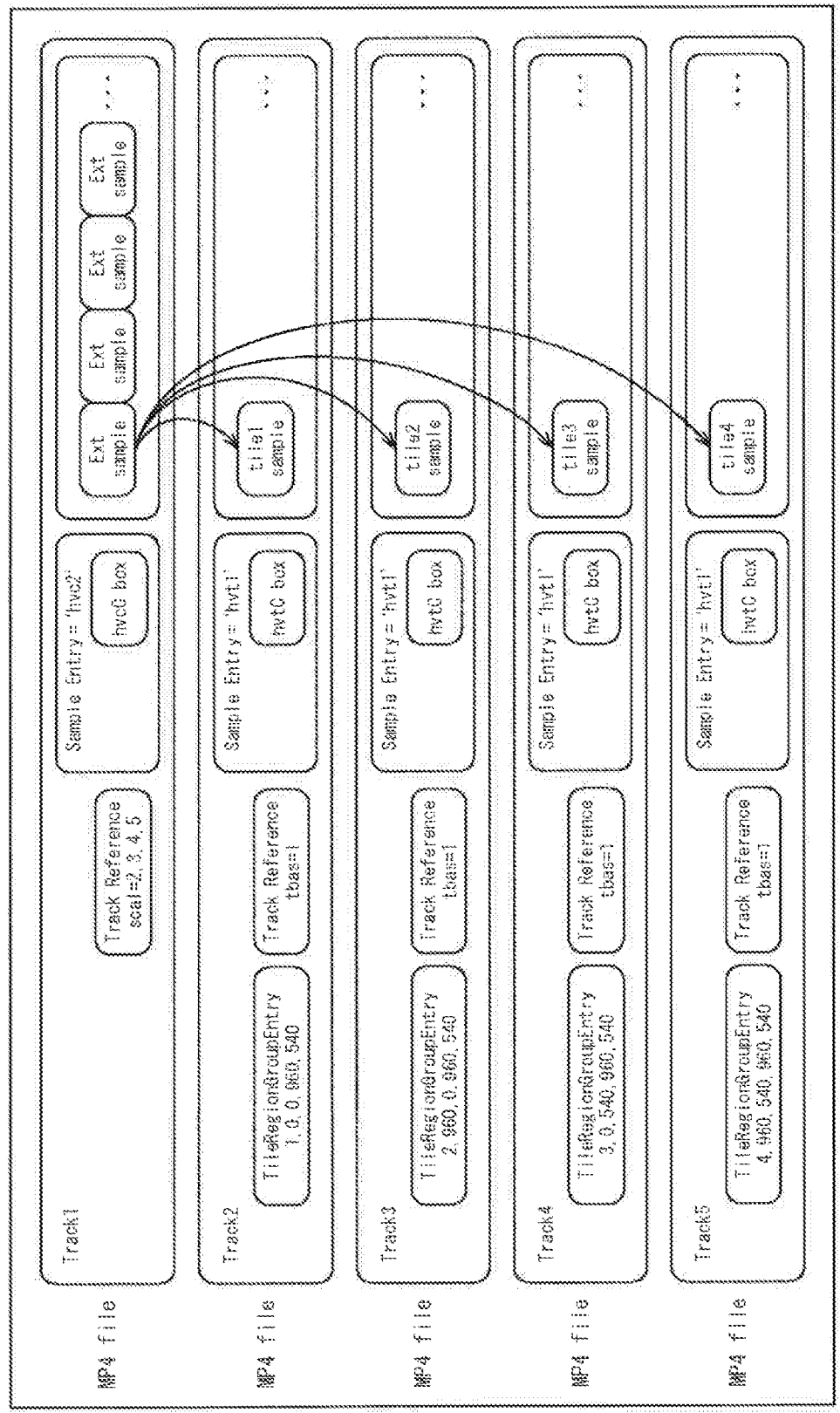
FIG. 15 is a view illustrating a general configuration example of MP4 files.
Figure 16:
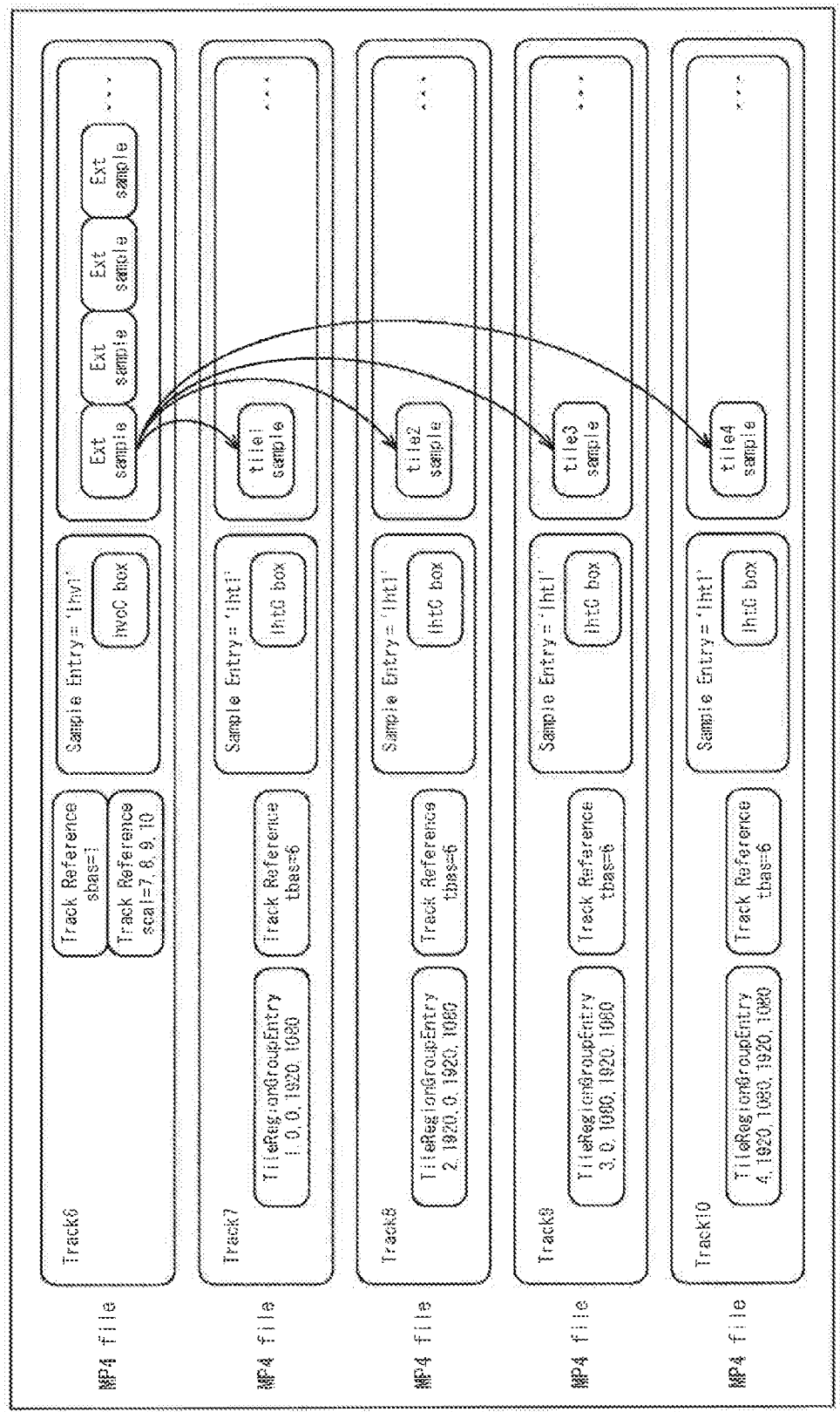
FIG. 16 is a view illustrating the general configuration example of MP4 files.

The MP4 file generation unit 103 of the file generation device 100 generates MP4 files illustrated in FIGS. 15 and 16, for example, as MP4 files storing base layer encoded data (HEVC) and enhancement layer encoded data (SHVC).

As illustrated in FIGS. 15 and 16, the MP4 file generation unit 103 generates tracks for storing information on a whole of a base layer, information on respective tiles of a base layer image, information on a whole of an enhancement layer, and information on respective tiles of an enhancement layer image, respectively. In this case, the MP4 file generation unit 103 files the respective tracks as MP4 files.

More specifically, the MP4 file generation unit 103 generates, for the base layer, an MP4 file which stores a track 1 (Track1) storing information on the whole of the base layer, an MP4 file which stores a track 2 (Track2) storing information on a tile 1 (tile1) of the base layer image, an MP4 file which stores a track 3 (Track3) storing information on a tile 2 (tile2) of the base layer image, an MP4 file which stores a track 4 (Track4) storing information on a tile 3 (tile3) of the base layer image, an MP4 file which stores a track 5 (Track5) storing information on a tile 4 (tile4) of the base layer image (FIG. 15).

Similarly, the MP4 file generation unit 103 generates, for the enhancement layer, an MP4 file which stores a track 6 (Track6) storing information on the whole of the enhancement layer, an MP4 file which stores a track 7 (Track7) storing information on a tile 1 (tile1) of the enhancement layer image, an MP4 file which stores a track 8 (Track8) storing information on a tile 2 (tile2) of the enhancement layer image, an MP4 file which stores a track 9 (Track) storing information on a tile 3 (tile3) of the enhancement layer image, an MP4 file which stores a track 10 (Track10) storing information on a tile 4 (tile4) of the enhancement layer image (FIG. 16).

The track 1 (Track1) storing the information on the whole of the base layer stores an extractor sample (EXT sample) corresponding to reference information indicating reference to each tile of the base layer. In addition, a sample entry of the track 1 contains encoding information indicating HEVC as the encoding system of the base layer (Sample Entry='hvc2'). Moreover, this sample entry contains an hvcC box (hvcC box) storing configuration information necessary for decoding of HEVC encoded data. Furthermore, a track reference (Track Reference) corresponding to information about reference between the track 1 and other tracks contains indication of the presence of information on the track storing a sample for reference, and information on a type of the reference (scal=2, 3, 4, 5). In other words, the track reference contains information indicating that the track 1 refers to the tracks 2 through 5 by a reference type of "scal".

Each of the track 2 (Track2) through the track 5 (Track5) storing information on the tiles of the base layer image stores a sample of the corresponding tile of the base layer (tile1 sample, tile2 sample, tile3 sample, or tile4 sample). In addition, each sample entry of the tracks 2 through 5 contains encoding information indicating that the track stores only a slice of the tile of the base layer (Sample Entry='hyt1'). In addition, each of the sample entries contains an hvtC box (hvtC box) which stores configuration information necessary for decoding of data in the track. Moreover, each track reference (Track Reference) of these tracks indicates reference to the track 1 by a reference type of "tbas" (tbas=1). Furthermore, each of these tracks contains, as a tile region group entry (TileRegionGroupEntry), identification information for identifying the corresponding tile of the base layer, a horizontal position of the corresponding tile (offset), a vertical position of the corresponding tile (offset), a horizontal size of the corresponding tile (width), a vertical size of the corresponding tile (height), and others.

The track 6 (Track6) storing the information on the whole of the enhancement layer stores an extractor sample (EXT sample) corresponding to reference information indicating reference to each tile of the enhancement layer. In addition, a sample entry of the track 6 contains encoding information indicating SHVC as the encoding system of the enhancement layer (Sample Entry='lhv1'). Moreover, this sample entry contains an hvcC box (hvcC box) storing configuration information necessary for decoding of SHVC encoded data.

Furthermore, a track reference (Track Reference) of the track 6 indicates reference to the tracks 7 through 10 by a reference type of "scal" (scal=7, 8, 9, 10). The track reference (Track Reference) of the track 6 indicates reference to the track 1 storing information on the whole of the base layer by a reference type of "sbas" (sbas=1). This configuration allows reference from the tracks of the enhancement layers to the tracks of the base layer.

Each of the track 7 (Track7) through the track 10 (Track10) storing information on the tiles of the enhancement layer image stores a sample of the corresponding tile of the enhancement layer (tile1 sample, tile2 sample, tile3 sample, or tile4 sample), In addition, each sample entry of the tracks 7 through 10 contains encoding information indicating that the track stores only a slice of the tile of the enhancement layer (Sample Entry='lht1'). In addition, each of the sample entries contains an lhtC box (lhtC box) which stores configuration information necessary for decoding of data in the track. As described above, the encoding information on the respective tracks storing the tiles of the enhancement layer is different from the encoding information on the respective tracks storing tiles of the base layer. Accordingly, the tracks storing the tiles of the enhancement layer are identifiable as information storing the tiles of the enhancement layer.

Moreover, each track reference (Track Reference) of these tracks indicates reference to the track 6 by a reference type of "tbas" (tbas=6). Accordingly, each of ice track references indicates that each of the tracks storing the tiles of the enhancement layers refers not to the track 1 storing information on the whole of the base layer, but to the track 6 storing information on the whole of the enhancement layer.

Furthermore, each of these tracks contains, as a tile region group entry (TileRegionGroupEntry), identification information for identifying the corresponding tile of the enhancement layer, a horizontal position of the corresponding tile (offset), a vertical position of the corresponding tile (offset), a horizontal size of the corresponding tile (width), a vertical size of the corresponding tile (height), and others.

The MP4 file generation unit 103 which generates MP4 files having this configuration allows control of distribution of each tile in the enhancement layer as well as in the base layer. Accordingly, a partial image (such as tile) of an image in each layer of an image constituted by a plurality of layers is adaptively provided in image distribution.

<Flow of MP4 File Generation Process>

Figure 17:
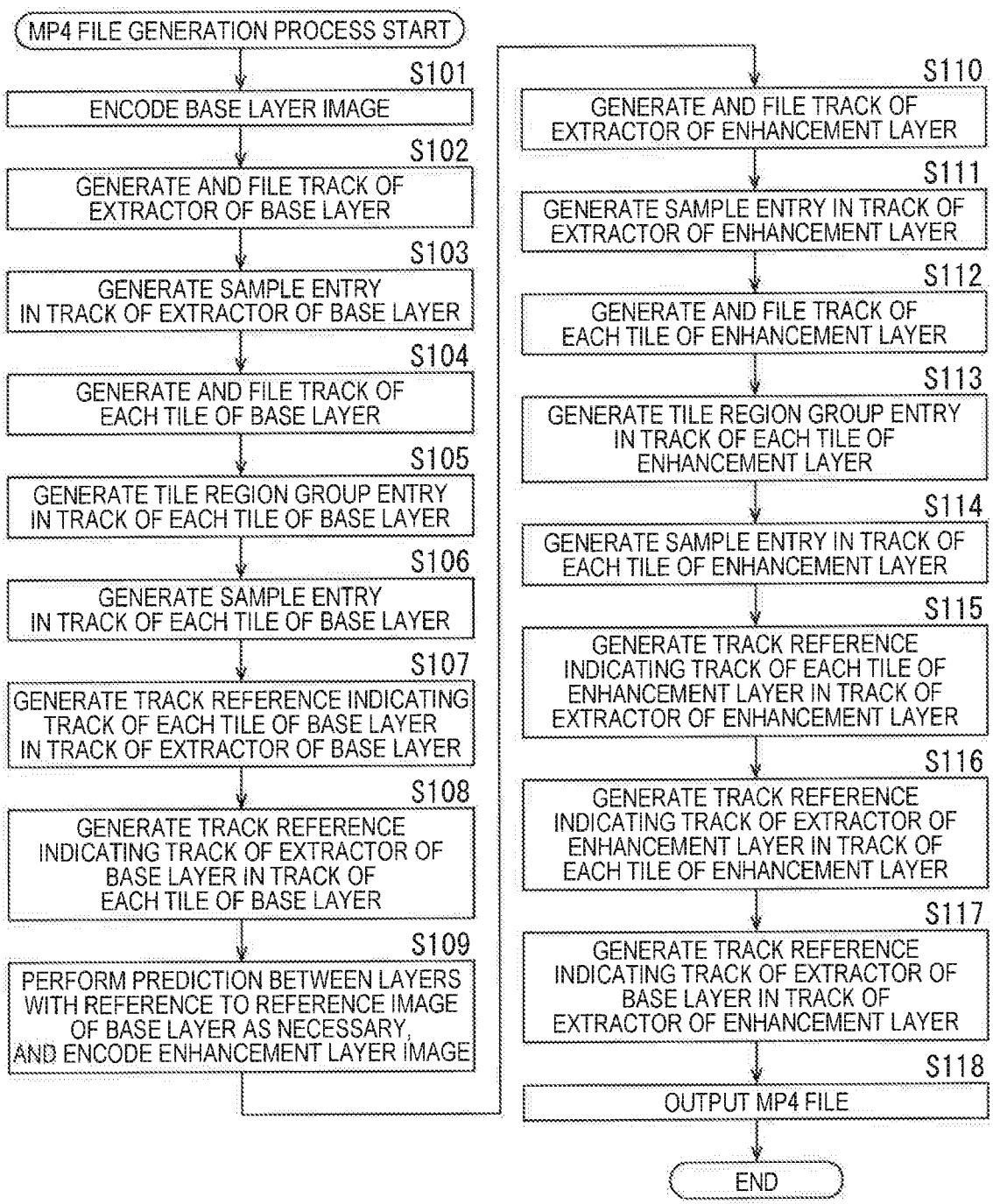
FIG. 17 is a flowchart showing an example of a flow of an MP4 file generation process.

Described hereinafter with reference to a flowchart shown in FIG. 17 is an example of a flow of an MP4 file generation process corresponding to a process for generating MP4 files described above, and executed by the file generation device 100 illustrated in FIG. 14.

With a start of the MP4 file generation process, the base layer encoding unit 101 encodes a base layer image in step S101.

In step S102, the MP4 file generation unit 103 generates a track of an extractor of the base layer, and files the track as an MP4 file.

In step S103, the MP4 file generation unit 103 generates a sample entry in the track of the extractor of the base layer.

In step S104, the MP4 file generation unit 103 generates a track of each tile of the base layer, and files the generated tracks as MP4 files.

In step S105, the MP4 file generation unit 103 generates a tile region group entry in the track of each tile of the base layer.

In step S106, the 494 file generation unit 103 generates a sample entry in the track of each tile of the base layer.

In step S107, the MP4 file generation unit 103 generates a track reference indicating the tracks of the respective tiles of the base layer in the track of the extractor of the base layer.

In step S108, the MP4 file generation unit 105 generates a track reference indicating the track of the extractor of the base layer in the track of each tile of the base layer.

In step S109, the enhancement layer encoding unit 102 performs prediction between layers with reference to a reference image of the base layer as necessary, and encodes an enhancement layer image.

In step S110, the MP4 file generation unit 103 generates a track of an extractor of the enhancement layer, and files the track as an MP4 file.

In step S111, the MP4 file generation unit 103 generates a sample entry in the track of the extractor of the enhancement layer.

In step S112, the MP4 file generation unit 103 generates a track of each tile of the enhancement layer, and files the generated tracks as MP4 files.

In step S113, the MP4 file generation unit 103 generates a tile region group entry in the track of each tile of the enhancement layer.

In step S114, the MP4 file generation unit 103 generates a sample entry in the track of each tile of the enhancement layer.

In step S115, the MP4 file generation unit 103 generates a track reference indicating the tracks of the respective tiles of the enhancement layer in the track of the extractor of the enhancement layer.

In step S116, the MP4 file generation unit 103 generates a track reference indicating the track of the extractor of the enhancement layer in the track of each tile of the enhancement layer.

In step S117, the MP4 file generation unit 103 generates a track reference indicating the track of the extractor of the base layer in the track of the extractor of the enhancement layer.

In step S118, the MP4 file generation unit 103 outputs the respective MP4 files thus generated.

As described above, the file generation device 100 generates MP4 files having the configuration illustrated in FIGS. 15 and 16, and allows control of distribution of each tile in the enhancement layer as well as in the base layer by performing the MP4 file generation process described above. Accordingly, a partial image (such as tile) of an image in each layer of an image constituted by a plurality of layers is adaptively provided in image distribution.

<Configuration Example of MPD>

Figure 18:
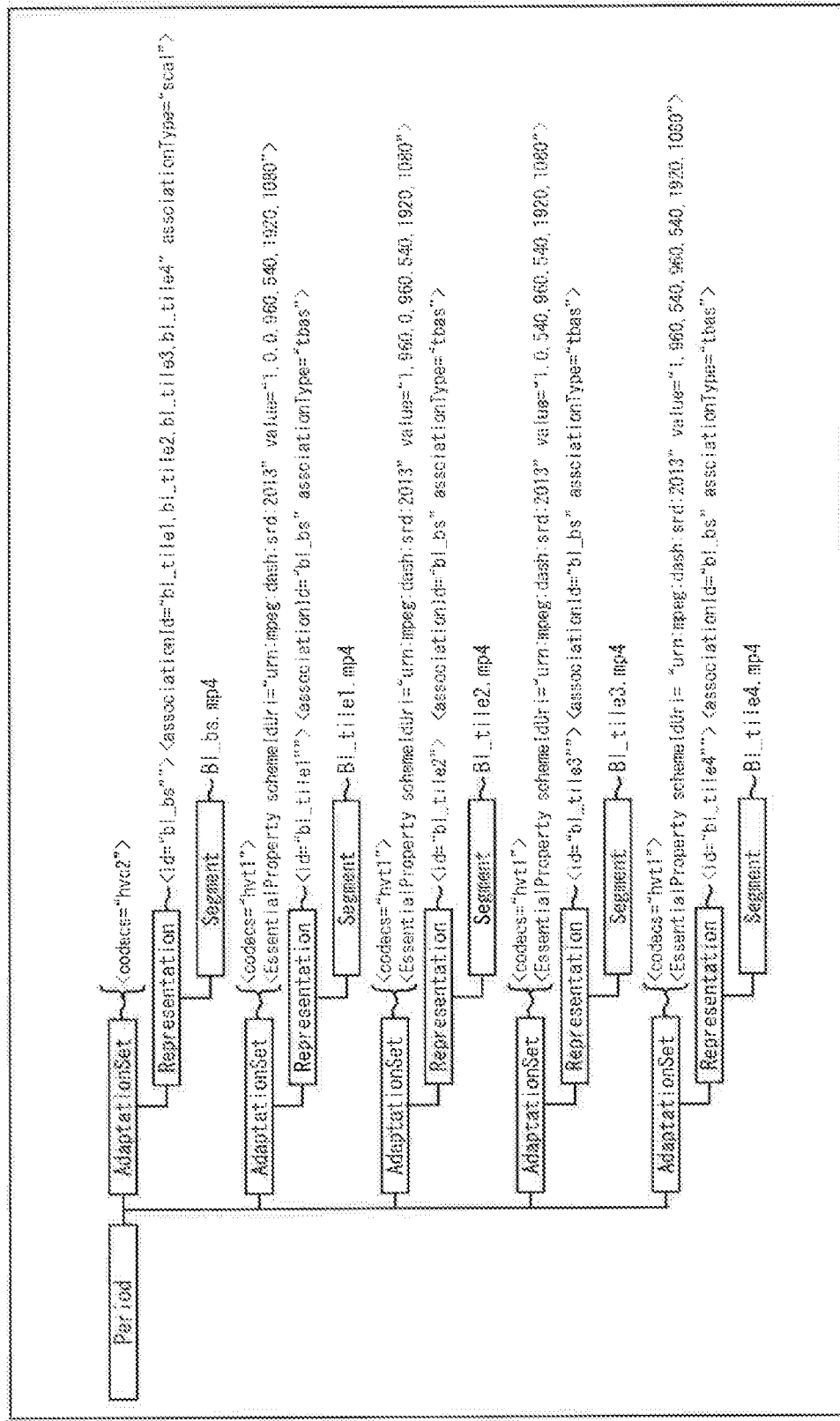
FIG. 18 is a view illustrating a general configuration example of MPD.
Figure 19:
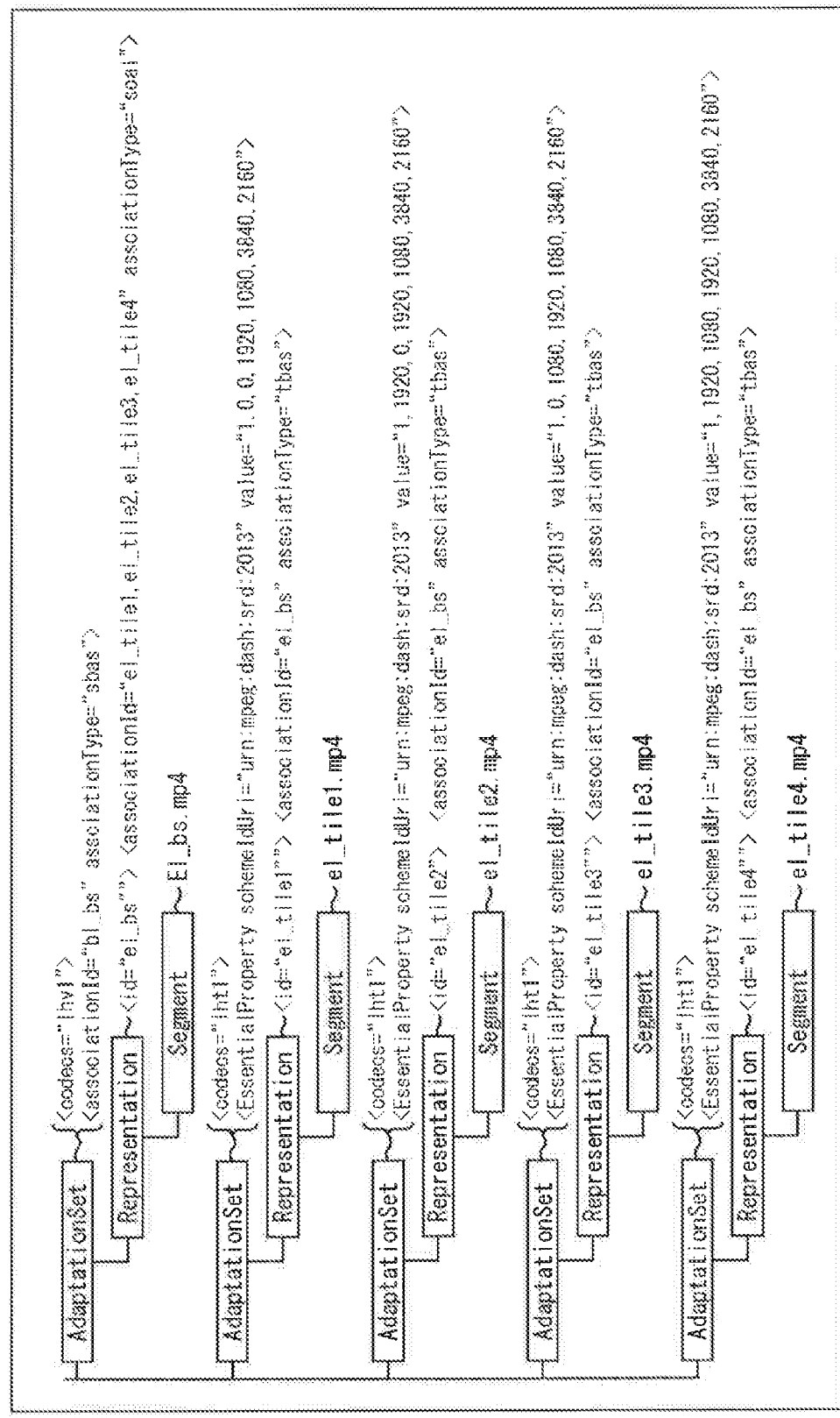
FIG. 19 is a view illustrating a general configuration example of MPD.

The MPD generation unit 104 of the file generation device 100 generates MPD having a configuration illustrated in FIGS. 18 and 19 from MP4 files generated by the MP4 file generation unit 103 in the manner described above, for example.

As illustrated in FIGS. 18 and 19, the MPD generation unit 104 generates metadata containing information on a whole of a base layer, information on respective tiles of a base layer image, information on a whole of an enhancement layer, and information on respective tiles of an enhancement layer image. In a state that each track has been filed as an MP4 file, the MPD generation unit 104 sets an adaptation set (AdaptationSet) for each MP4 file (track), and sets (registers) an MP4 file for each segment (Segment).

More specifically, the MPD generation unit 104 sets an adaptation set storing information on the whole of the base layer, sets a representation (Representation) in an order lower than the adaptation set, sets a segment (Segment) in an order lower than the representation, and registers an MP4 file (Bl_bs.mp4) storing information on the whole of the base layer in the segment.

The MPD generation unit 104 sets encoding information belonging to a sample entry of the MP4 file in the adaptation set (<codecs="hvc2">). The MPD generation unit 104 further sets identification information in the representation to indicate that stored information is information on the whole of the base layer (<id="bl_bs">). The MPD generation unit 104 further sets information and the like contained in the track reference of the MP4 file as association information indicating a reference relationship between adaptation sets and a type of reference. For example, the following information is set.

<associationid="bl_tile1,bl_tile2,bl_tile 3,bl_tile4 "associationType"scal">

Similarly, the MPD generation unit 104 sets an. adaptation set storing information on the tile 1 (tile1) of the base layer image, sets a representation in an order lower than the adaptation set, sets a segment in an order lower than the representation, and registers the MP4 file (Bl_tile1.mp4) storing information on the tile 1 of the base layer image in the segment.

The MPD generation unit 104 sets encoding information belonging to the sample entry of the MP4 file in the adaptation set (<codecs="hvt1">) The MPD generation unit 104 further sets an essential property (EssentialProperty) in the adaptation set, sets a tile scheme (schemeIdUri="urn:mpeg:dash:srd:2013") as an element of the essential property, and sets information on a tile region group entry of the MP4 file and the like as a value (value). For example, the following information is set.

<EssentialProperty schemeIdUri="urn:mpeg:dash:srd:2013"value="1,0,0,960,540, 1920,1080">

The MPD generation unit 104 further sets identification information in the representation to indicate that stored information is information on the tile 1 of the base layer (<id="bl_tile1">). The MPD generation unit 104 further sets information and the like contained in the track reference of the MP4 file as association information indicating a reference relationship between adaptation sets and a type of reference. For example, the following information is set.

<associationid="bl_bs"associationType="tbas">

Similarly, the MPD generation unit 104 sets an adaptation set storing information on the tile 2 (tile2) of the base layer image, sets a representation in an order lower than the adaptation set, sets a segment in an order lower than the representation, and registers the MP4 file (Bl_tile2.mp4) storing information on the tile 2 of the base layer image in the segment.

The MPD generation unit 104 sets encoding information belonging to the sample entry of the MP4 file in the adaptation set (<codecs="hvt1">). The MPD generation unit 104 further sets an essential property (EssentialProperty) in the adaptation set, sets a tile scheme (schemeIdUri="urn:mpeg:dash:srd:2013") as an element of the essential property, and sets information on a tile region group entry of the MP4 file and the like as a value (value). For example, the following information is set.

<EssentialProperty schemeIdUri="urn:mpeg:dash:srd:2013"value="1,960,0,960,54 0,1920,1080">

The MPD generation unit 104 further sets identification information in the representation to indicate that stored information is information on the tile 2 of the base layer (<id="bl_tile2">). The MPD generation unit 104 further sets information and the like contained in the track reference of the MP4 file as association information indicating a reference relationship between adaptation sets and a type of reference. For example, the following information is set.

<associationid="bl_bs"associationType="tbas">

Similarly, the MPD generation unit 104 sets an adaptation set storing information on the tile 3 (tile3) of the base layer image, sets a representation in an order lower than the adaptation set, sets a segment in an order lower than the representation, and registers the MP4 file (Bl_tile3.mp4) storing information on the tile 3 of the base layer image in the segment.

The MPD generation unit 104 sets encoding information belonging to the sample entry of the MP4 file in the adaptation set (<codecs="hvt1">). The MPD generation unit 104 further sets an essential property (EssentialProperty) in the adaptation set, sets a tile scheme (schemeIduri="urn:mpeg:dash:srd:2013") as an element of the essential property, and sets information on a tile region group entry of the MP4 file and the like as a value (value). For example, the following information is set.

<EssentialProperty schemeIdUri="urn:mpeg:dash:srd:2013"value="1, 0, 540, 960, 54 0,1920,1080">

The MPD generation unit 104 further sets identification information in the representation to indicate that stored information is information on the tile 3 of the base layer (<id="bl_tile3">). The MPD generation unit 104 further sets information and the like contained in the track reference of the MP4 file as association information indicating a reference relationship between adaptation sets and a type of reference. For example, the following information is set.

<associationid="bl_bs"associationType="tbas">

Similarly, the MPD generation unit 104 sets an adaptation set storing information on the tile 4 (tile4) of the base layer image, sets a representation in an order lower than the adaptation set, sets a segment in an order lower than the representation, and registers the MP4 file (Bl_tile4.mp4) storing information on the tile 4 of the base layer image in the segment.

The MPD generation unit 104 sets encoding information belonging to the sample entry of the MP4 file in the adaptation set (<codecs="hvt1">). The MPD generation unit 104 further sets an essential property (EssentialProperty) in the adaptation set, sets a tile scheme (schemeIdUri="urn:mpeg:dash:srd:2013") as an element of the essential property, and sets information on a tile region group entry of the MP4 file and the like as a value (value). For example, the following information is set.

<EssentialProperty schemerdUri="urn:mpeg:dash:srd:2013"value="1,960,540,960, 540,1920,1080">

The MPD generation unit 104 further sets identification information in the representation to indicate that stored information is information on the tile 4 of the base layer (<id="bl_tile4">). The MPD generation unit 104 further sets information and the like contained in the track reference of the MP4 file as association information indicating a reference relationship between adaptation sets and a type of reference. For example, the following information is set.

<associationid="bl_bs"associationType="tbas">

FIG. 18 illustrates the foregoing configuration.

In addition, the MPD generation unit 104 sets an adaptation set storing information on the whole of the enhancement layer, sets a representation in an order lower than the adaptation set, sets a segment in an order lower than the representation, and registers an MP4 file(El_bs.mp4) storing information on the whole of the enhancement layer in the segment.

The MPD generation unit 104 sets encoding information belonging to a sample entry of the MP4 file in the adaptation set (<codecs="lhv1">). The MPD generation unit 104 further sets identification information in the representation to indicate that stored information is information on the whole of the base layer (<id="el_bs">). The MPD generation unit 104 further sets information and the like contained in the track reference of the MP4 file as association information indicating a reference relationship between adaptation sets and a type of reference. For example, the following information is set.

<associationid="bl_bs"associationType="sbas">
    <associationid="el_tile1,el_tile2,el_tile3, el_tile4"associationType="scal">

This configuration allows reference to the adaptation set of the base layer from the adaptation set of the enhancement layer.

Similarly, the MPD generation unit 104 sets an adaptation set storing information on the tile 1 (tile1) of the enhancement layer image, sets a representation in an order lower than the adaptation set, sets a segment in an order lower than the representation, and registers the MP4 file (el_tile1.mp4) storing information on the tile 1 of the enhancement layer image in the segment.

The MPD generation unit 104 sets encoding information belonging to the sample entry of the. MPD in the adaptation set (<codecs="lht1">). The MPD generation unit 104 further sets an essential property (EssentialProperty) in the adaptation set, sets a tile scheme (schemeIdUri="urn:mpeg:dash:srd:2013") as an element of the essential property, and sets information on a tile region group entry of the MP4 file and the like. as a value (value). For example, the following information is set.

<EssentialProperty schemeIdUri="urn:mpeg:dash:srd:2013"value="1,0,0,1920,108 0,3840,2160">

The MPD generation unit 104 further sets identification information in the representation to indicate that stored information is information on the tile 1 of the enhancement layer (id="el_tile1">). The MPD generation unit 104 further sets information and the like contained in the track reference of the MP4 file as association information indicating a reference relationship between adaptation sets and a type of reference. For example, the following information is set.

<associationid="el_bs"associationType="tbas">

Similarly, the MPD generation unit 104 sets an adaptation set snoring information on the tile 2 (tile2) of the enhancement layer image, sets a representation in an order lower than the adaptation set, sets a segment in an order lower than the representation, and registers an MP4 file (el_tile2.mp4) storing information on the tile 2 of the enhancement layer image in the segment.

The MPD generation unit 104 sets encoding information belonging to the sample entry of the MP4 file in the adaptation set (<codecs="lht1">). The MPD generation unit 104 further sets an essential property (EssentialProperty) in the adaptation set, sets a tile scheme (schemeIdUri="urn:mpeg:dash:srd:2013") as an element of the essential property, and sets information on a tile region group entry of the MP4 file and the like as a value (value). For example, the following information is set.

<EssentialProperty schemeIdUri="urn:mpeg:dash:srd:2013"value="1,1920,0,1920, 1080,3840,2160">

The MPD generation unit 104 further sets identification information in the representation to indicate that stored information is information on the tile 2 of the enhancement layer (<id="el_tile2">). The MPD generation unit 104 further sets information and the like contained in the track reference of the MP4 file as association information indicating a reference relationship between adaptation sets and a type of reference. For example, the following information is set.

<associationid="el_bs"associationType="tbas">

Similarly, the MPD generation unit 104 sets an adaptation set storing information on the tile 3 (tile3) of the enhancement layer image, sets a representation in an order lower than the adaptation set, sets a segment in an order lower than the representation, and registers an MP4 file (el_tile3.mp4) storing information on the tile 3 of the enhancement layer image in the segment.

The MPD generation unit 104 sets encoding information belonging to the sample entry of the MP4 file in the adaptation set (<codecs="lht1">). The MPD generation unit 104 further sets an essential property (EssentialProperty) in the adaptation set, sets a tile scheme (schemeIdUri="urn:mpeg:dash:srd:2013") as an element of the essential property, and sets information on a tile region group entry of the MP4 file and the like as a value (value). For example, the following information is set.

<EssentialProperty schemeIdUri="urn:mpeg:dash:srd:2013"value="1,0,1080,1920, 1080,3840,2160">

The MPD generation unit 104 further sets identification information in the representation to indicate that stored information is information on the tile 3 of the enhancement layer (<id="el_tile3">). The MPD generation unit 104 further sets information and the like contained in the track reference of the MP4 file as association information indicating a reference relationship between adaptation sets and a type of reference. For example, the following information is set.

<associationid="el_bs"associationType="tbas">

Similarly, the MPD generation unit 104 sets an adaptation set storing information on the tile 4 (tile4) of the enhancement layer image, sets a representation in an order lower than the adaptation set, sets a segment in an order lower than the representation, and registers an MP4 file ((el_tile4.mp4) storing information on the tile 4 of the enhancement layer image in the segment.

The MPD generation unit 104 sets encoding information belonging to the sample entry of the MP4 file in the adaptation set (<codecs="lht1">). The MPD generation unit 104 further sets an essential property (EssentialProperty) in the adaptation set, sets a tile scheme (schemeIdUri="urn: mpeg:dash:srd:2013") as an element of the essential property, and sets information on a tile region group entry of the MP4 file and the like as a value (value). For example, the following information is set.

<EssentialProperty schemeIdUri="urn:mpeg:dash:srd: 2013"value="1,1920,1080,19 20,1080,3840,2160">

The MPD generation unit 104 further sets identification information in the representation to indicate that stored information is information on the tile 4 of the enhancement layer (<id="el_tile2">). The MPD generation unit 104 further sets information and the like contained in the track reference of the MP4 file as association information indicating a reference relationship between adaptation sets and a type of reference. For example, the following information is set.

<associationid="el_bs"associationType="tbas">

FIG. 18 illustrates the foregoing configuration.

As described above, the encoding information on the adaptation sets of the respective tiles of the enhancement layer is different from the encoding information on the adaptation sets of the respective tiles of the base layer. Accordingly, the adaptation sets of the tiles of the enhancement layer are identifiable as adaptation sets of the tiles oil the enhancement layer.

In addition, the association information on the representations belonging to these adaptation sets indicates reference to "el_bs", and a type of reference "tbas". In this case, reference not to the adaptation set (bl_bs) of the information on the whole of the base layer, but to adaptation set (el_bs) of the information on the whole of the enhancement layer is allowed from the adaptation sets of the respective tiles of the enhancement layer.

The MPD generation unit 104 which generates MPD having this configuration allows control of distribution for each tile in the enhancement layer as well as in the base layer. Accordingly, a partial image (such as tile) of an image in each layer of an image constituted by a plurality of layers is adaptively provided in image distribution.

<Flow of MPD Generation Process>

Figure 20:
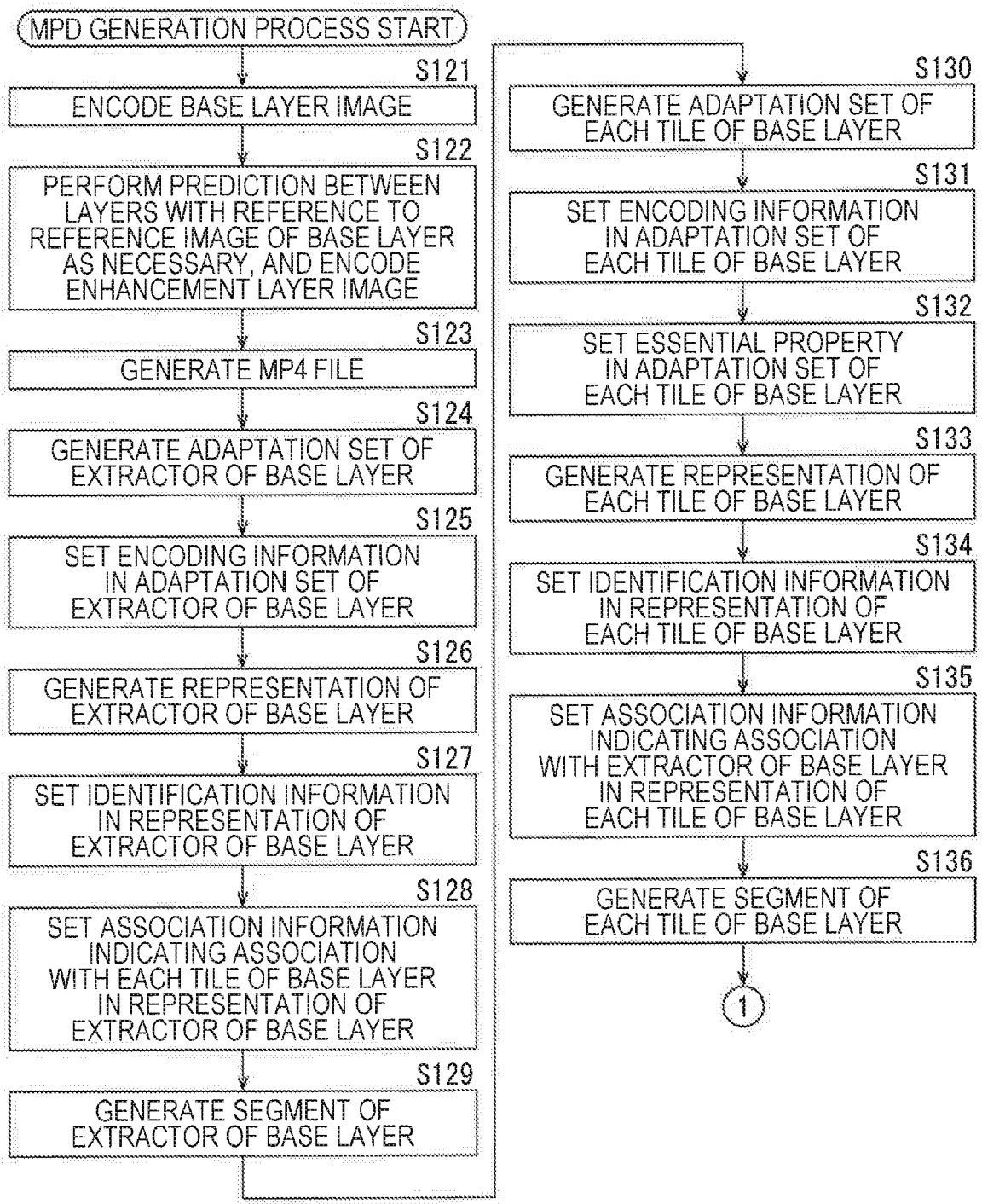
FIG. 20 is a flowchart showing an example of a flow of an MPD generation process.
Figure 21:
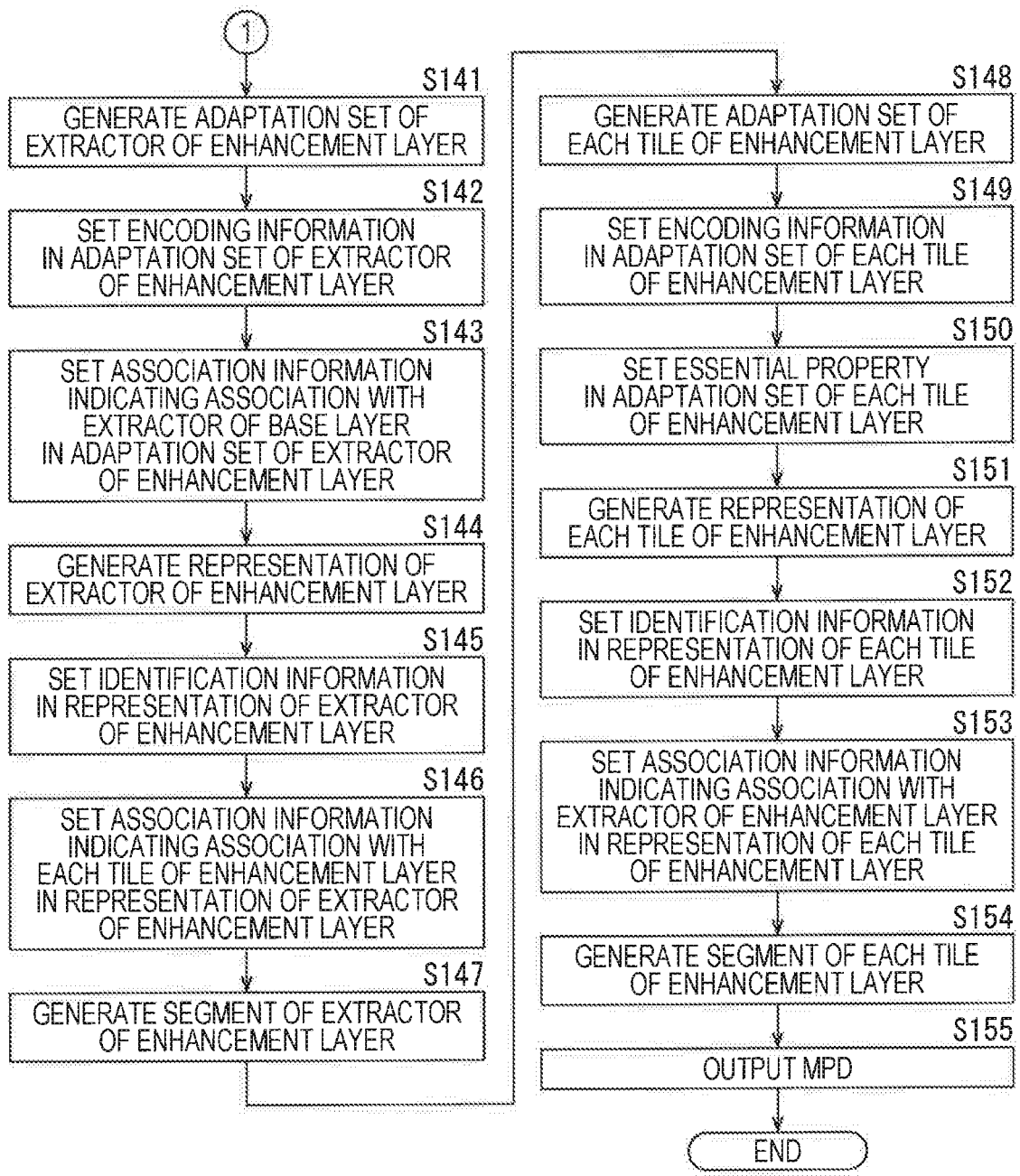
FIG. 21 is a flowchart showing the example of the flow of the MPD generation process, continuing from FIG. 20.

Described with reference to a flowchart shown in FIGS. 20 and 21 is an example of a flow of an MPD generation process performed by the file generation device 100 illustrated in FIG. 14 and corresponding to a process for generating MPD described above.

With a start of the MPD generation process, the base layer encoding unit 101 encodes a base layer image in step S121 in FIG. 20.

In step S122, the enhancement layer encoding unit 102 performs prediction between layers with reference to a reference image of the base layer as necessary, and encodes an enhancement layer image.

In step S123, the MP4 file generation unit 103 generates an MP4 file storing encoded data on the base layer and encoded data on the enhancement layer. This processing is similar to the corresponding processing in the MP4 file generation process described with reference to the flowchart in FIG. 17. Accordingly, the same explanation of this processing is not repeated.

In step S124, the MPD generation unit 104 generates an adaptation set of an extractor of the base layer.

In step S125, the MPD generation unit 104 sets encoding information in the adaptation set of the extractor of the base layer.

In step S126, the MPD generation unit 104 generates a representation of the extractor of the base layer.

In step S127, the MPD generation unit 104 sets identification information in the representation of the extractor of the base layer.

In step S128, the MPD generation unit 104 sets association information in the representation of the extractor of the base layer to indicate association with the respective tiles of the base layer.

In step S129, the MPD generation unit 104 generates a segment of the extractor of the base layer.

In step S130, the MPD generation unit 104 generates an adaptation set of each tile of the base layer.

In step S131, the MPD generation unit 104 sets encoding information in the adaptation set of each tile of the base layer.

In step S132, the MPD generation unit 104 sets an essential property in the adaptation set of each tile of the base layer.

In step S133, the MPD generation unit 104 generates a representation of each tile of the base layer.

In step S134, the MPD generation unit 104 sets identification information in the representation of each tile of the base layer.

In step S135, the MPD generation unit 104 sets association information in the representation of each tile of the base layer to indicate association with the extractor of the base layer.

In step S136, the MPD generation unit 104 generates a segment of each tile of the base layer.

In step S141 in FIG. 21, the MPD generation unit 104 generates an adaptation set of an extractor of the enhancement layer.

In step S142, the MPD generation unit 104 sets encoding information in the adaptation set of the extractor of the enhancement layer.

In step S143, the MPD generation unit 104 sets association information in the: adaptation set of the extractor of the enhancement layer to indicate association with the extractor of the base layer.

In step S144, the MPD generation unit 104 generates a representation of the extractor of the enhancement layer.

In step S145, the MPD generation unit 104 sets identification information in the representation of the extractor of the enhancement layer.

In step S146, the MPD generation unit 104 sets association information in the representation of the extractor of the enhancement layer to indicate association with the respective tiles of the enhancement layer, and association information in the representation of the extractor of the enhancement layer to indicate association with the extractor of the base layer.

In step S147, the MPD generation unit 104 generates a segment of the extractor of the enhancement layer.

In step S148, the MPD generation unit 104 generates the adaptation set of each tile of the enhancement layer.

In step S149, the MPD generation unit 104 sets encoding information in the adaptation set of each tile of the enhancement layer.

In step S150, the MPD generation unit 104 sets an essential property in the adaptation set of each tile of the enhancement layer.

In step S151, the MPD generation unit 104 generates a representation of each tile of the enhancement layer.

In step S152, the MPD generation unit 104 sets identification information in the representation of each tile of the enhancement layer.

In step S153, the MPD generation unit 104 sets association information in the representation of each tile of the enhancement layer to indicate association with the extractor of the base layer.

In step S154, the MPD generation unit 104 generates a segment of each tile of the enhancement layer.

In step S155, the MPD generation unit 104 outputs MPD thus generated.

The file generation device 100 generates MPD having the configuration illustrated in FIGS. 18 and 19, and allows control of distribution for each tile in the enhancement layer as well as in the base layer by performing the MPD generation process described above. Accordingly, a partial image (such as tile) of an image in each layer of an image constituted by a plurality of layers is adaptively provided in image distribution.

<File Reproduction Device>

Figure 22:
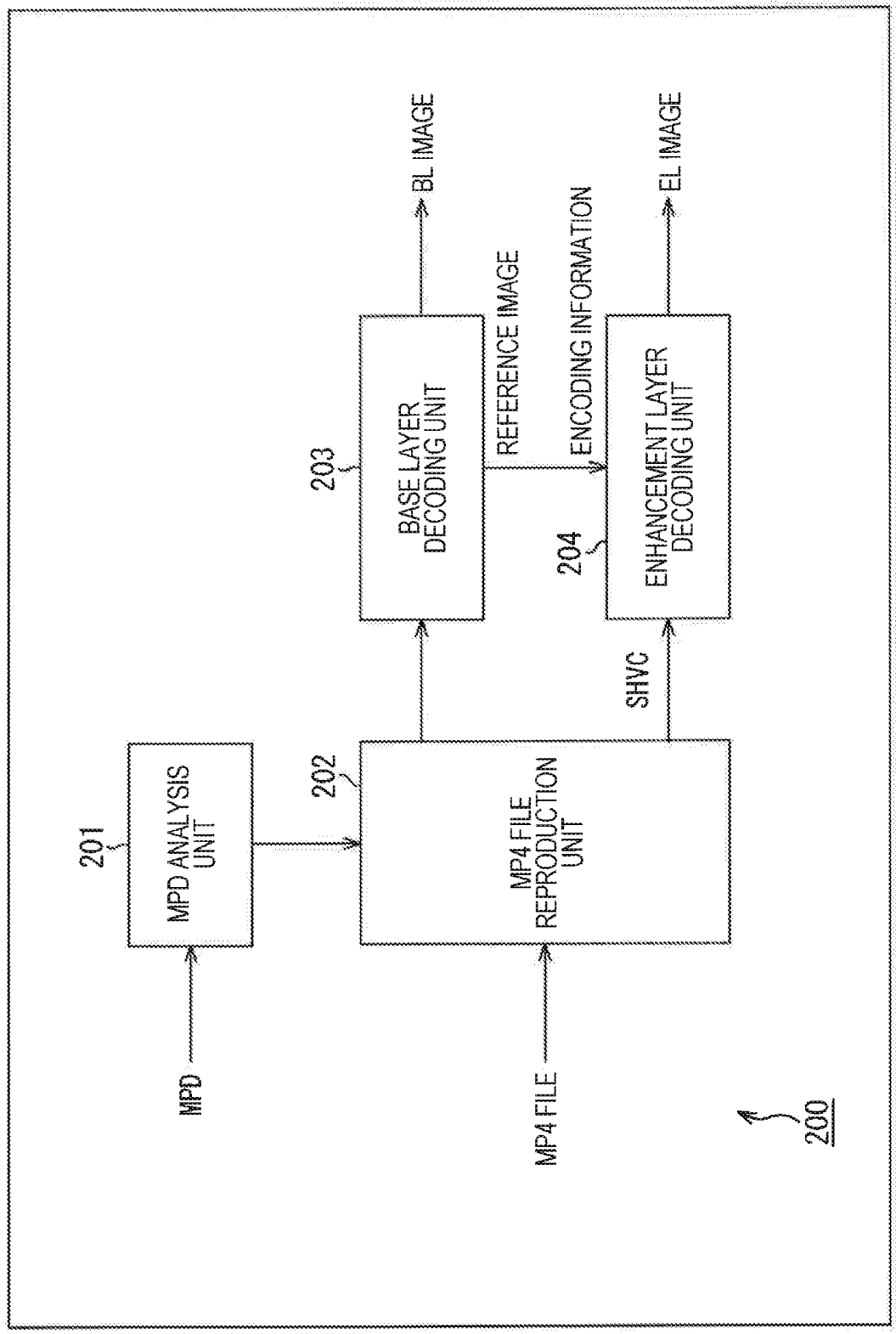
FIG. 22 is a block diagram illustrating a general configuration example of a file reproduction device.

A device for reproducing MP4 files and MPD thus generated is hereinafter described. FIG. 22 is a block diagram illustrating a general configuration example of a file reproduction device corresponding to an information processing device according to an embodiment to which the present technology has been applied A file reproduction device 200 in FIG. 22 is a device which reproduces MP4 files and MPD generated by the file generation device 100 illustrated in FIG. 14 in the manner described above, generates a decoded image of either one or both of a base layer and an enhancement layer, and outputs the decoded image.

As illustrated in FIG. 22, the file reproduction device 200 includes an MPD analysis unit 201, an MP4 file reproduction unit 202, a base layer decoding unit 203, and an enhancement layer decoding unit 204.

<Flow of MP4 File Reproduction Process>

The file reproduction device 200 illustrated in FIG. 22 performs an MP4 file reproduction process to reproduce input MP4 files and generate a decoded image of an arbitrary layer. An example of a flow of the MP4 file reproduction process is now described with reference to a flowchart shown in FIG. 23.

With a start of the MP4 file reproduction process, the MP4 file reproduction unit 202 determines whether to reproduce the base layer in step S171. When it is determined that the base layer is to be reproduced, the process proceeds to step S172.

In step S172, the MP4 file reproduction unit 202 acquires an MP4 file of an extractor of the base layer.

In step S173, the MP4 file reproduction unit 202 acquires MP4 files of tiles to be reproduced on the basis of a track reference of the MP4 file acquired in the previous step.

In step S174, the MP4 file reproduction unit 202 extracts encoded data of a sample of a processing target from the acquired MP4 files.

In step S175, the hose layer decoding unit 203 decodes the encoded data to generate a decoded image of the base layer (BL image).

In step S176, the base layer decoding unit 203 outputs the decoded image of the base layer (BL image). After completion of processing in step S176, the process proceeds to step S189.

On the other hand, when it is determined in step S171 that the enhancement layer is to he decoded, the process proceeds to step S178.

In step S178, the MP4 file reproduction unit 202 determines whether or not the base layer has been acquired. When it is determined that the base layer has not been acquired yet, the process proceeds to step S179.

Processing from step S179 to step S183 is, performed similarly to processing from step S172 to step S176. When a decoded image of the base layer (BL image) is output after completion of the foregoing processing, the process proceeds to step S184. On the other hand, when it is determined in step S178 that an image of the base layer has been acquired, the process proceeds to step S184.

In step S184, the MP4 file reproduction unit 202 acquires an MP4 file of an extractor of the enhancement layer.

In step S185, the MP4 file reproduction unit 202 acquires MP4 files of tiles to be reproduced on the basis of a track reference of the MP4 file acquired in the previous step.

In step S186, the MP4 file reproduction unit 202 extracts encoded data of a sample of a processing target from the acquired MP4 file.

In step S187, the enhancement layer decoding unit 204 performs prediction between layers by using a reference image of the base layer and encoding information as necessary to decode the encoded data, and generates a decoded image of the enhancement layer (EL image).

In step S188, the enhancement layer decoding unit 204 outputs the decoded image of the enhancement layer (EL image). After completion of processing in step S188, the process proceeds to step S189.

In step S189, the MP4 file reproduction unit 202 determines whether to end reproduction. When it is determined that reproduction is not to end, the process returns to step S171 to repeat processing in step S171 and subsequent steps.

When it is determined in step S189 that reproduction is to end after completion of processing from S171 to S189 in an appropriate manner for each sample, the MP4 file reproduction process ends.

The file reproduction device 200 reproduces MP4 files having the configuration illustrated in FIGS. 15 and 16, and allows control of distribution for each tile in the enhancement layer as well as in the base layer by performing the MP4 file reproduction process described above. Accordingly, a partial image (such as tile) of an image in each layer of an image constituted by a plurality of layers is adaptively provided in image distribution.

<Flow of MPD Reproduction Process>

Figure 24:
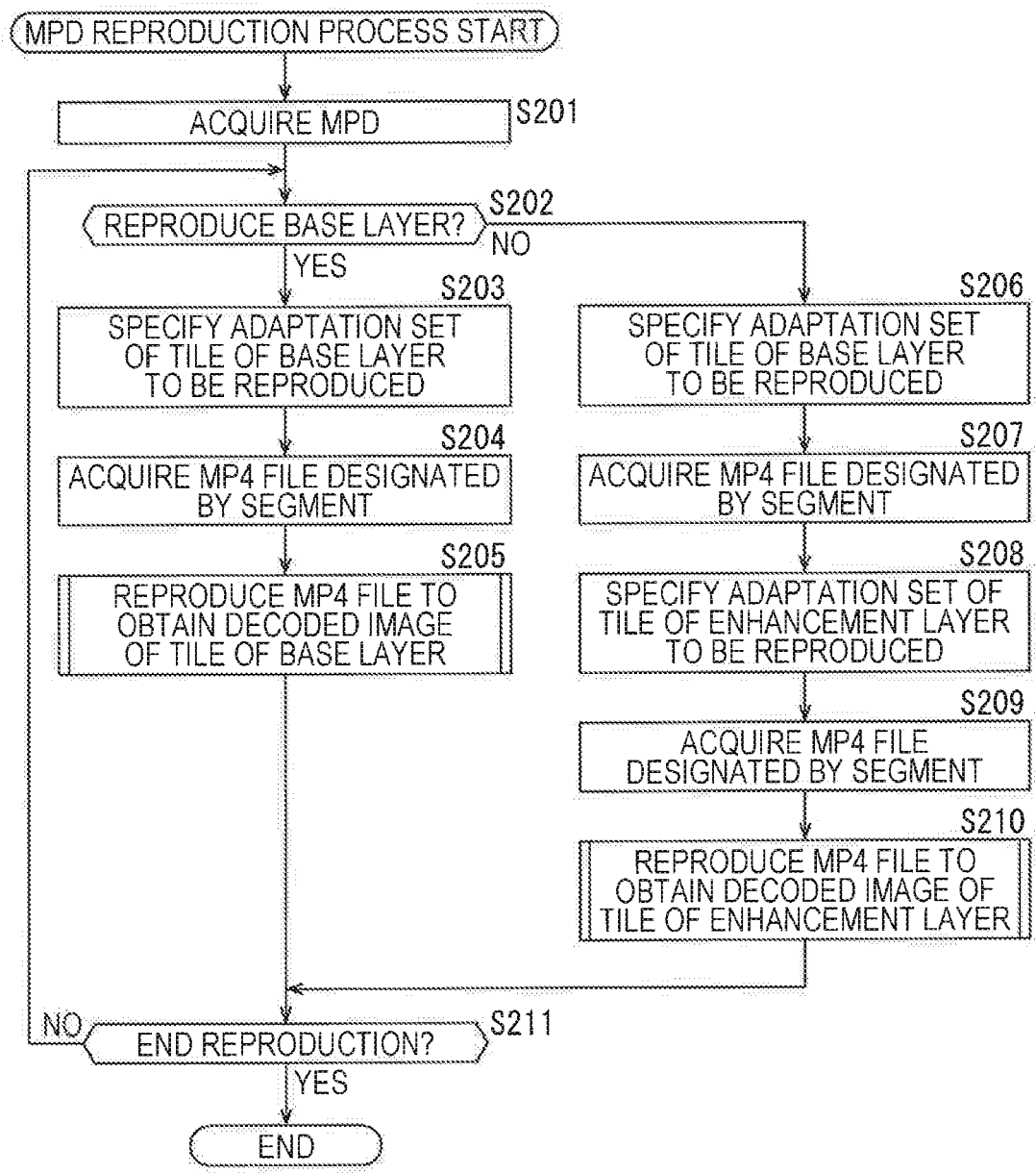
FIG. 24 is a flowchart showing an example of a flow of an MPD reproduction process.

The file reproduction device 200 illustrated in FIG. 22 performs an MPD reproduction process to reproduce input MPD and generate a decoded image of an arbitrary layer, A flow of the MPD reproduction process is now described with reference to a flowchart shown in FIG. 24.

With a start of the MPD reproduction process, the MPD analysis unit 201 acquires MPD in step S201.

In step S202, the MPD analysis unit 201 determines whether to reproduce a base layer. When it is determined that the base layer is to be reproduced, the process proceeds to step S203.

In step S203, the MPD analysis unit 201 specifies an adaptation set of a tile of the base layer to be reproduced.

In step S204, the MPD analysis unit 201 allows the MP4 file reproduction unit 202 to acquire an MP4 file designated by a segment belonging to the specified adaptation set.

Figure 23:
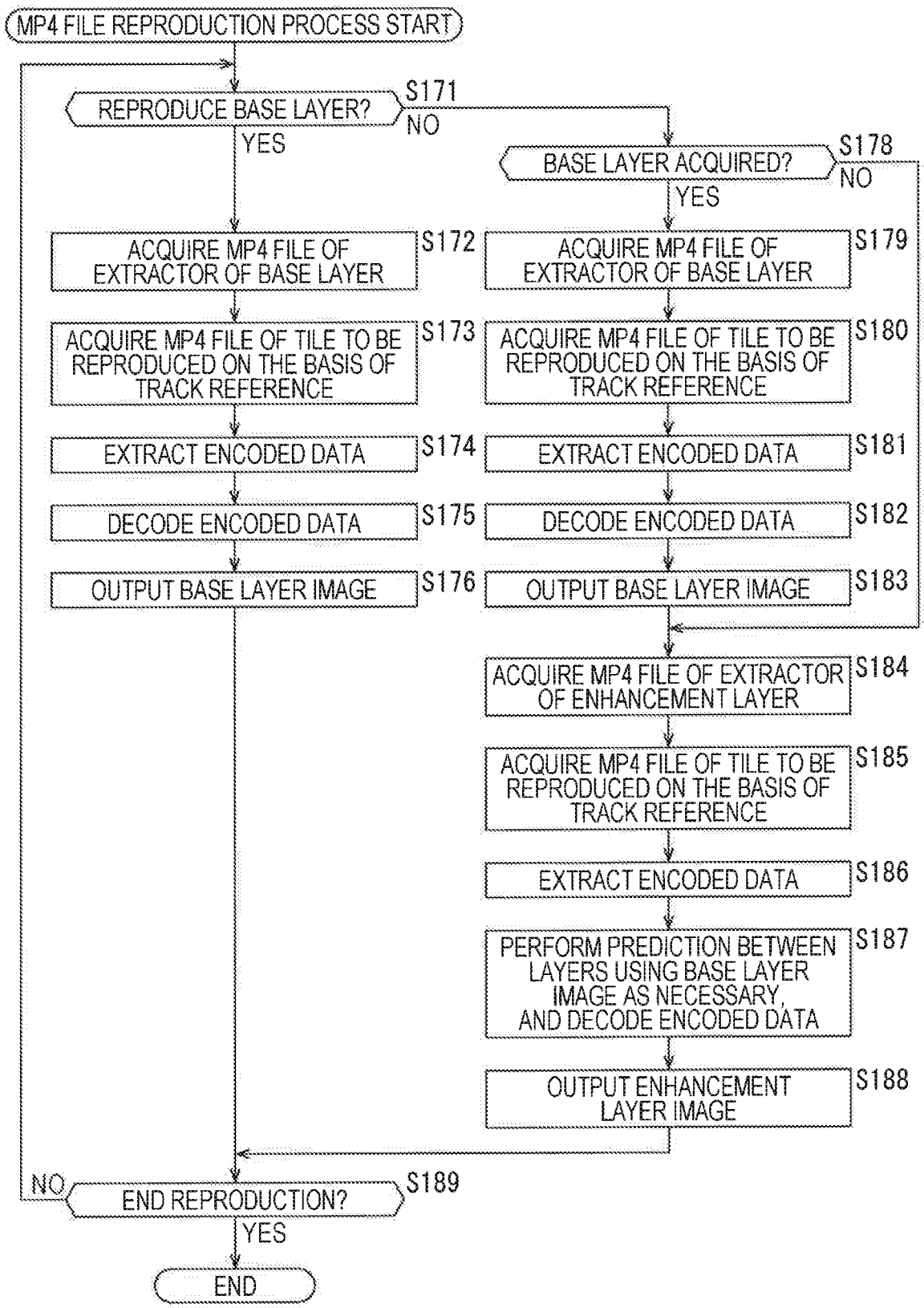
FIG. 23 is a flowchart showing an example of a flow of an MP4 file reproduction process.

In step S205, the MP4 file reproduction unit 202 and the base layer decoding unit 203 reproduce the acquired MP4 file to obtain a decoded image of a tile of the base layer. According to this process, the processing from step S172 to step S176 in FIG. 23 is performed. After completion of processing in step S205, the process proceeds to step S211.

On the other hand, when it is determined in step S202 that an enhancement layer is to be reproduced, the process proceeds to step S206.

Processing in step S206 and step S207 is performed similarly to the processing in step S203 and step S204.

In step S208, the MPD analysis unit 201 specifies an adaptation set of a tile of the enhancement layer to be reproduced.

In step S209, the MPD analysis unit 201 allows the 824 file reproduction unit 202 to acquire an MP4 file designated by a segment belonging to the specified adaptation set.

In step S210, the 824 file reproduction unit 202 to the enhancement layer decoding unit 204 reproduce the acquired 124 file to obtain a decoded image of a tile of the enhancement layer. According to this processing, the processing tram step S178 to step S188 in FIG. 23 is performed. After completion of processing in step S210, the process proceeds to step S211.

In step S211, the MPD analysis unit 201 determines whether to end reproduction. When it is determined that reproduction is not to end, the process returns to step S202 to repeat processing in step S202 and subsequent steps.

When it is determined in step S211 that reproduction is to end after completion of processing from step S202 to step S211 in an appropriate manner for each sample, the MPD reproduction process ends.

The file reproduction device 200 reproduces MPD having a configuration illustrated in FIGS. 18 and 19, and allows control of distribution for each tile in the enhancement layer as well as in the base layer by performing the MPD reproduction process as described above. Accordingly, a partial image (such as tile) of an image in each layer of an image constituted by a plurality of layers is adaptively provided in image distribution.

<2. Second Embodiment>
<Reference to Base Layer>

Figure 25:
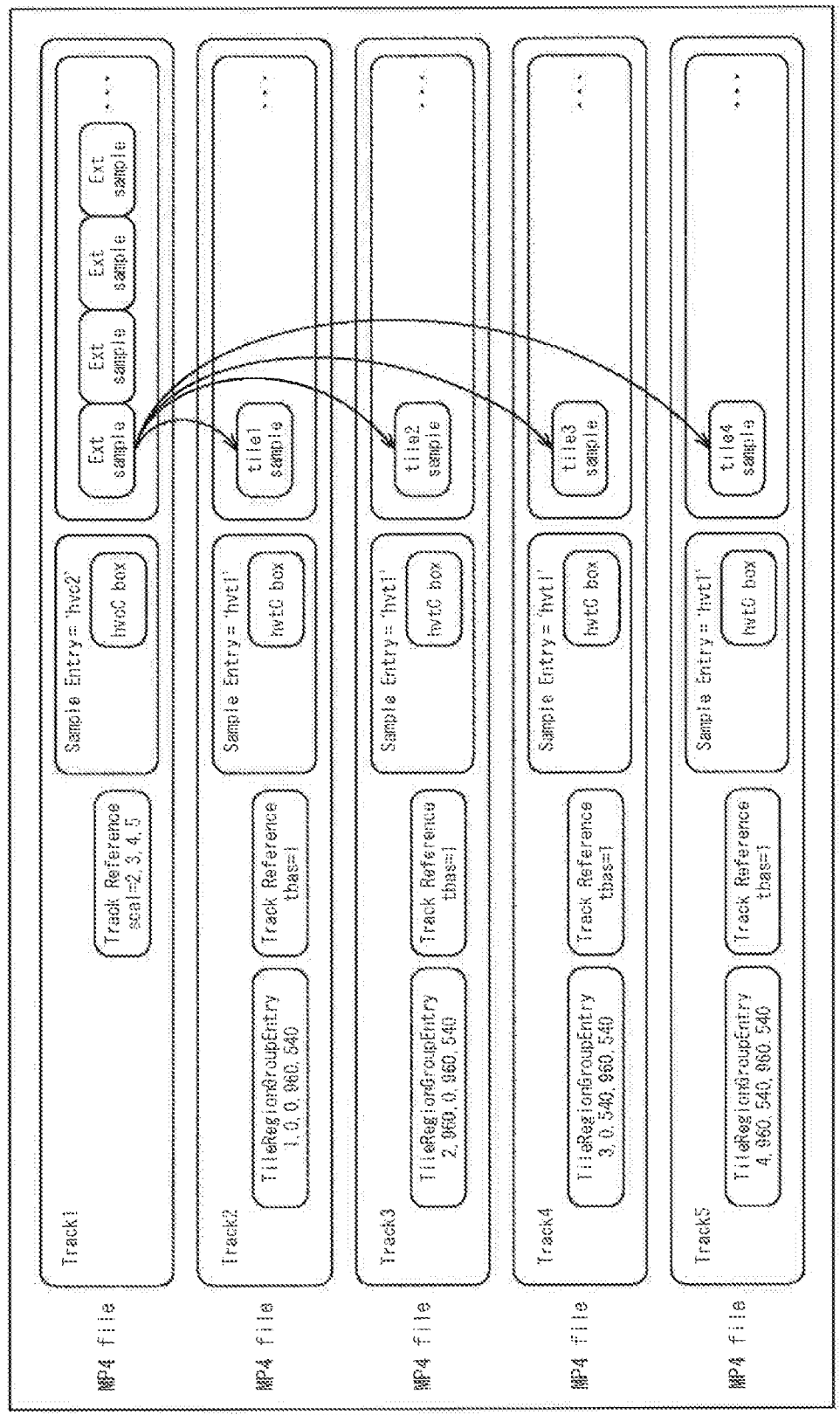
FIG. 25 is a view illustrating a different configuration example of MP4 files.
Figure 26:
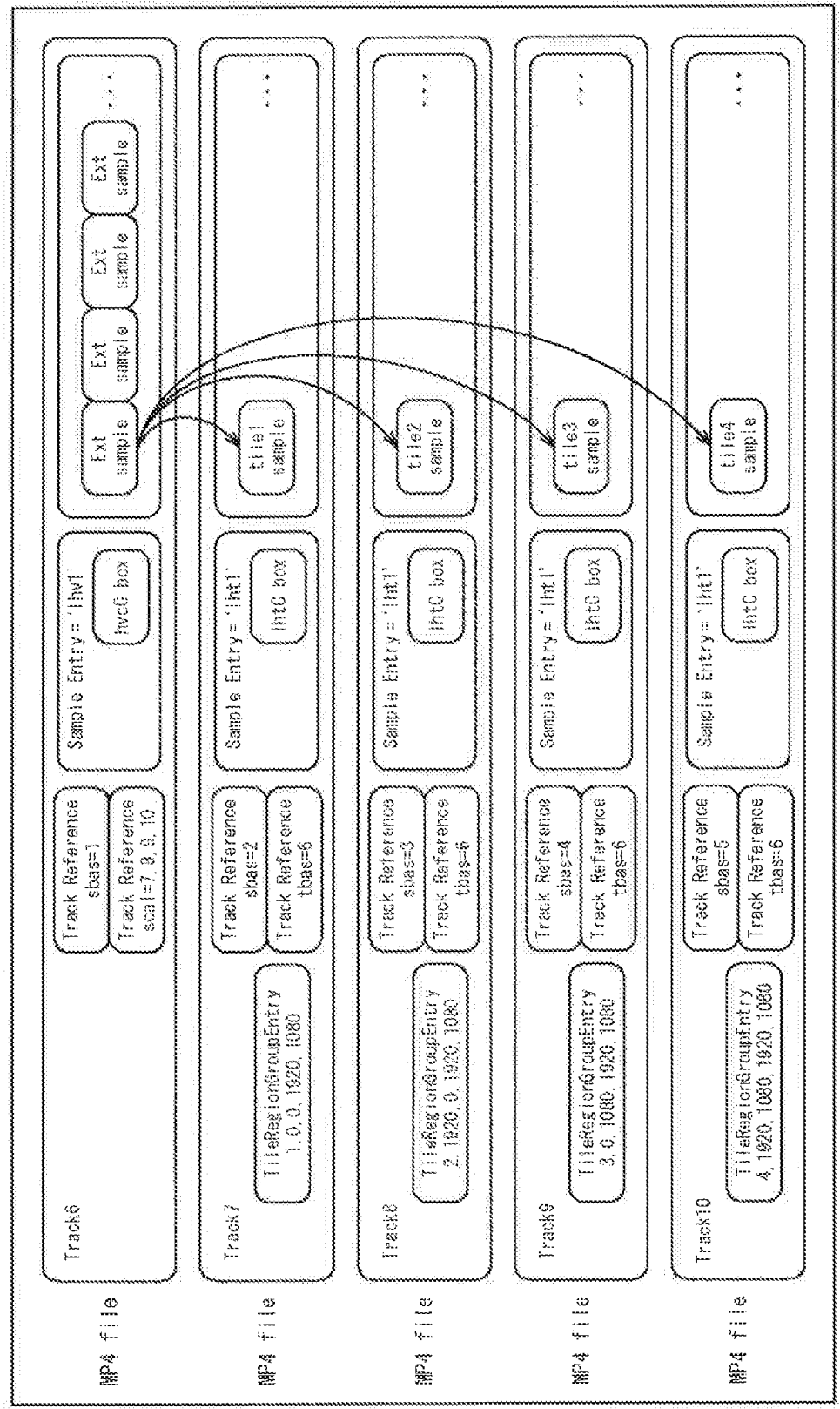
FIG. 26 is a view illustrating the different configuration example of MP4 files.

A configuration for reference from each tile of an enhancement layer to each tile of a base layer may be adopted. FIGS. 25 and 26 illustrate a different configuration example of MP4 files.

In this case, a track reference for reference to a base layer is added to the track of each tile of the enhancement layer in the configuration illustrated in FIGS. 15 and 16.

For example, a track reference (Track Reference) of a track 7 in FIG. 26 indicates reference to the track 2 by a reference type of "sbas" (sbas=2). A track reference (Track Reference) of a track 8 indicates reference to the track 3 by a reference type "sbas" (sbas=3). A track reference (Track Reference) of a track 9 indicates reference to the track 4 by a reference type "sbas" (sbas=4). A track reference (Track Reference) of a track 10 indicates reference to the track 5 by a reference type "sbas" (sbas=5).

Accordingly, this configuration allows reference to tracks of corresponding tiles of the base layer from respective tracks storing tiles of the enhancement layer.

<Flow of MP4 File Generation Process>

An example of a flow of an MP4 file generation process in this configuration example is now described with reference to a flowchart shown in FIG. 27.

Figure 27:
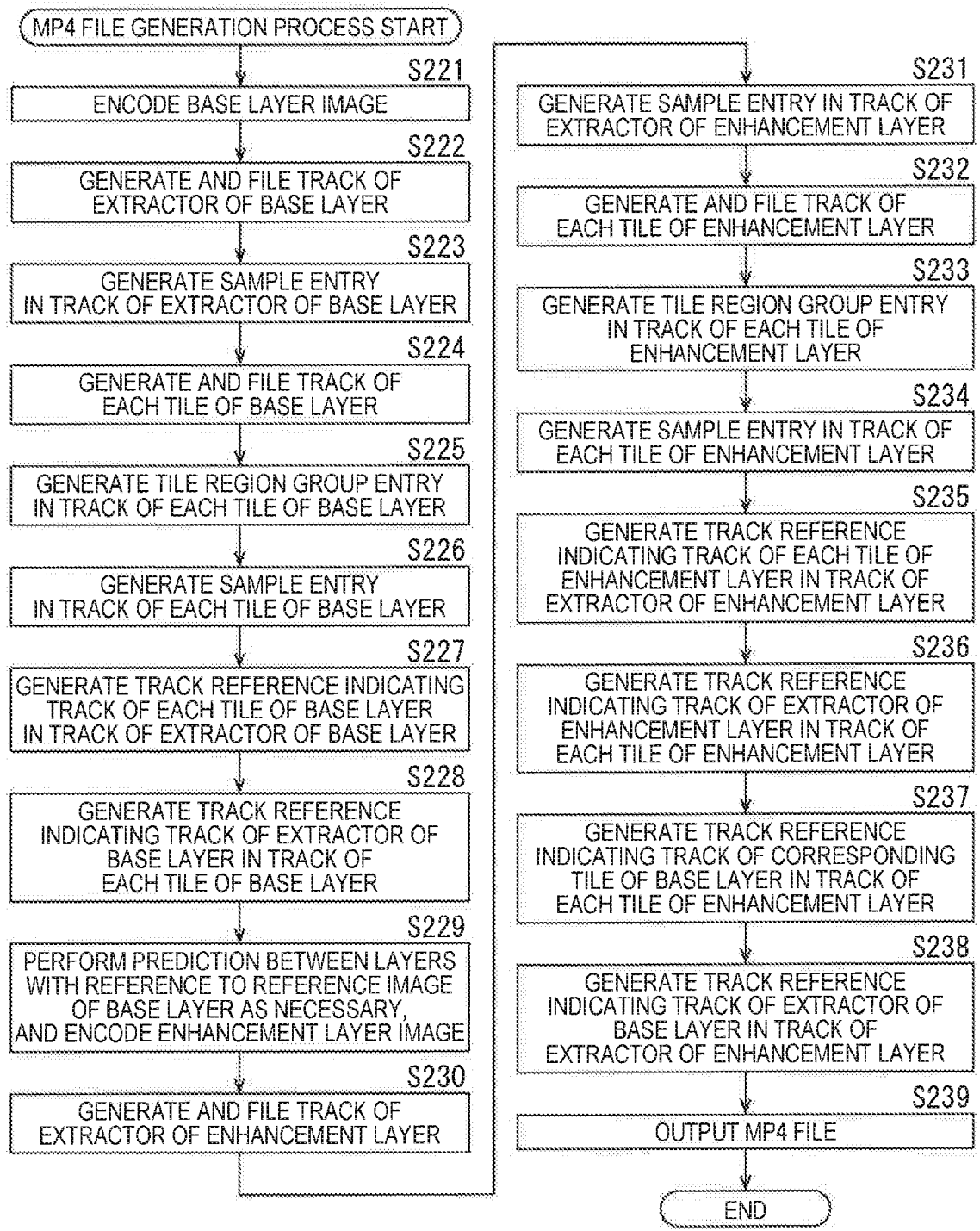
FIG. 27 is a flowchart showing a different example of the flow of the MP4 file generation process.

Processing from step S221 to step S236 in FIG. 27 is performed similarly to the processing from step S101 to step S116 in FIG. 17.

In step S237, the MP4 file generation unit 103 generates a track reference indicating a track of a corresponding tile of the base layer in a track of each tile of the enhancement layer.

The processing from step S238 and step S239 in FIG. 27 is performed similarly to the processing from step S117 and step S118 in FIG. 17.

The file generation device 100 generates MP4 files having the configuration illustrated in FIGS. 25 and 26, and allows control of distribution for each tile in the enhancement layer as well as in the base layer by performing the MP4 file generation process described above. Accordingly, a partial image (such as tile) of an image in each layer of an image constituted by a plurality of layers is adaptively provided in image distribution.

<Configuration Example of MPD>

Figure 28:
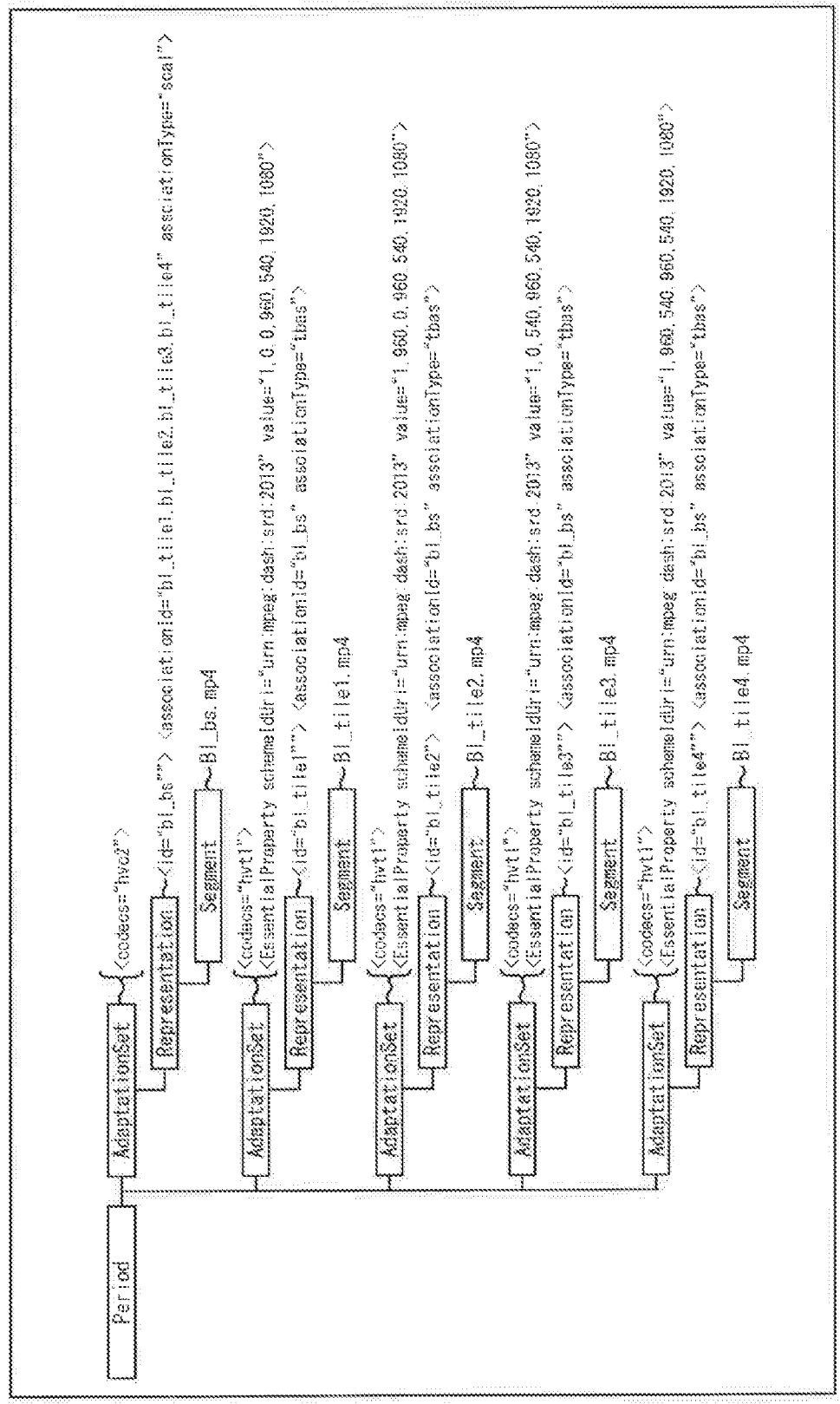
FIG. 28 is a view illustrating a different example of MPD.
Figure 29:
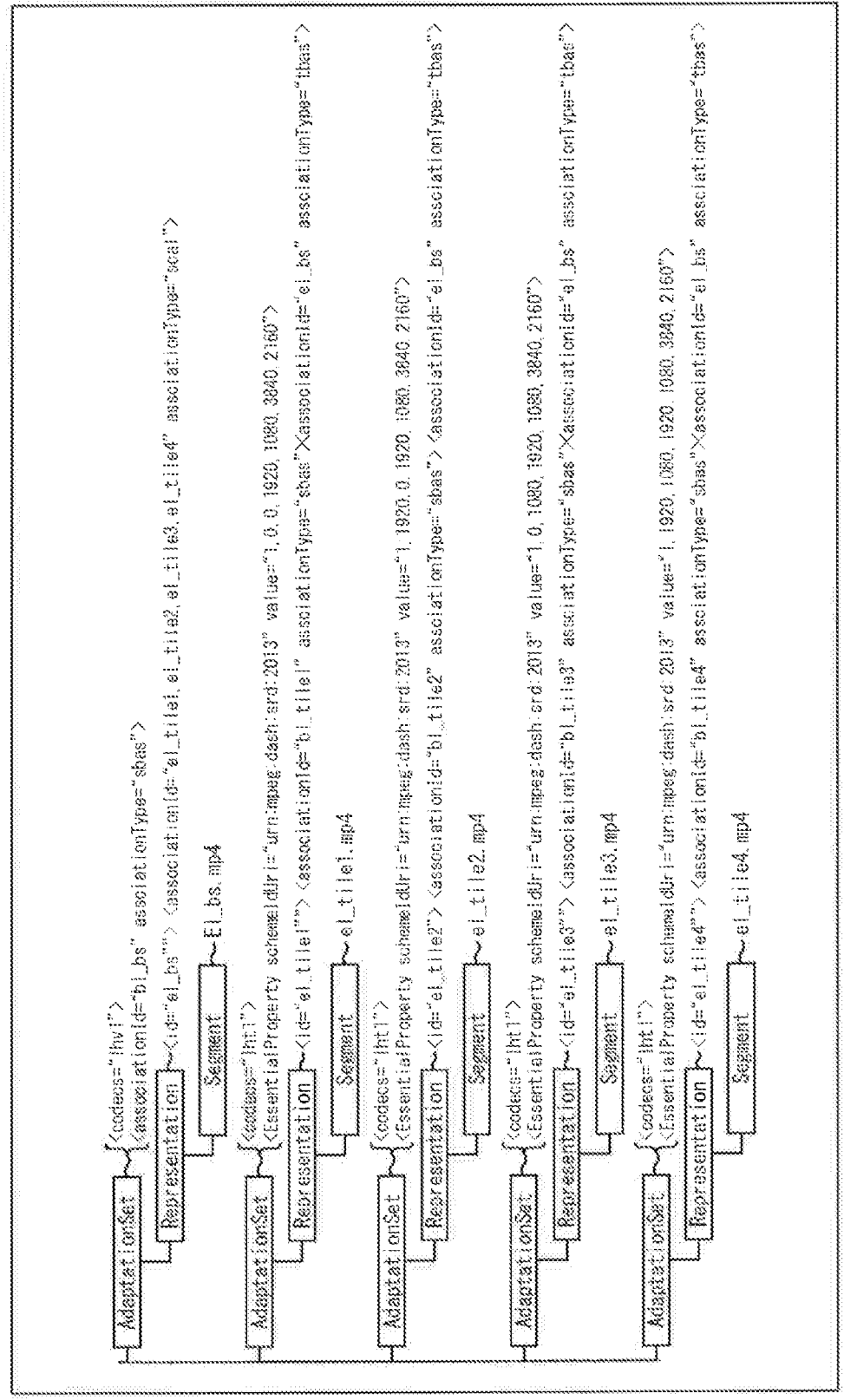
FIG. 29 is a view illustrating the different example of MPD.

The MPD generation unit 104 of the file generation device 100 generates MPD having a configuration illustrated in FIGS. 28 and 29, for example, from MP4 files generated by the MP4 file generation unit 103 in the manner described above.

In this case, association information for reference to the base layer is added to a representation of each tile of an enhancement layer in the configuration illustrated in FIGS. 18 and 19.

For example, association information shown below for indicating a reference relationship with an adaptation set of a tile 1 of a base layer is set in a representation of a tile 1 of the enhancement layer illustrated in FIG. 29.

<associationid="bl_tile1" associationType="sbas">

Similarly, association information shown below for indicating a reference relationship with an adaptation set of a tile 2 of the base layer is set in a representation of a tile 2 of the enhancement layer.

<associationid="bl_tile2" associationType="sbas">

Similarly, association information shown below for indicating a reference relationship with an adaptation set of a tile 3 of the base layer is set in a representation of a tile 3 of the enhancement layer.

<associationid="bl_tile3" associationType="sbas">

Similarly, association information shown below for indicating a reference relationship with an adaptation set of a tile 4 of the base layer is set in a representation of a tile 4 of the enhancement layer.

<associationid="bl_tile4" associationType="sbas">

Accordingly, this configuration allows reference to an adaptation set of a corresponding tile of the base layer from an adaptation set of a tile of the enhancement layer.

<Flow of MPD Generation Process>

An example of a flow of this MPD generation process is now described with reference to a flowchart shown in FIGS. 30 and 31.

Figure 30:
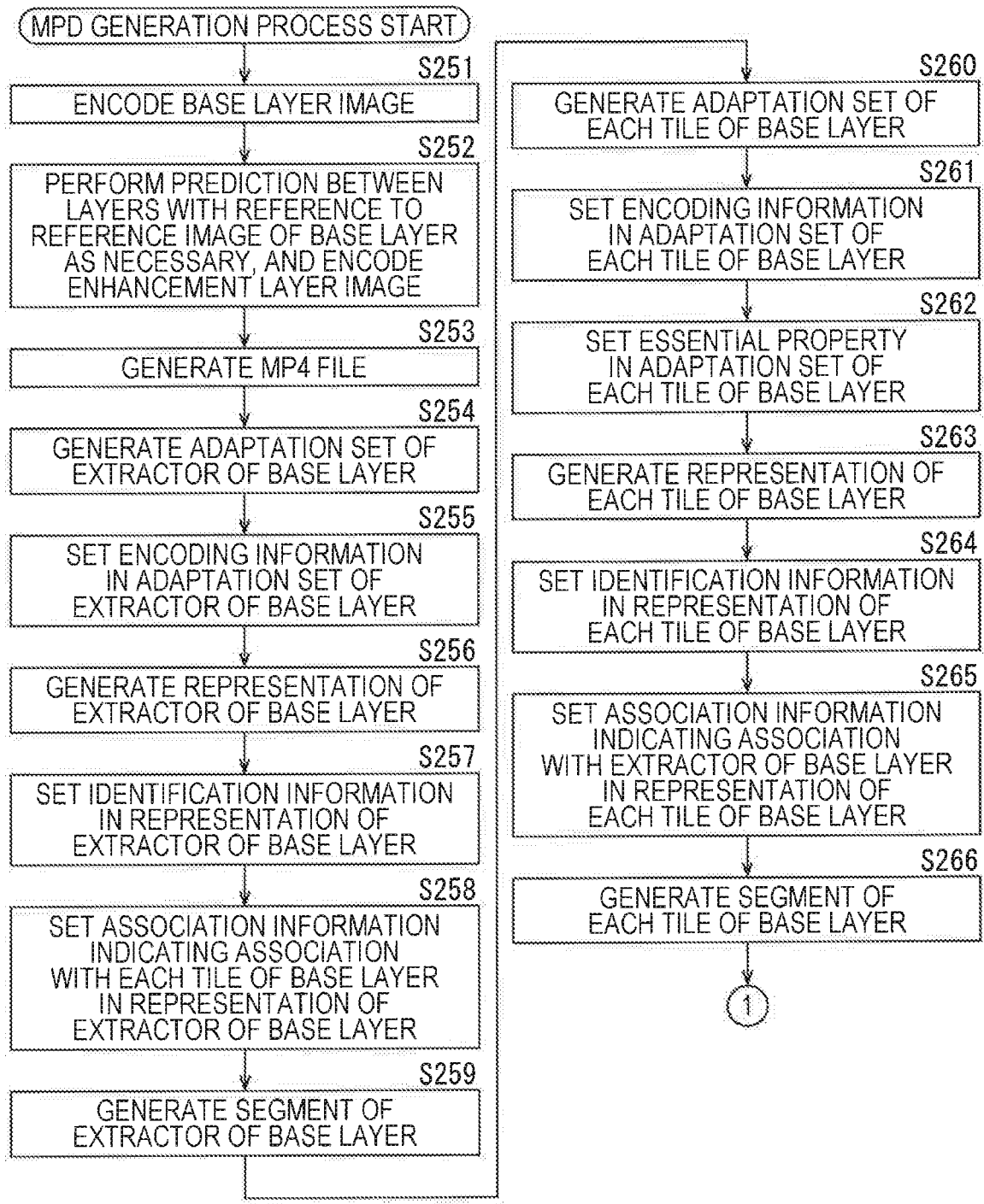
FIG. 30 is a flowchart showing a different example of a flow of the MPD generation process.

Processing from step S251 to step S266 in FIG. 30 is performed similarly to the processing from step S121 to step S136 in FIG. 20.

Figure 31:
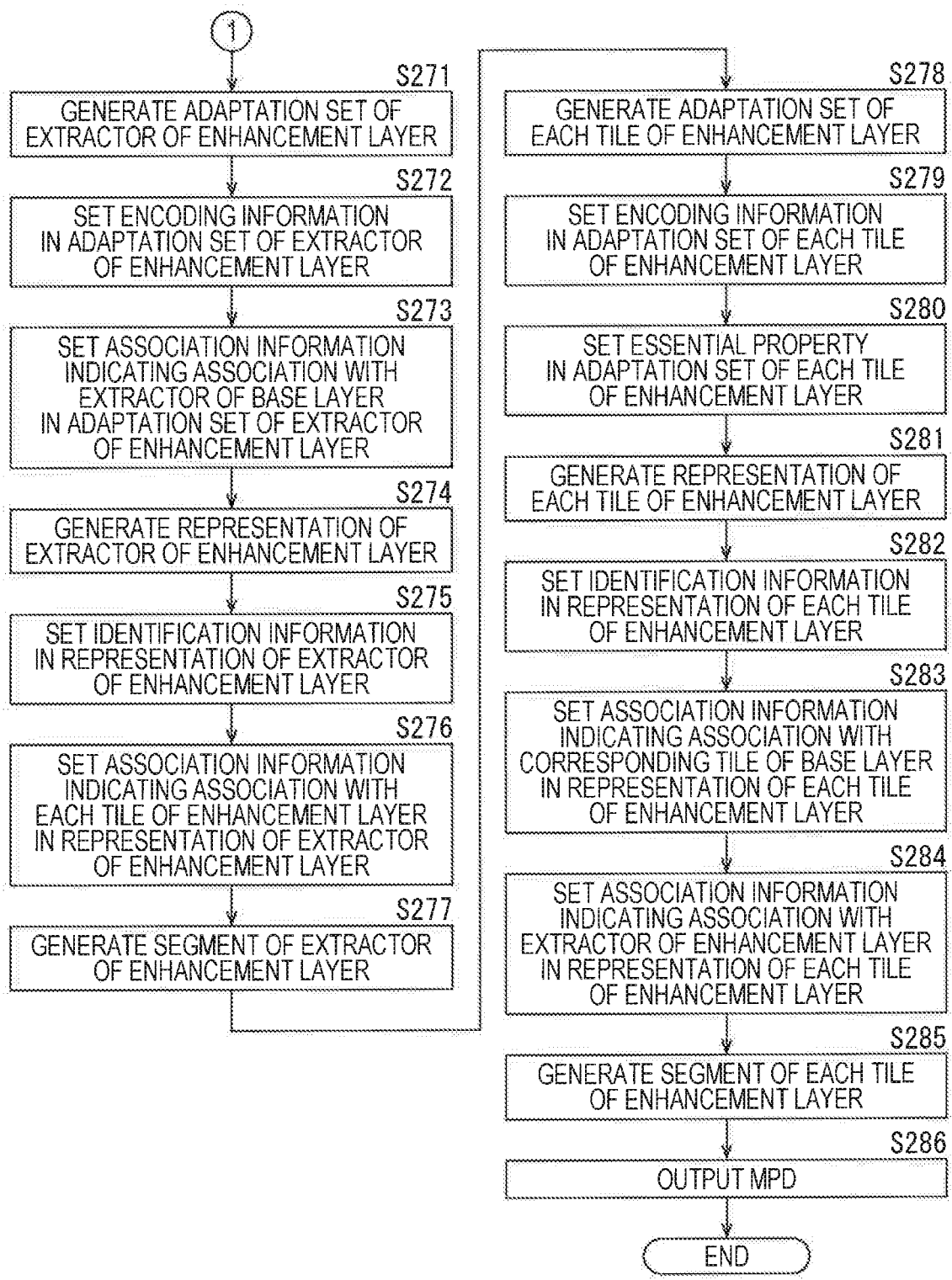
FIG. 31 is a flowchart showing the different example of the flow of the MPD generation process, continuing from FIG. 30.

In addition, processing from step S271 to step S282 in FIG. 31 is performed similarly to the processing from step S141 to step S152 in FIG. 21.

In step S283 in FIG. 31, the MPD generation unit 104 sets association information with a corresponding tile of a base layer in a representation of each tile of an enhancement layer.

Processing from step S284 to step S286 in FIG. 31 is performed similarly to the processing from step S153 to step S155 in FIG. 21.

The file generation device 100 generates MPD haying the configuration illustrated in FIGS. 28 and 29, and allows control of distribution for each the in the enhancement layer as well as in the base layer by performing the MPD generation process described above, Accordingly, a partial image (such as tile) of an image in each layer of an image constituted by a plurality of layers is adaptively provided in image distribution.

Note that the MP4 file reproduction process and the MPD reproduction process, which are performed similarly to the corresponding processes in the first embodiment, are not repeatedly explained herein.

<3. Third Embodiment>
<Filing for Each Layer>

Figure 32:
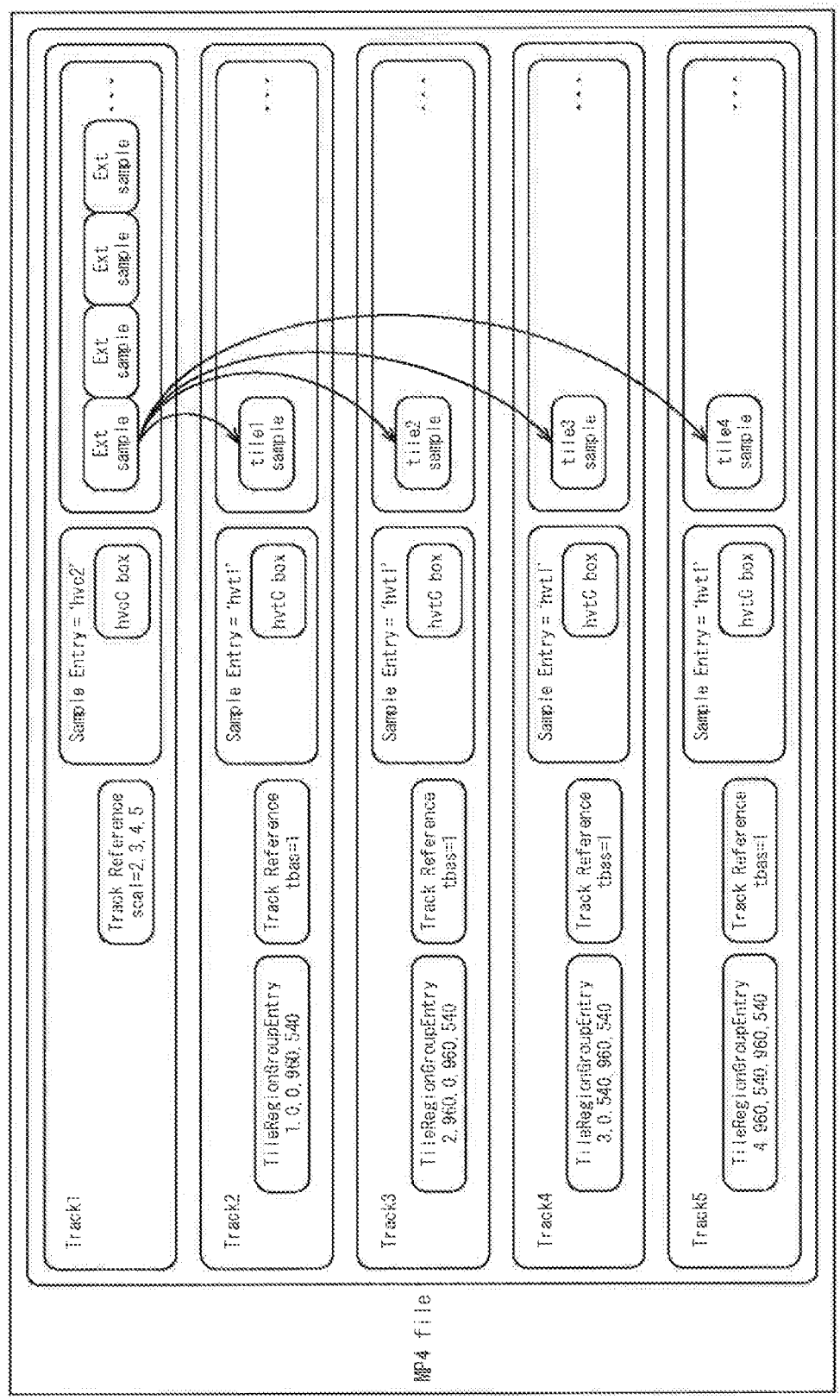
FIG. 32 is a view illustrating a further configuration example of MP4 files.
Figure 33:
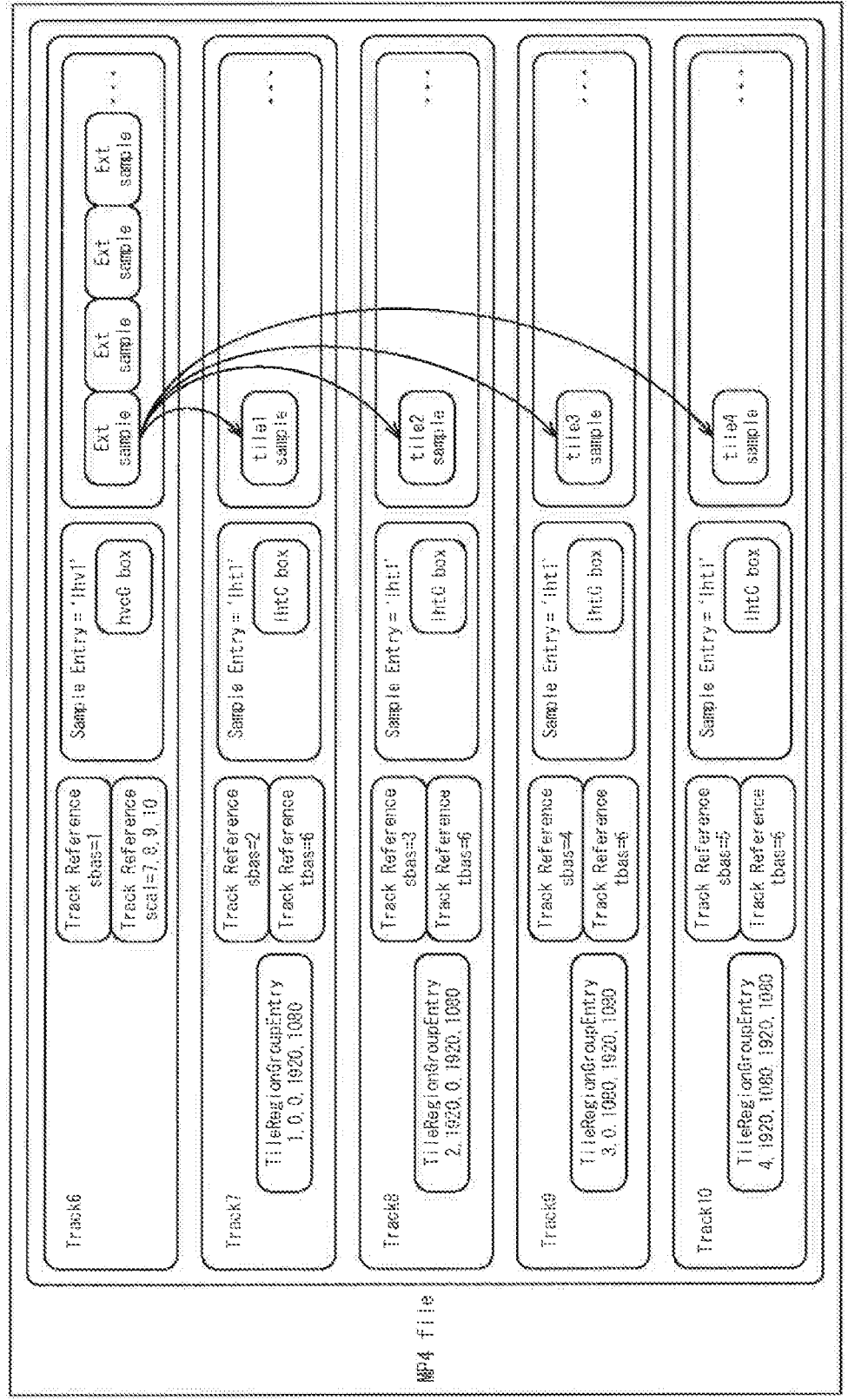
FIG. 33 is a view illustrating the further configuration example of MP4 files.

FIGS. 32 and 33 illustrate a different configuration example of MP4 files. As illustrated in these figures, MP4 files may be filed for each layer, for example. According to the example illustrated in FIG. 32, respective tracks storing information on a base layer (tracks 1 through 5) are stored in one MP4 file. On the other hand, in case of the example illustrated in FIG. 33, respective tracks storing information on an enhancement layer (tracks 6 through 10) are stored in one MP4 file. An internal configuration in each track is similar to the corresponding configuration in the second embodiment (FIGS. 25 and 26). Needless to say, an internal configuration in each track may have a configuration similar to the corresponding configuration in the first embodiment (FIGS. 15 and 16).

<Flow of MP4 File Generation Process>

An example of a flow of an MP4 file generation process in this configuration example is now described with reference to a flowchart shown in FIG. 34.

Processing in step S301 is performed similarly to the processing in step S221 in FIG. 27.

In step S302, the MP4 file generation unit 103 generates a track of an extractor of a base layer.

Processing in step S303 is performed similarly to the processing in step S223 in FIG. 27.

In step S304, the MP4 file generation unit 103 generates a track of each tile of the base layer.

Processing from step S305 to step S308 is performed similarly to the processing from step S225 to step S228 in FIG. 27.

In step S309, the MP4 file generation unit 103 collectively files the respective tracks of the base layer. In other words, the MP4 file generation unit 103 stores the respective tracks of the base layer in one file.

Processing in step S310 is performed similarly to the processing in step S229 in FIG. 27.

In step S311, the MP4 file generation unit 103 generates a track of an extractor of an enhancement layer.

Processing in step S312 is performed similarly to the processing in step S231 in FIG. 27.

In step S313, the MP4 file generation unit 103 generates a track of each tile of the enhancement layer.

Processing from step S314 to step S319 is performed similarly to the processing from step S233 to step S238 in FIG. 27.

In step S320 the MP4 file generation unit 103 collectively files the respective tracks of the enhancement layer. In other words, the MP4 file generation unit 103 stores the respective tracks of the enhancement layer in one file.

Processing in step S321 is performed similarly to the processing in step S239 in FIG. 27.

The file generation device 100 generates MP4 files having the configuration illustrated in FIGS. 32 and 33, and allows control of distribution for each tile in the enhancement layer as well as in the base layer by performing the MP4 file generation process described above. Accordingly, a partial image (such as tile) of an image in each layer of an image constituted by a plurality of layers is adaptively provided in image distribution.

<Configuration Example of MPD>

Figure 35:
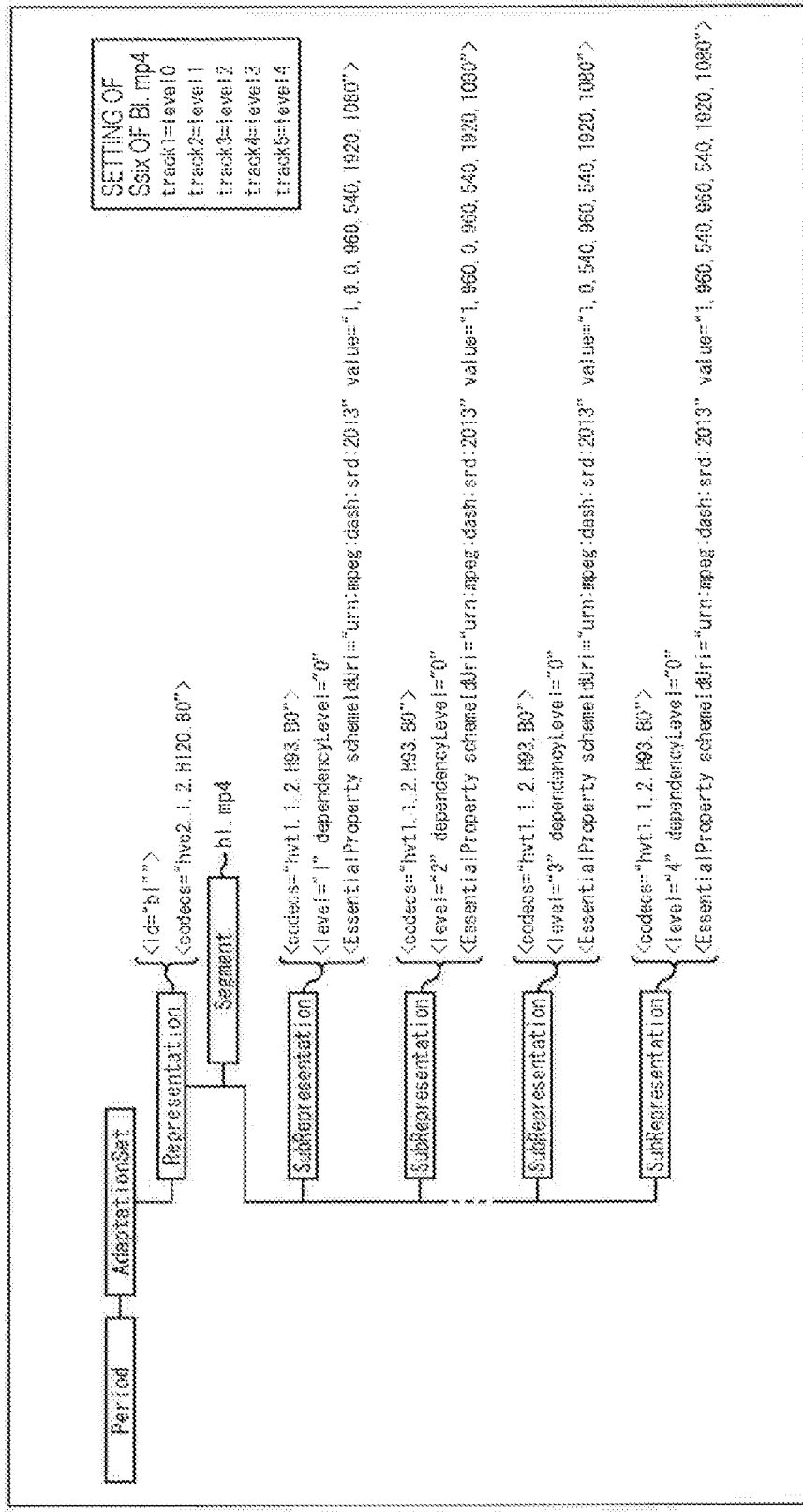
FIG. 35 is a view illustrating a further configuration example of MPD.
Figure 36:
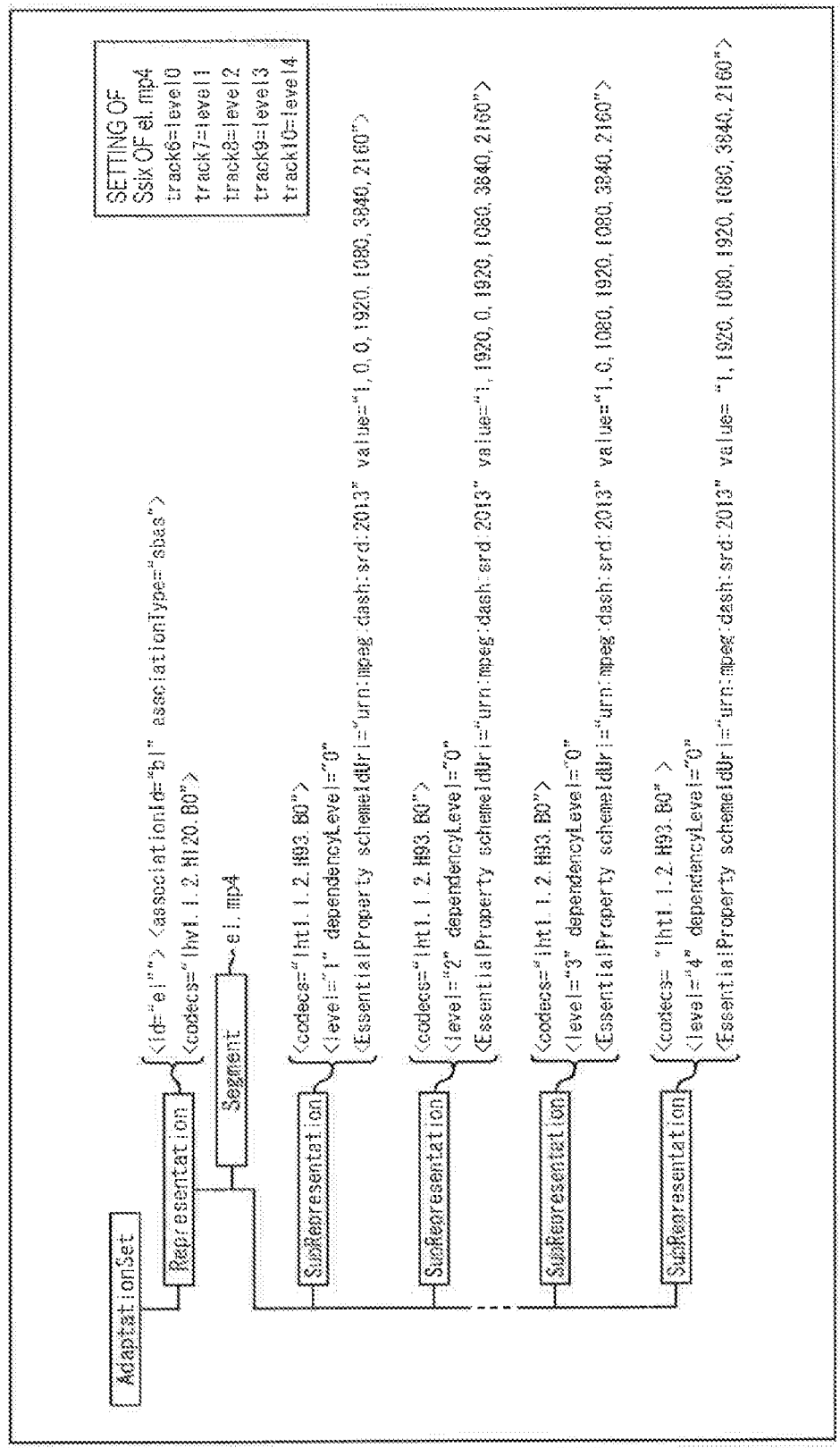
FIG. 36 is a view illustrating the further configuration example of MPD.

The MPD generation unit 104 of the file generation device 100 generates MPD having a configuration illustrated in FIGS. 35 and 36, for example, from MP4 files generated by the MP4 file generation unit 103 in the manner described above.

In this case, the MP4 files are filed for each layer, wherefore an adaptation set is generated for each layer in MPD.

According to an adaptation set of a base layer, a representation containing information on the whole of the base layer is set in an order below the adaptation set as illustrated in FIG. 35. An MP4 file of the base layer (bl.mp4) is set (registered) in a segment in an order below the representation. Information on each tile is set in a sub representation provided in an order below the representation.

A configuration of an enhancement layer illustrated in FIG. 36 is similar to the configuration illustrated in FIG. 35.

<Flow of MPD Generation Process>

Figure 37:
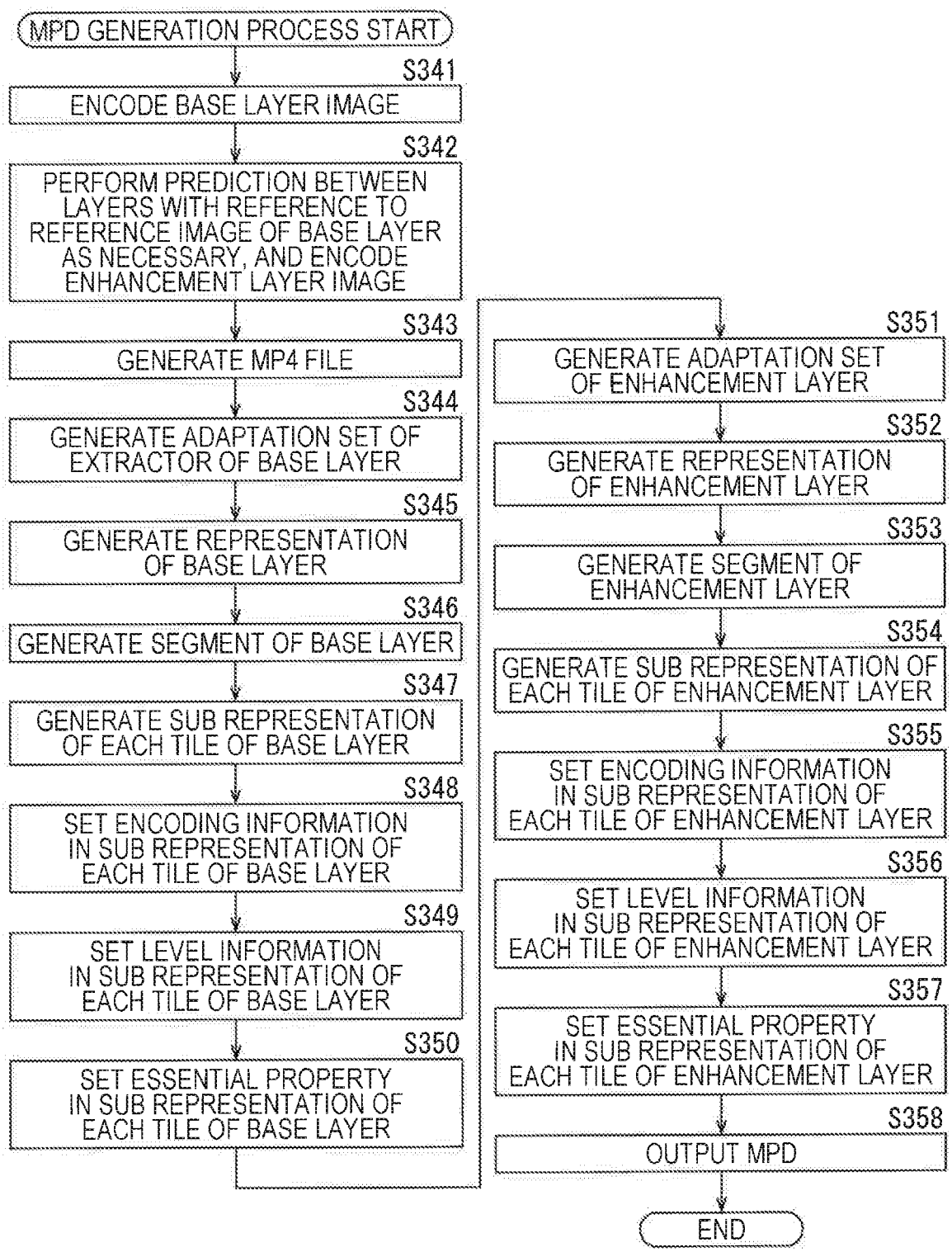
FIG. 37 is a flowchart showing a further example of the flow of the MPD generation process.

An example of a flow of an MPD generation process in this configuration example is now described with reference to a flowchart shown in FIG. 37.

Processing from step S341 to step S343 is performed similarly to the processing from step S251 to step S253 in FIG. 30.

In step S344, the MPD generation unit 104 generates an adaptation set of a base layer.

In step S345, the MPD generation unit 104 generates a representation of the base layer.

In step S346, the MPD generation unit 104 generates a segment of the base layer.

In step S347, the MPD generation unit 104 generates a sub representation of each tile of the base layer.

In step S348, the MPD generation unit 104 sets encoding information in the sub representation of each tile of the base layer.

In step S349, the MPD generation unit 104 sets level information in the sub representation of each tile of the base layer.

In step S350, the MPD generation unit 104 sets an essential property in the sub representation of each tile of the base layer.

In step S351, the MPD generation unit 104 generates an adaptation set of an enhancement layer.

In step S352, the MPD generation unit 104 generates a representation of the enhancement layer.

In step S353, the MPD generation unit 104 generates a segment of the enhancement layer.

In step S354, the MPD generation unit 104 generates a sub representation of each tile of the enhancement layer.

In step S355, the MPD generation unit 104 sets encoding information in the sub representation of each tile of the enhancement layer.

In step S356, the MPD generation unit 104 sets level information in the sub representation of each tile of the enhancement layer.

In step S357, the MPD generation unit 104 sets an essential property in the sub representation of each tile of the enhancement layer.

In step S358, the MPD generation unit 104 outputs the MPD thus generated.

The file generation device 100 generates MPD having the configuration illustrated in FIGS. 35 and 36, and allows control of distribution for each tile in the enhancement layer as well as in the base layer by performing the MPD generation process described above. Accordingly, a partial image (such as tile) of an image in each layer of an image constituted by a plurality of layers is adaptively provided in image distribution. <Flow of MP4 File Reproduction Process>

An example of a flow of an MP4 file reproduction process in the foregoing configuration example is now described with reference to a flowchart shown in FIG. 38.

With a start of the MP4 file reproduction process, the MP4 file reproduction unit 202 determines whether to reproduce a base layer in step S371. When it is determined that the base layer is to be reproduced, the process proceeds to step S372.

In step S372, the MP4 file reproduction unit 202 acquires MP4 files of the base layer.

In step S373, the MP4 file reproduction unit 202 specifies a track of a tile to be reproduced on the basis of a track reference of the acquired MP4 files.

In step S374, the MP4 file reproduction unit 202 extracts encoded data on a sample of a processing target from the specified track.

In step S375, the base layer decoding unit 203 decodes the encoded data to generate a decoded image of the base layer (BL image).

In step S376, the base layer decoding unit 203 outputs the decoded image of the base layer (BL image). After completion of processing in step S376, the process proceeds to step S388.

On the other hand, when it is determined in step S371 that an enhancement layer is to be decoded, the process proceeds to step S377.

In step S377, the MP4 file reproduction unit 202 determines whether or not the base layer has been acquired. When it is determined that the base layer has not been acquired yet, the process proceeds to step S378.

Processing from step S378 to step S382 is performed similarly to the processing from step S372 to step S376, When a decoded image of the base layer (BL image) is output after completion of the processing of these steps, the process proceeds to step S383. On the other hand, when it is determined in step S377 that an image of the base layer has been acquired, the process proceeds to step S333.

In step S333, the MP4 file reproduction unit 202 acquires MP4 files of the enhancement layer.

In step S334, the MP4 file reproduction unit 202 acquires a track of a tile to be reproduced on the basis of a track reference of the acquired MP4 files.

In step S385, the MP4 file reproduction unit 202 extracts encoded data of a sample of a processing target from the specified track.

In step S386, the enhancement layer decoding unit 204 performs prediction between layers by using a reference image of the base layer and encoding information as necessary, and decodes the encoded data to generate a decoded image of the enhancement layer (EL image).

In step S387, the enhancement layer decoding unit 204 outputs the decoded image of the enhancement layer (EL image. After completion of processing in step S387, the process proceeds to step S388.

In step S388, the MP4 file reproduction unit 202 determines whether to end reproduction. When it is determined that reproduction is not to end, the process returns to step S371 to repeat processing in step S371 and subsequent steps.

When it is determined in step S388 that reproduction is to end after completion of processing from step S371 to step S388 in an appropriate manner for each sample, the MP4 file reproduction process ends.

The file reproduction device 200 reproduces MP4 files having the configuration illustrated in FIGS. 32 and 33, and allows control of distribution for each tile in the enhancement layer as well as in the base layer by performing the MP4 file reproduction process described above. Accordingly, a partial image (such as tile) of an image in each layer of an image constituted by a plurality of layers is adaptively provided in image distribution.

<Flow of MPD Reproduction Process>

Figure 39:
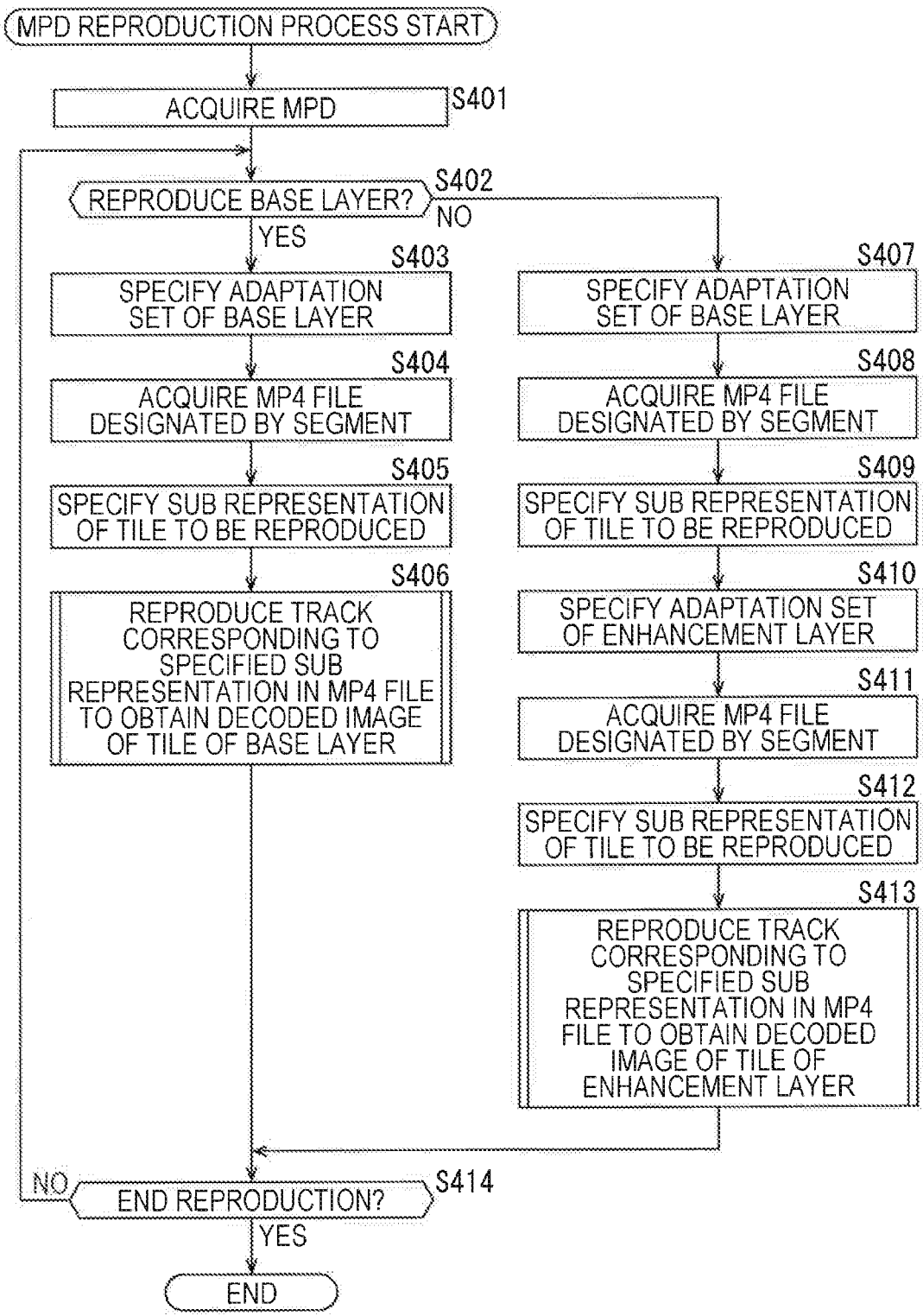
FIG. 39 is a flowchart showing a different example of the flow of the MPD reproduction process.

An example of a flow of an MPD reproduction process in the foregoing configuration example is now described with reference to a flowchart shown in FIG. 39.

With a start of the P92 reproduction process, the MPD analysis unit 201 acquires MPD in step S401.

In step S402, the MPD analysis unit 201 determines whether to reproduce a base layer. When it is determined that the base layer is to be reproduced, the process proceeds to step S403.

In step S403, the MPD analysis unit 201 specifies an adaptation set of the base layer.

In step S404, the MPD analysis unit 201 allows the 1494 file reproduction unit 202 to acquire an MP4 file designated by a segment belonging to the specified adaptation set.

In step S405, the MPD analysis unit 201 specifies a sub representation of a tile to be reproduced.

In step S406, the MP4 file reproduction unit 202 and the base layer decoding unit 203 reproduce a track corresponding to the specified sub representation of the acquired MP4 file to obtain a decoded image of a tile of the base layer. According to this process, the processing from step S372 to step S376 in FIG. 38 is performed. After completion of the step S406, the process proceeds to step S414.

On the other hand, when it is determined in step S402 that an enhancement layer is to be reproduced, the process proceeds to step S407.

Processing from step S407 to step S409 is performed similarly to the processing from step S403 and step S405.

In step S410, the MPD analysis unit 201 specifies an adaptation set of the enhancement layer.

In step S411, the MPD analysis unit 201 allows the MP4 file reproduction unit 202 to acquire an MP4 file designated by a segment belonging to the specified adaptation set.

In step S412, the MPD analysis unit 201 specifies a sub representation of a tile to be reproduced.

In step S413, the MP4 file reproduction unit 202 to the enhancement layer decoding unit 204 reproduce a track corresponding to the specified sub presentation of the acquired MP4 file to obtain a decoded image of a tile of the enhancement layer. According to this process, the processing from step S377 to step S387 in FIG. 38 is performed. After completion of processing in step S413, the process proceeds to step S414.

In step S414, the MPD analysis unit 201 determines whether to end reproduction. When it is determined that reproduction is not to end, the process returns to step S402 to repeat processing in step S402 and subsequent steps.

When it is determined in step S414 that reproduction is to end after completion of processing from step S402 to step S414 in an appropriate manner for each sample, the MPD reproduction process ends.

The file reproduction device 200 reproduces MPD haying the configuration illustrated in FIGS. 35 and 36, and allows control of distribution for each tile in the enhancement layer as well as in the base layer by performing the MPD reproduction process described above. Accordingly, a partial image (such as tile) of an image in each layer of an image constituted by a plurality of layers is adaptively provided in image distribution.

<4. Fourth Embodiment>
<Filing of All Layers>

Figure 40:
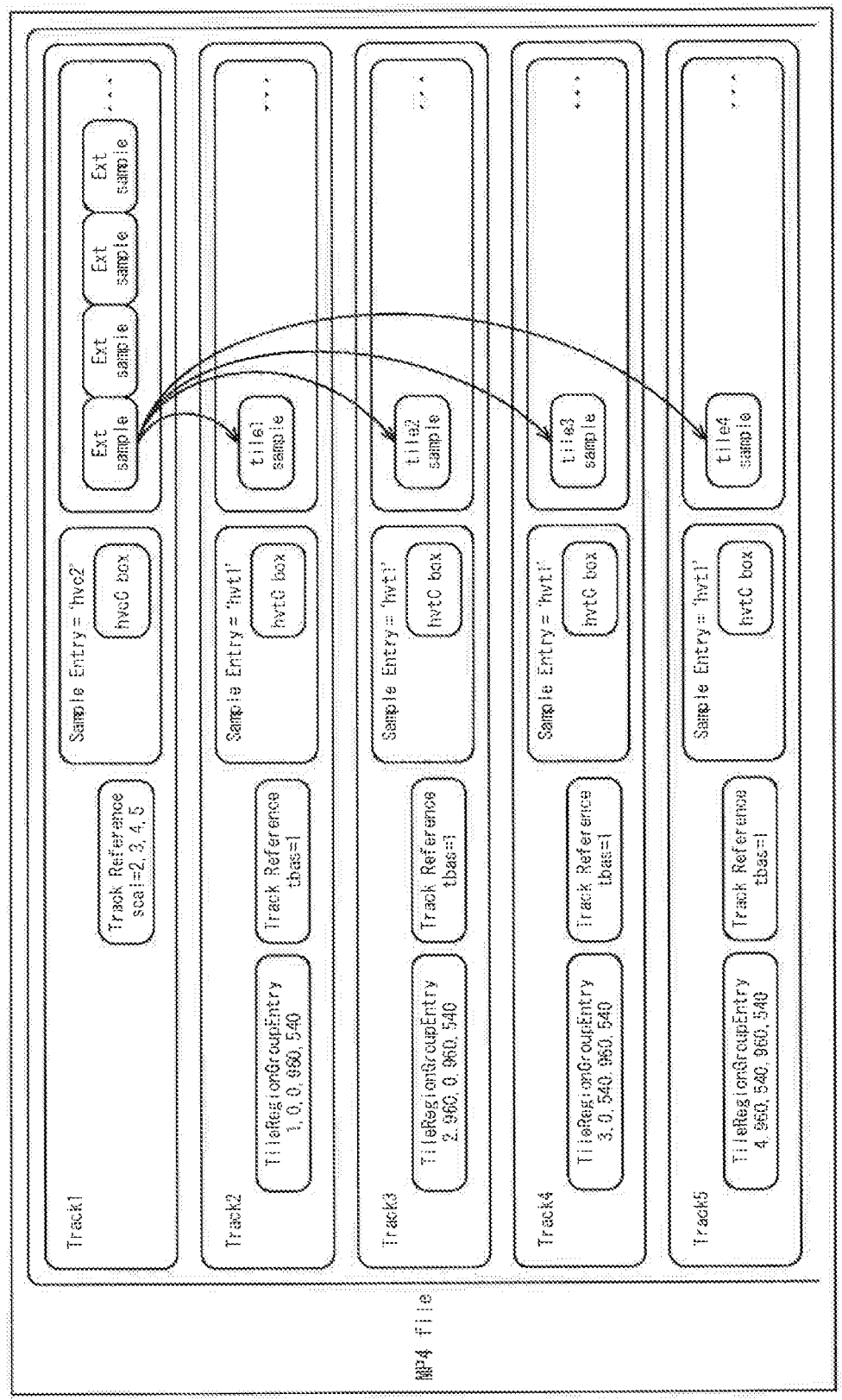
FIG. 40 is a view illustrating a still further example of MP4 files.
Figure 41:
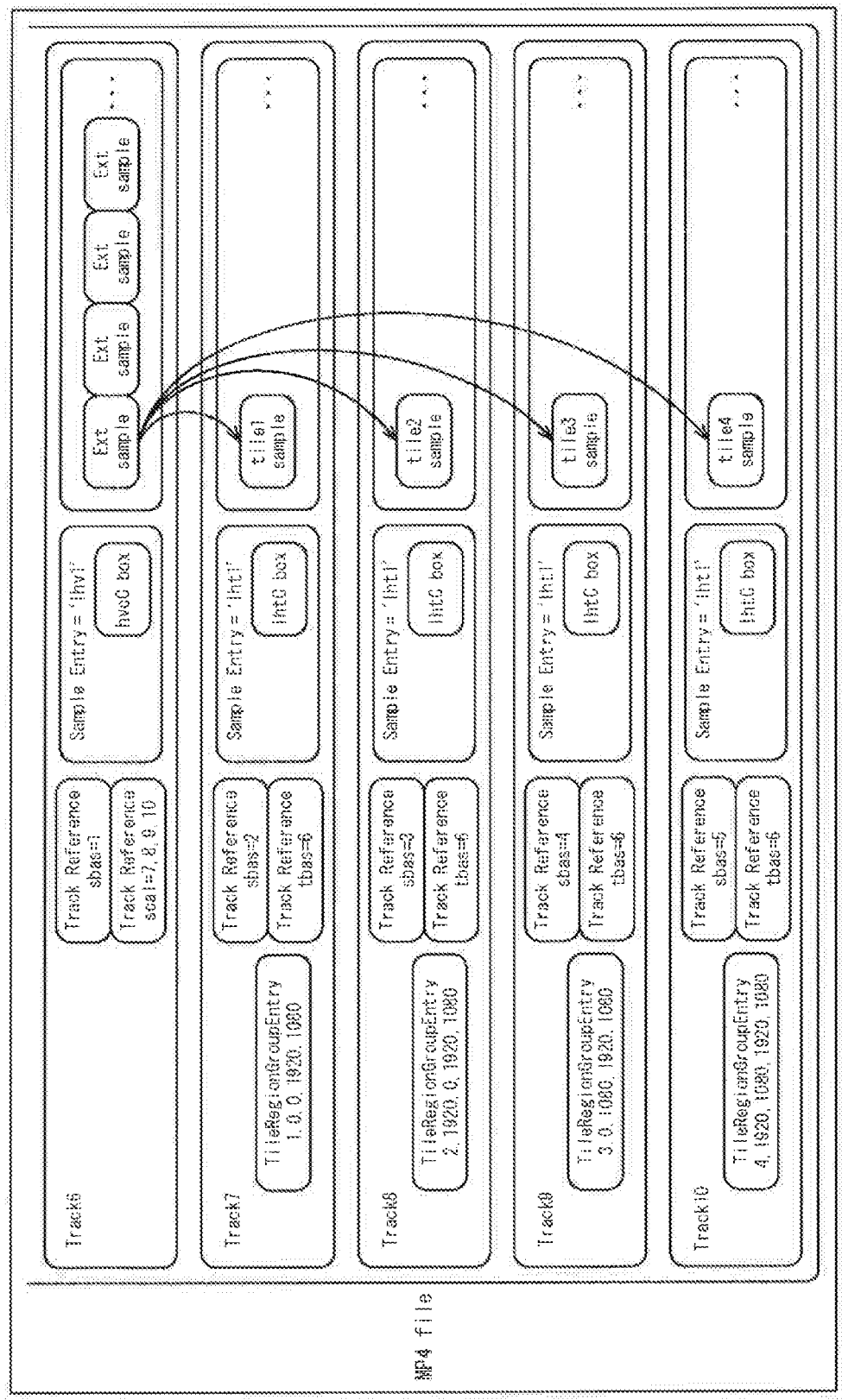
FIG. 41 is a view illustrating the still further example of MP4 files.

FIGS. 40 and 41 illustrate a different configuration example of an MP4 file. As illustrated in these figures, all layers of an MP4 file may be filed as one file. An internal configuration in each track is similar to the corresponding configuration in the second embodiment (FIGS. 25 and 26). Needless to say, an internal configuration in each track may have a configuration similar to the corresponding configuration in the first embodiment (FIGS. 15 and 16).

<Flow of MP4 File Generation Process>

Figure 42:
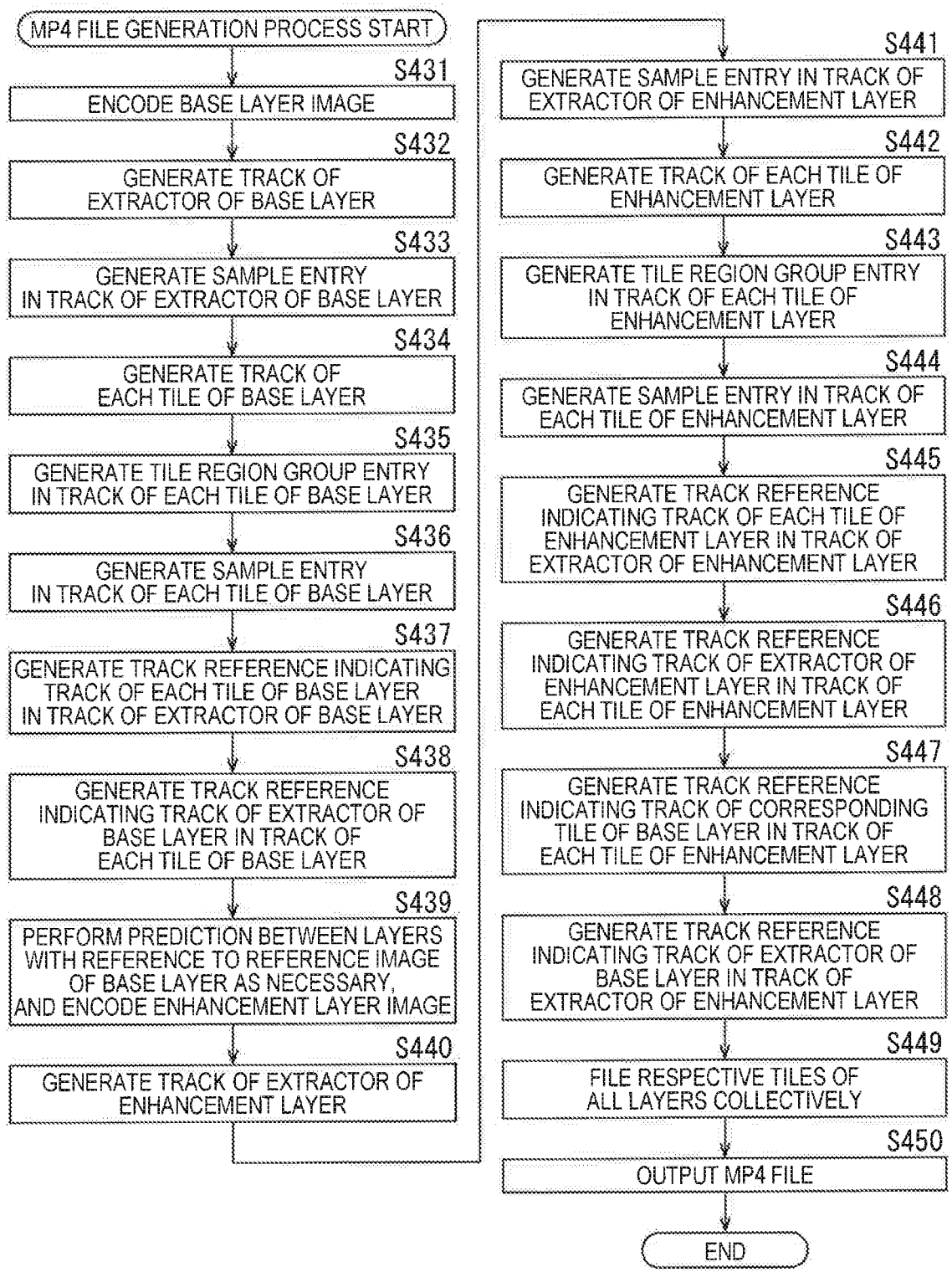
FIG. 42 is a flowchart showing a still further example of the flow of the MP4 file generation process.

An example of a flow of an FF4 file generation process in this configuration example is now described with reference to a flowchart shown in FIG. 42.

Figure 34:
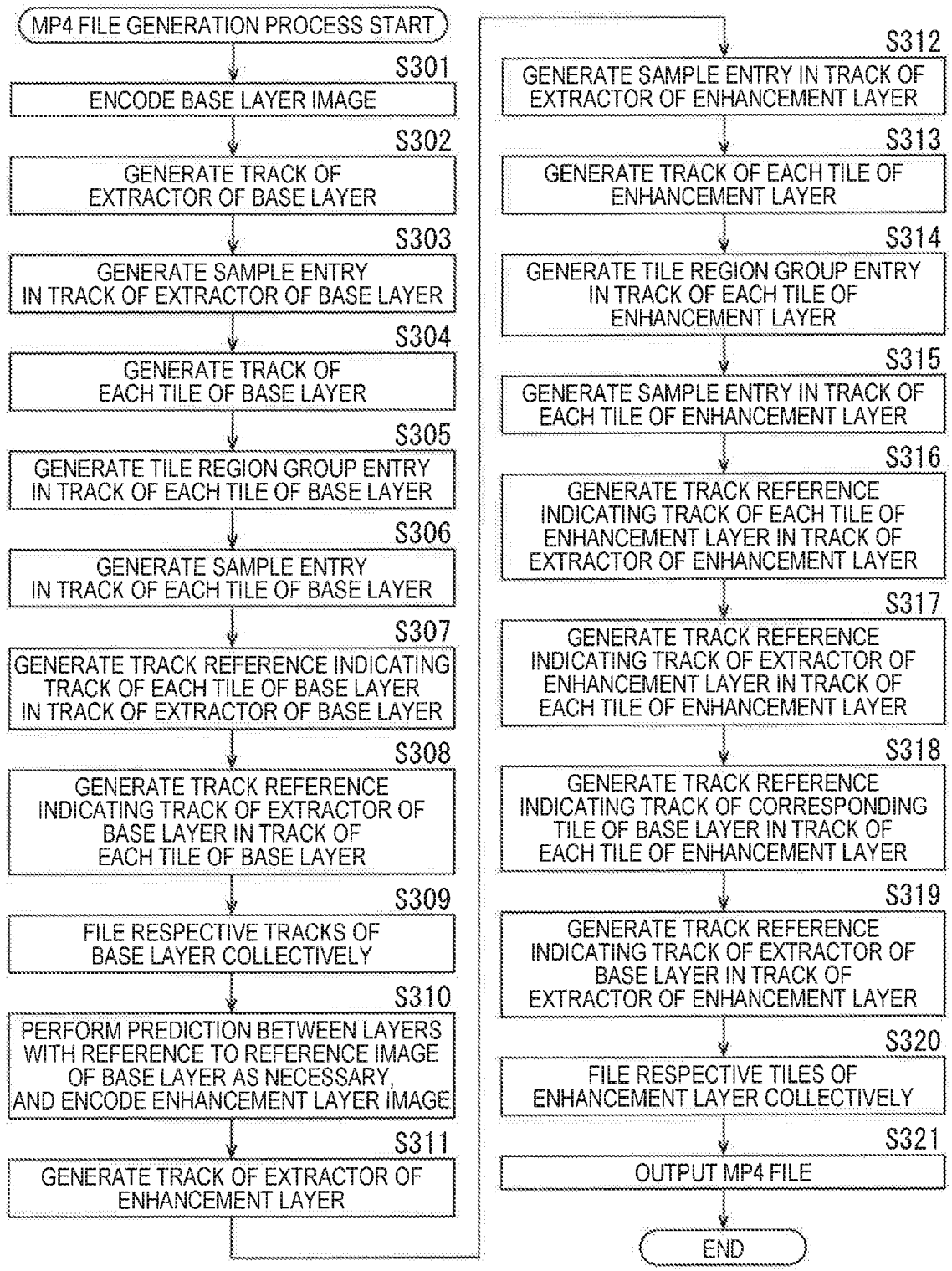
FIG. 34 is a flowchart showing a further example of the flow of the MP4 file generation process.

Processing from step S431 to step S448 is performed similarly to the processing from step S301 to step S308 and the processing from step S310 to step S319 in FIG. 34.

In step 2449, the MP4 file generation unit 103 collectively files respective tiles (respective tracks) of all layers (generates one MP4 file containing all tracks).

In step S450, the MP4 file generation unit 103 outputs the generated MP4 file.

The file generation device 100 generates 154 files having the configuration illustrated in FIGS. 40 and 41, and allows control of distribution for each tile in the enhancement layer as well as in the base layer by performing the MP4 file generation process described above. Accordingly, a partial image (such as tile) of an image in each layer of an image constituted by a plurality of layers is adaptively provided in image distribution.

<Configuration Example of MPD>

Figure 43:
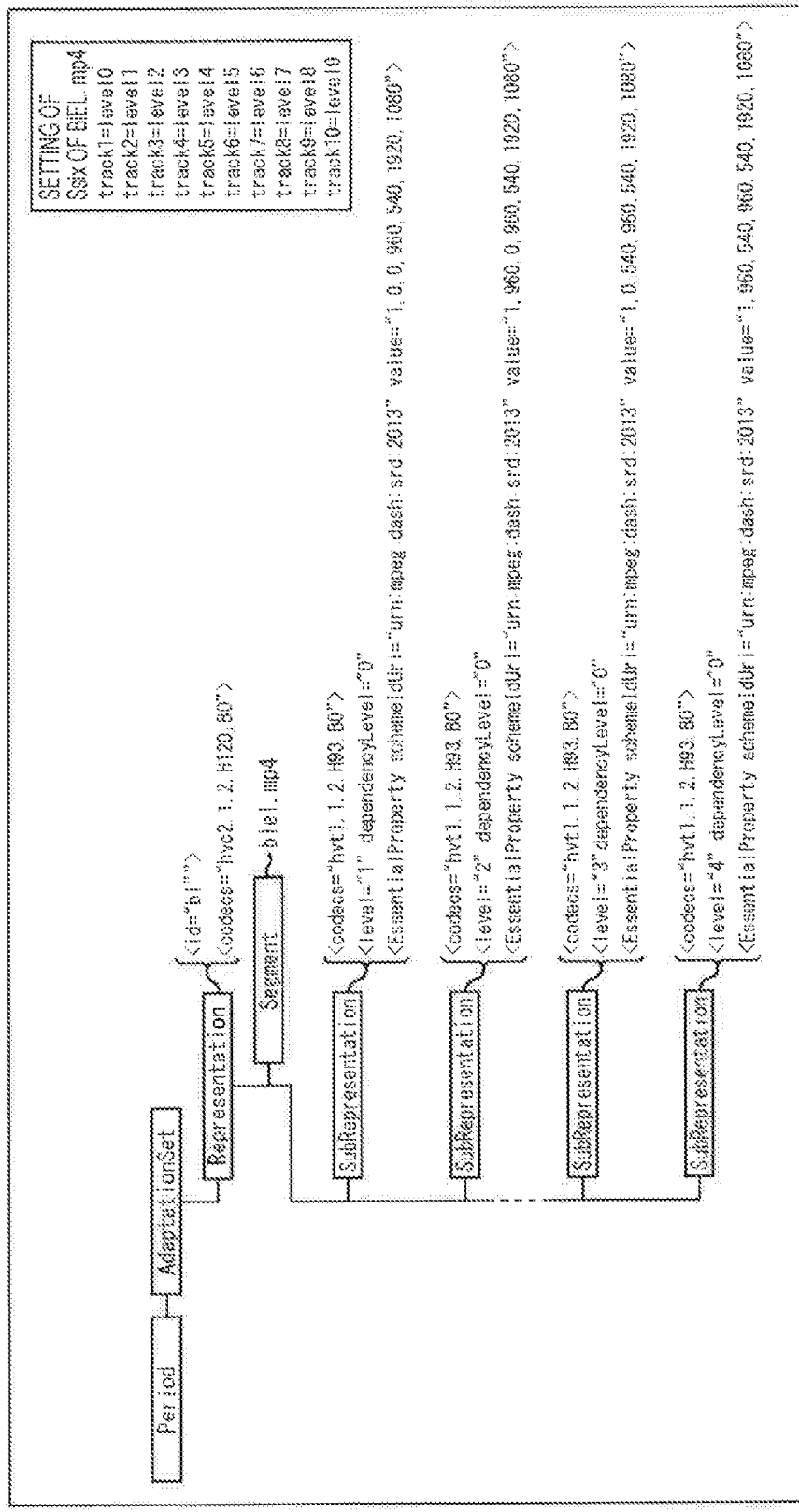
FIG. 43 is a view illustrating a still further example of MPD.
Figure 44:
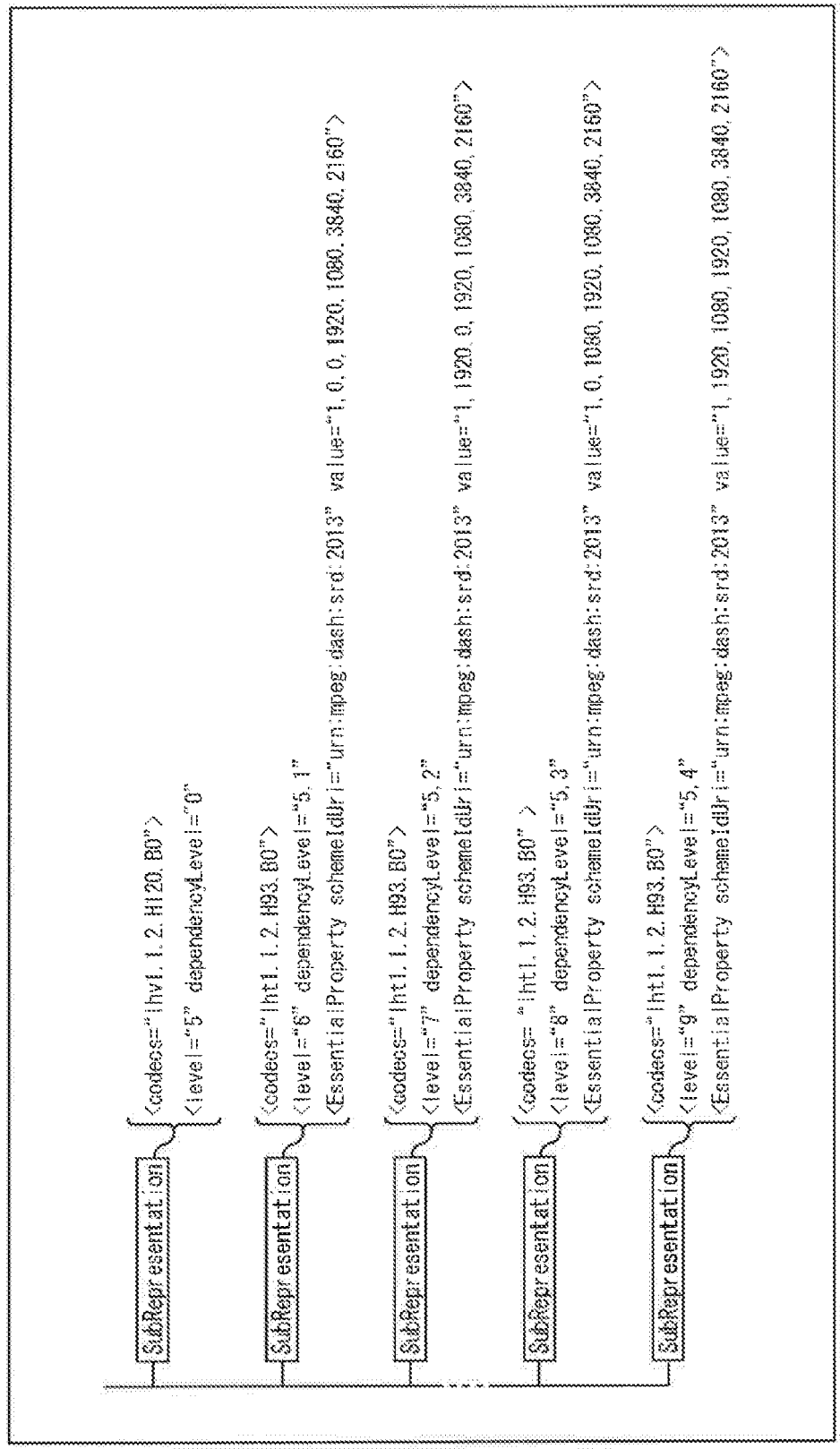
FIG. 44 is a view illustrating the still further example of MPD.

The MPD generation unit 104 of the file generation device 100 generates MPD having a configuration illustrated in FIGS. 43 and 44, for example, from an MP4 file generated the MP4 file generation unit 103 in the manner described above.

In this case, only one adaptation set is generated (adaptation set common to all layers is generated) as illustrated in FIGS. 43 and 44.

A representation containing information on all layers is generated in an order below the adaptation set. An MP4 file of all the layers (ble1.mp4) is set (registered) in a segment in an order below the representation. Information on each tile of each layer is set in a sub representation in an order lower than the representation.

<Flow of MPD Generation Process>

Figure 45:
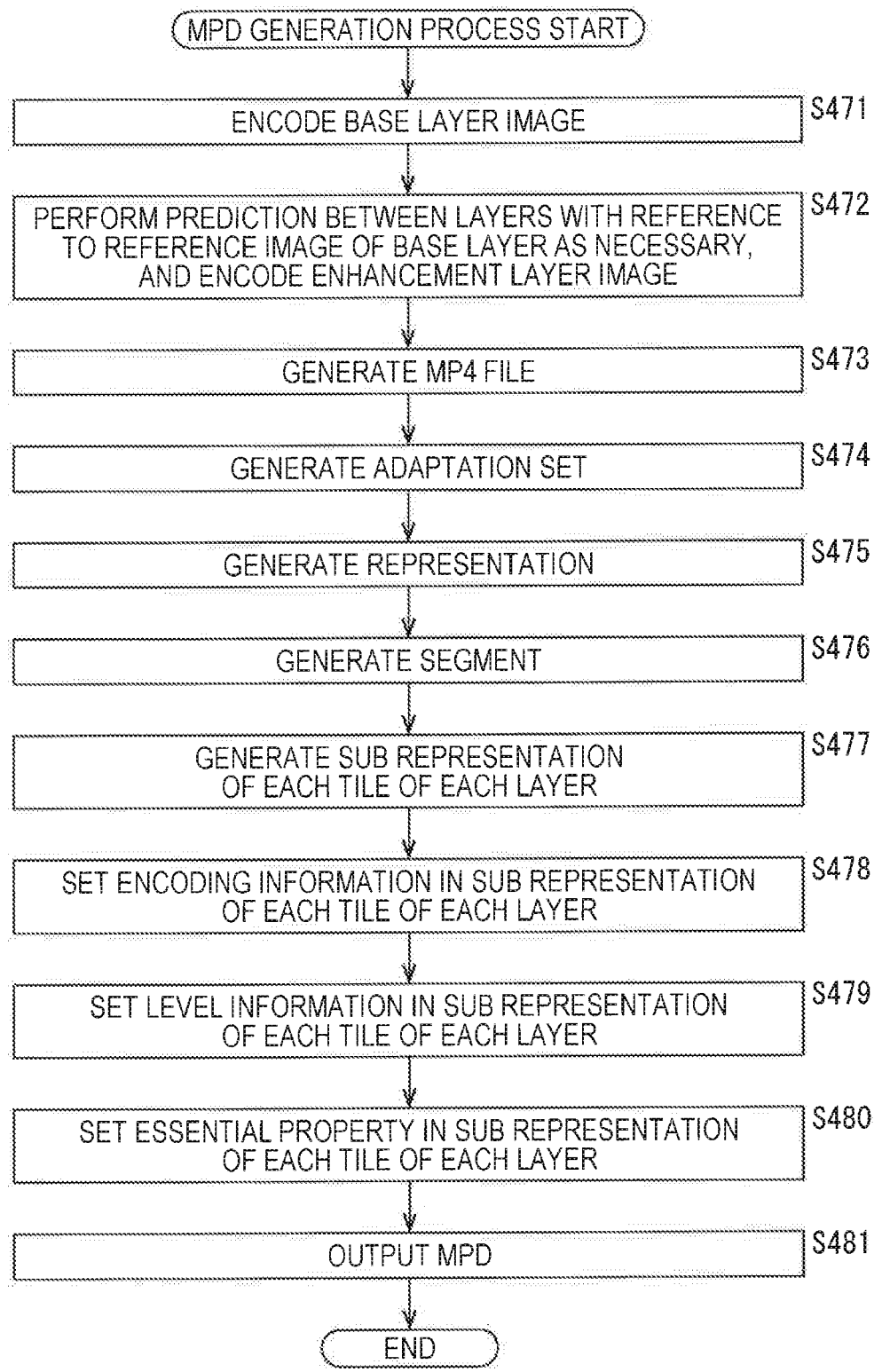
FIG. 45 is a flowchart showing a still further example of the flow of the MPD generation process.

An example of a flow of an MPD generation process in this configuration example is now described with reference to a flowchart shown in FIG. 45.

Processing from step S471 to step S473 is performed similarly to the processing from step S251 to step S253 in FIG. 30.

In step S474, the MPD generation unit 104 generates an adaptation set common to all the layers.

In step S475, the MPD generation unit 104 generates a representation common to all the layers.

In step S476, the MPD generation unfit 104 generates a segment common to all the layers.

In step S477, the MPD generation unit 104 generates a sub representation of each tile of each layer.

In step S478, the MPD generation unit 104 sets encoding information in the sub representation of each tile of each layer.

In step S479, the MPD generation unit 104 sets level information in the sub representation of each tile of each layer.

In step S480, the MPD generation unit 104 sets an essential property in the sub representation of each tile of each layer.

In step S481, the MPD generation unit 104 outputs MPD thus generated.

The file generation device 100 generates MPD having the configuration illustrated in FIGS. 43 and 44, and allows control of distribution for each tile in the enhancement layer as well as in the base layer by performing the MPD generation process described above, Accordingly, a partial image (such as tile) of an image in each layer of an image constituted by a plurality of layers is adaptively provided in image distribution.

<Flow of MP4 File Reproduction Process>

Figure 46:
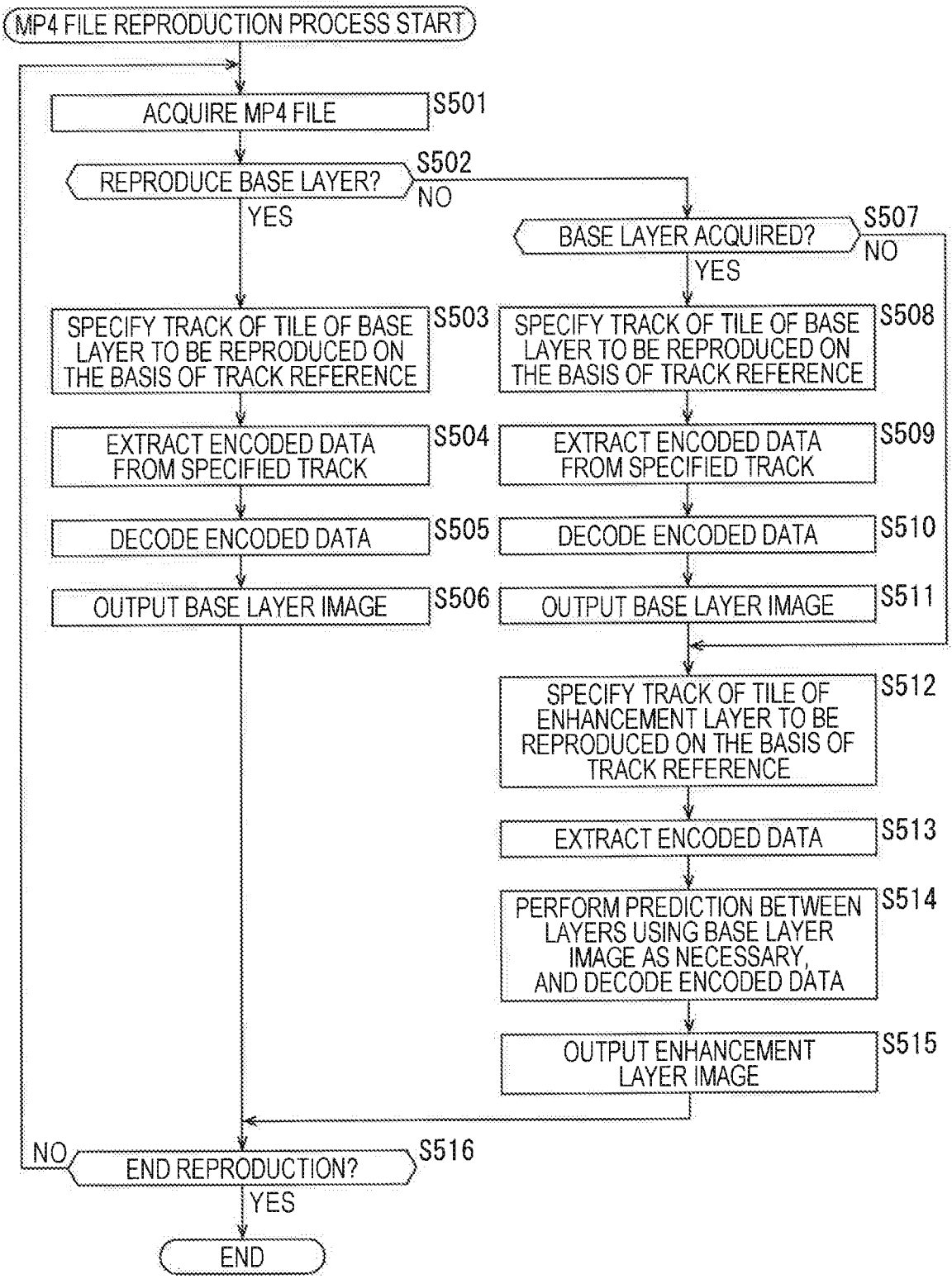
FIG. 46 is a flowchart showing a further example of the flow of the MP4 file reproduction process.

An example of a flow of an MP4 file reproduction process in the foregoing configuration example is now described with reference to a flowchart shown in FIG. 46.

With a start of the MP4 file reproduction process, the MP4 file reproduction unit 202 acquires an MP4 file in step S501.

In step S502, it is determined whether to reproduce a base layer. When it is determined that the base layer is to be reproduced, the process proceeds to step S503.

In step S503, the MP4 file reproduction unit 202 specifies a track of a tile of the base layer to be reproduced on the basis of a track reference of a track containing information indicating the whole of the base layer.

Figure 38:
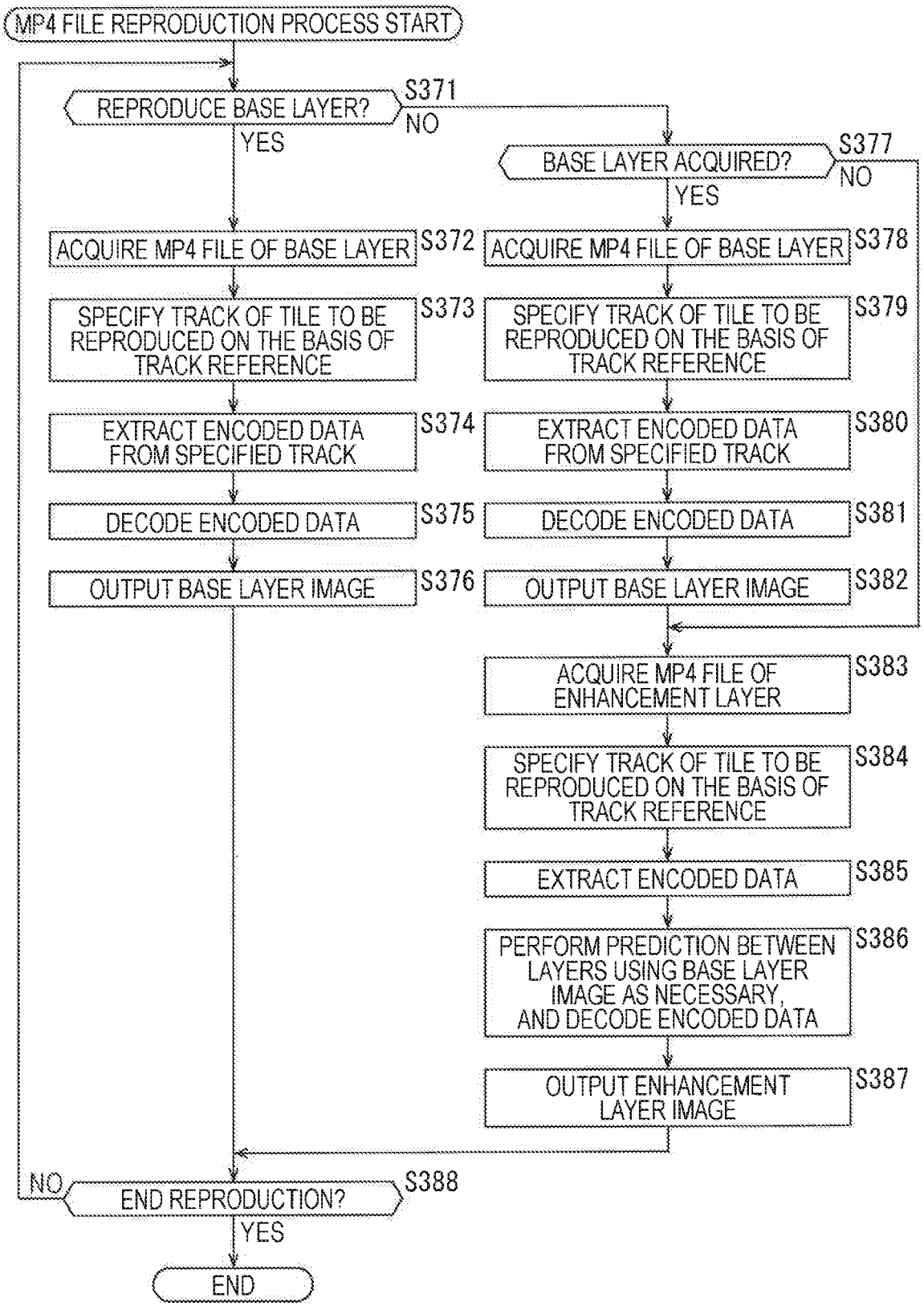
FIG. 38 is a flowchart showing a different example of the flow of the MP4 file reproduction process.

Processing from step S504 to step S506 is performed similarly to the processing from step S374 to step S376 in FIG. 38.

After completion of processing in step S506, the process proceeds to step S516.

On the other hand, when it is determined in step S502 that an enhancement layer is to be decoded, the process proceeds to step S507.

In step S507, the MP4 file reproduction unit 202 determines whether the base layer has been acquired. When it is determined that the base layer has not been acquired yet, the process proceeds to step S508.

Processing from step S508 to step S511 is performed similarly to the processing from step S503 to step S506. When a decoded image of the base layer (BL image) is output after completion of processing of these steps, the process proceeds to step S512. On the other hand, when it is determined in step S507 that an image of the base layer has been acquired, the process proceeds to step S512.

In step S512, the S134 file reproduction unit 202 acquires a track of a tile of the enhancement layer to be reproduced on the basis of a track reference of a track containing information indicating the whole of the enhancement layer.

Processing from step S513 to step S515 is performed similarly to the processing from step S385 to step S387 in FIG. 38. After completion of processing in step S515, the process proceeds to step S516.

In step S516, the MP4 file reproduction unit 202 determines whether to end reproduction. When it is determined that reproduction is not to end, the process returns to step S501 to repeat processing in step S501 and subsequent steps.

When it is determined in step S516 that reproduction is to end after completion of processing from step S501 to step S516 in an appropriate manner for each sample, the MP4 file reproduction process ends.

The file reproduction device 200 reproduces MP4 files having the configuration illustrated in FIGS. 40 and 41, and allows control of distribution for each tile in the enhancement layer as well as in the base layer by performing the MP4 file reproduction process described above. Accordingly, a partial image (such as tile) of an image in each layer of an image constituted by a plurality of layers is adaptively provided in image distribution.

<Flow of MPD Reproduction Process>

Figure 47:
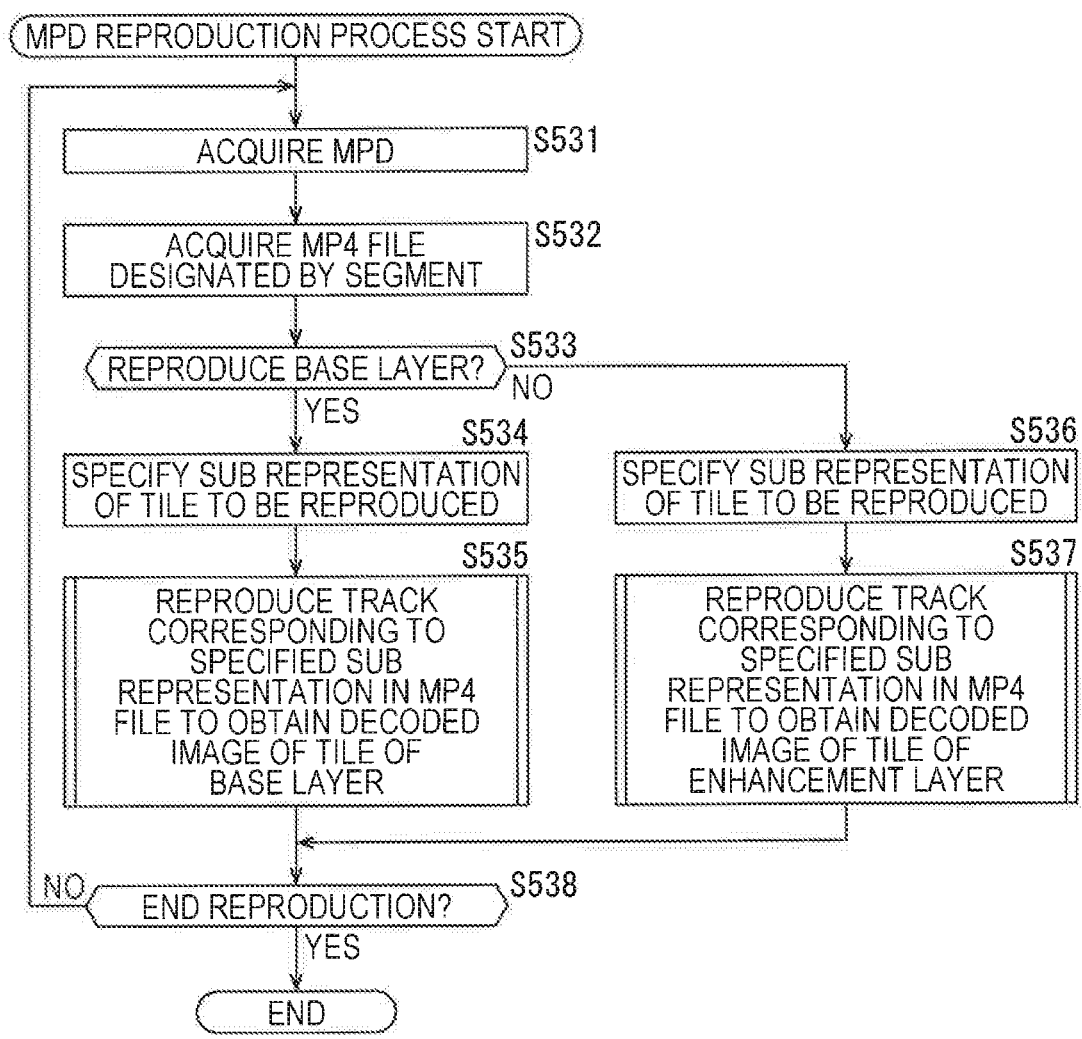
FIG. 47 is a flowchart showing a further example of the flow of the MPD reproduction process.

An example of a flow of an MPD reproduction process in the foregoing configuration example is now described with reference to a flowchart shown in FIG. 47.

With a start of an MPD reproduction process, the MPD analysis unit 201 acquires MPD in step S531.

In step S532, the MPD analysis unit 201 allows the MP4 file reproduction unit 202 to acquire an MP4 file designated by a segment belonging to an adaptation set common to all layers of the acquired MPD.

In step S533, the 1185 analysis unit 201 determines whether to reproduce a base layer. When is determined that the base layer is to be reproduced, the process proceeds to step S534.

In step S534, the MPD analysis unit 201 specifies a. sub representation of a tile to be reproduced.

In step S535, the MP4 file reproduction unit 202 and the base layer decoding unit 203 reproduce a track corresponding to the specified sub representation of the acquired MP4 file to obtain a decoded image of a tile of the base layer. According to this process, processing from step S503 to step S506 in FIG. 46 is performed. After completion of processing in step S535, the process proceeds to step S538.

When it is determined in step S533 that an enhancement layer is to be reproduced, the process proceeds to step S536.

In step S536, the MPD analysis unit 201 specifies a sub representation of a tile to be reproduced.

In step S537, the MP4 file reproduction unit 202 to the enhancement layer decoding unit 204 reproduce a track corresponding to the specified sub presentation of the acquired MP4 file to obtain a decoded image of a tile of the enhancement layer. According to this process, processing from step S507 to step S515 in FIG. 46 is performed. After completion of processing in step S537, the process proceeds to step S538.

In step S538, the MPD analysis unit 201 determines whether to end reproduction. When it is determined that reproduction is not to end, the process returns to step 5531 to repeat processing in step S531 and subsequent steps.

When it is determined in step S538 that reproduction is to end after completion of processing from step S531 to step S538 in an appropriate manner for each sample, the MPD reproduction process ends.

The file reproduction device 200 reproduces MPD having the configuration illustrated in FIGS. 43 and 44, and allows control of distribution for each tile in the enhancement layer as well as in the base layer by performing the MPD reproduction process described above. Accordingly, a partial image (such as tile) of an image in each layer of an image constituted by a plurality of layers is adaptively provided in image distribution.

<5. Fifth Embodiment>
<Distribution System>

The respective device described in the foregoing embodiments is applicable to a distribution system which distributes still images and moving images, for example. This application example is hereinafter described.

Figure 48:
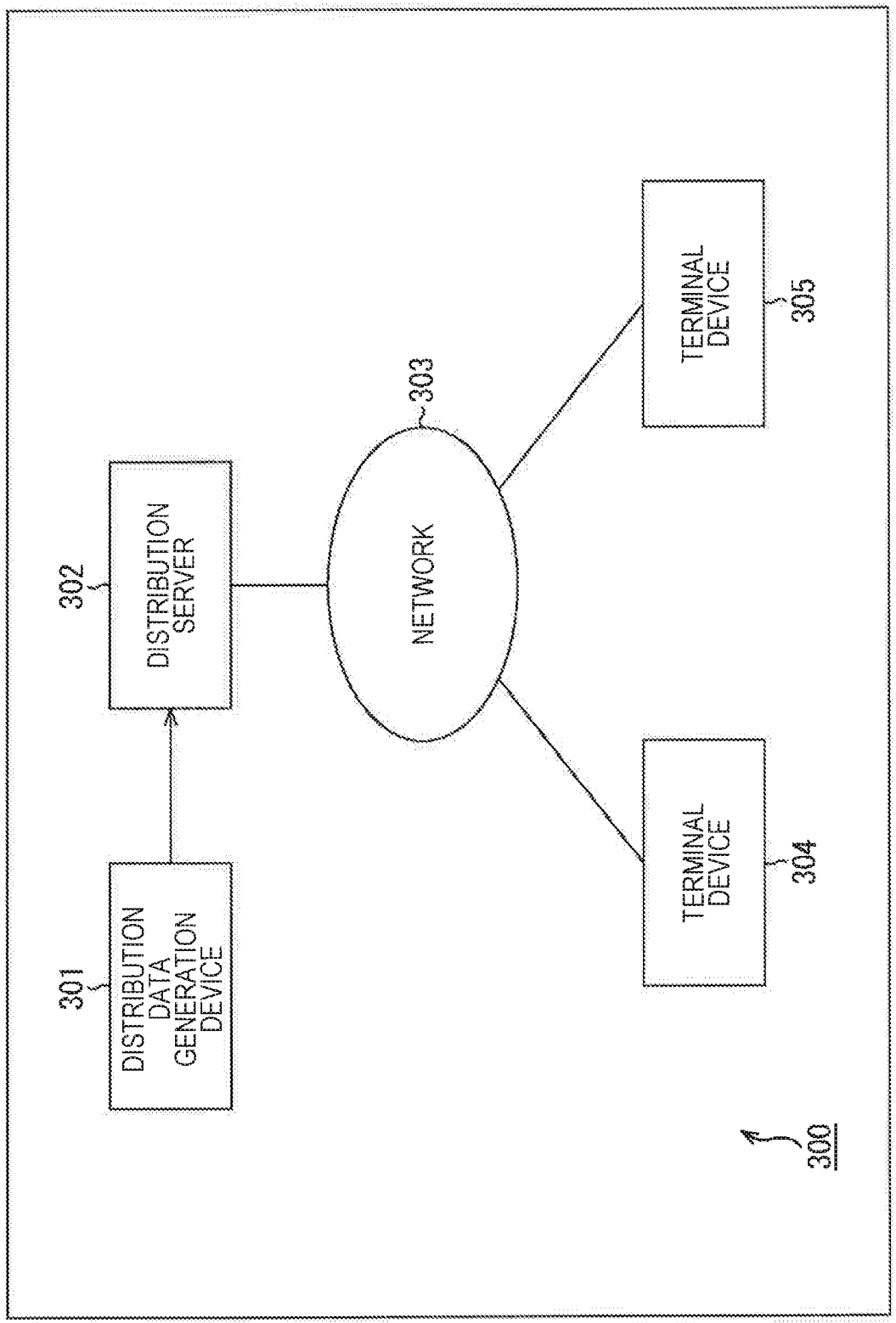
FIG. 48 is a block diagram illustrating a general configuration example of a distribution system.

FIG. 48 is a view illustrating a general configuration example of a distribution system to which the present technology has been applied. A distribution system 300 illustrated in FIG. 46 is a system which distributes still images and moving images. As illustrated in FIG. 48, the distribution system. 300 includes a distribution data generation device 301, a distribution server 302, a network 303, a terminal device 304, and a terminal device 305.

The distribution data generation device 301 generates distribution data in a distribution format on the basis of data on distributed still images and moving images. The distribution data generation device 301 supplies generated distribution data to the distribution server 302. The distribution server 302 stores distribution data generated by the distribution data generation device 301 in a storage unit or the like to manage the data, and provides distribution services of the distribution data to the terminal device 304 and the terminal device 305 via the network 303.

The network 303 is a communication network corresponding to a communication medium. The network 303 may be constituted by an arbitrary communication network, such as a wired communication network, a wireless communication network, and a combination of both. For example, the network 303 may be a wired local area network (LAN), a wireless LAN, a public telephone line network, a broadband communication network for wireless mobiles such as so-called 3G line and 4G line, the Internet, or a combination of these networks. Moreover, the network 303 may be constituted by a single communication network, or a plurality of communication networks. Furthermore, a part or the whole of the network 303 may be constituted by a communication cable in conformity to predetermined standards, such as a universal serial bus (USB) cable and a high-definition multimedia interface (HDMI, registered trademark) cable.

The distribution server 302, the terminal device 304, and the terminal device 303 are connected to the network 303 in a state communicative with each other. A method for connecting these devices to the network 303 may be arbitrarily determined. For example, these devices may be connected to the network 303 via wired communication or wireless communication. In addition, for example, these devices may be connected to the network 303 via arbitrary communication devices (communication facilities), such as access points, relay devices, and base stations.

Each of the terminal device 304 and the terminal device 305 is constituted by an arbitrary electronic device having a communication function, such as a cellular phone, a smartphone, a tablet-type computer, and a note-type computer. Each of the terminal device 304 and the terminal device 305 requests the distribution server 302 to distribute a distribution file on the basis of an instruction issued from a user or the like, for example.

The distribution server 302 transmits requested distribution data to a request source. The terminal device 304 or the terminal device 305 having requested distribution receives and reproduces the distribution data.

According to the distribution system 300 having this configuration, the present technology described in the respective embodiments is applied to the distribution data generation device 301. In other words, the file generation device 100 described above is applied to the distribution data generation device 301.

In addition, the present technology described in the respective embodiments is applied to the terminal device 304 and the terminal device 305. In other words, the file reproduction device 200 described above is applied to the terminal device 304 and the terminal device 305.

According to this configuration, the distribution data generation device 301, the terminal device 304, and the terminal device 305 offer effects similar to the effects of the foregoing respective embodiments. More specifically, the distribution system 300 is capable of adaptively providing a partial image of an image in each layer of an image constituted by a plurality of layers, and realizing switching of layers as described in the use case shown in the first embodiment, for example.

<6. Sixth Embodiment>
<Computer>

The foregoing series of processes may be executed either by hardware or by software. When the series of processes is executed by software, programs constituting the software are installed into a computer. The computer in this context includes a computer incorporated into dedicated hardware, and a computer capable of executing various types of functions under various types programs installed into the computer, such as a general-purpose personal computer.

Figure 49:
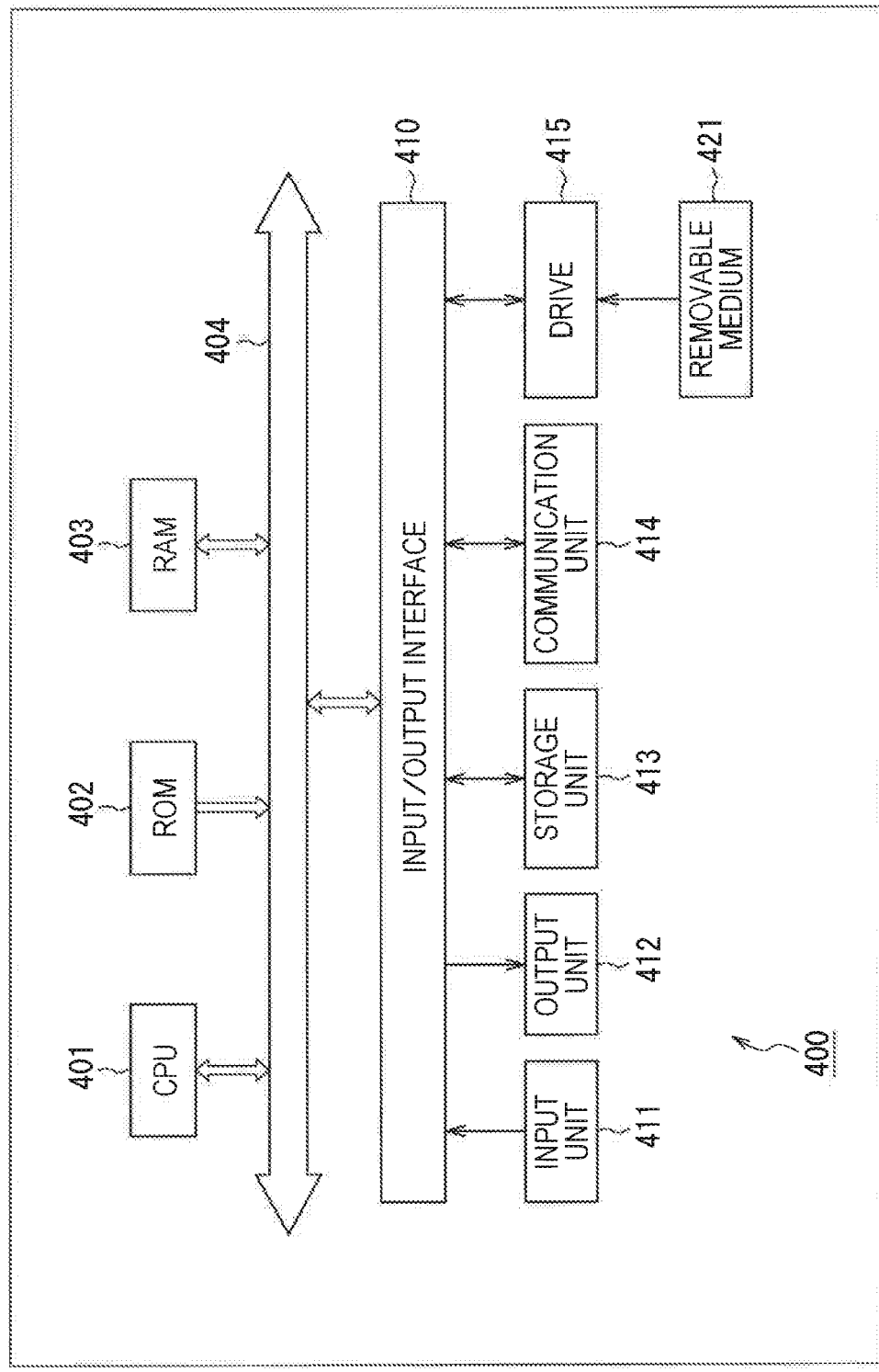
FIG. 49 is a block diagram illustrating a general configuration example of a computer.

FIG. 49 is a block diagram illustrating a configuration example of hardware of a computer which executes the series of processes described above under programs.

According to a computer 400 illustrated in FIG. 49, a central processing unit (CPU) 401, a read only memory (ROM) 402, and a random access memory (RAM) 403 are connected to each other via a bus 404.

An input/output interface 410 is further connected to the bus 404. An input unit 411, an output unit 412, a storage unit 413, a communication unit 414, and a drive 415 are connected to the input/output interface 410.

The input unit 411 is constituted by a keyboard, a mouse, a microphone, a touch panel, an input terminal or the like. The output unit 412 is constituted by a display, a speaker, an output terminal or the like. The storage unit 413 is constituted by a hard disk, a RAM disk, a non-volatile memory or the like. The communication unit 414 is constituted by a network interface or the like. The drive 415 drives a removable medium 421 such as a magnetic disk, an optical disk, a magneto-optical disk, and a semiconductor memory.

According to the computer having this configuration, the CPU 401 loads programs stored in the storage unit 413 into the RAM 403 via the input/output interface 410 and the bus 404, and executes the programs to perform the series of processes described above, for example. Data or the like necessary for execution of the respective processes by the CPU 401 is also appropriately stored in the RAM 403.

The programs executed by the computer (CPU 401) may be recorded in the removable medium 421 constituting a package medium, for example. In this case, the programs are installed into the storage unit 413 via the input/output interface 410 in a state of attachment of the removable medium 421 to the drive 415.

Alternatively, the programs may be provided via a wired or wireless transmission medium such as a local area network, the Internet, and digital satellite broadcasting. In this case, the programs may be received by the communication unit 414 and installed into the storage unit 413.

Instead, the programs may be pre-installed in the ROM 402 or the storage unit 413.

Note that the programs executed by the computer may be programs under which processes are executed in time series in the order described in the present specification, or executed in parallel or at necessary timing such as on occasions of rails.

The steps describing the programs recorded in a recording medium contain not only processes executed in time series in the order discussed herein, but also processes executed in parallel or individually, rather than executed in time series.

Processes performed by the respective steps may be executed by the foregoing respective devices, or arbitrary devices other than the foregoing devices. In this case, the devices executing the processes have functions (function blocks or the like) necessary for executing the processes described above. In addition, information necessary for the processes is appropriately transmitted to the devices.

According to the present specification, the system refers to a collection of multiple constituent elements (such as devices and modules (parts)), and includes both cases where all the constituent elements are contained in the same housing, and where some of the constituent elements are not contained in the same housing. Accordingly, multiple devices accommodated in separate housings and connected via a network, and one device including multiple modules accommodated within one housing are both regarded as systems.

According to the foregoing description, a configuration discussed as one device (or processing unit) may be divided into multiple devices (or processing units). On the contrary, the configuration discussed as multiple devices (or processing units) may be combined into one device (or processing unit). Needless to say, configurations not discussed herein may be added to the configurations of the respective devices (or respective processing units). In addition, when the configuration and operation of the whole system are substantially identical, a part of a configuration of a certain device (or processing unit) may be incorporated into a configuration of another device (or another processing unit).

While the preferred embodiments according to the present disclosure have been described in detail with reference to the accompanying drawings, the technical scope of the present disclosure is not limited to these examples. It is obvious that various examples of changes and modifications may be presented by those having ordinary knowledge in the technical field of the present disclosure in the light of the present technology within the scope of the technical spirit described in the claims. It is therefore understood that these changes and modifications are also contained in the technical range of the present disclosure as a matter of course.

For example, the present technology is applicable to a system of cloud computing where one function is shared by multiple devices and processed in cooperation with one another via a network.

Moreover, the respective steps discussed with reference to the foregoing flowcharts may be shared and executed by multiple devices rather than executed by one device.

Furthermore, when multiple processes are contained in one step, the multiple processes contained in the one step may be shared and executed by multiple devices rather than executed by one device.

Alternatively, the present technology may be practiced in the form of arbitrary configurations mounted on the foregoing device or devices constituting the foregoing system, such as a processor as a system large scale integration (LSI), a module including a plurality of processors, a unit including a plurality of modules, and a set including functions in addition to functions of a unit (i.e., configuration of a part of a device).

The present technology may have the following configurations.

(1) An information processing device comprising a file generation unit that generates a file that stores information on a whole of a base layer of encoded data produced by layer encoding of image data, information on each of partial areas of an image of the base layer, information on a whole of an enhancement layer of the encoded data, and information on each of partial areas of an image of the enhancement layer such that each of the information is stored in corresponding one of tracks different from each other.

(2) The information processing device according to (1), wherein the file generation unit stores, in the track storing the information on the whole of the base layer, encoding information indicating an encoding system of the base layer, the file generation unit stores, in each of the tracks storing the information on the partial areas of the base layer, encoding information indicating that the corresponding track stores only the information on the corresponding partial area of the base layer, the file generation unit stores, in the track storing the information on the whole of the enhancement layer, encoding information indicating an encoding system of the enhancement layer, and the file generation unit stores, in each of the tracks storing the information on the partial areas of the enhancement layer, encoding information indicating that the corresponding track stores only the information on the corresponding partial area of the enhancement layer.

(3) The information processing device according to (1) or (2), wherein the file generation unit stores, in the track storing the information on the whole of the base layer, information indicating reference to the tracks storing the information on the partial areas of the base layer, and information indicating a type of the reference, the file generation unit stores, in each of the tracks storing the information on the partial areas of the base layer, information indicating reference to the track storing the information on the whole of the base layer, and information indicating a type of the reference, the file generation unit stores, in the track storing the information on the whole of the enhancement layer, information indicating reference to the track storing the information on the whole of the base layer and information indicating a type of the reference, and information indicating reference to the tracks storing the information on the partial areas of the enhancement layer and information indicating a type of the reference, and the file generation unit stores, in each of the tracks storing information on the partial areas of the enhancement layer, information indicating reference to the track storing the information on the whole of the enhancement layer, and information indicating a type of the reference.

(4) The information processing device according to (3), wherein the file generation unit further stores, in each of the tracks storing the information on the partial areas of the enhancement layer, information indicating reference to the track storing the information on the partial area of the base layer in correspondence with the corresponding partial area of the enhancement layer, (5) The information processing device according any one of (1) through (4), wherein the file generation unit stores, in each of the tracks storing the information on the whole of the layers, a sample of reference information for the encoded data on the partial areas of the corresponding layer, and the file generation unit stores, in each of the tracks storing the information on the partial areas of the layers, a sample of the encoded data on the corresponding partial area.

(6) The information processing device according to any one of (1) through (5), wherein the file generation unit stores, in each of the tracks storing the information on the partial areas of the layers, position information indicating a position of the corresponding partial area.

(7) The information processing device according to any one of (1) through (6), wherein the file generation unit generates the file for each of the tracks.

(8) The information processing device according to any one of (1) through (7) wherein the file generation unit generates the file for each of the layers.

(9) The information processing device according to any one of (1) through (8), wherein the file generation unit generates a file storing all of the tracks.

(10) An information processing method generating a file that stores information on a whole of a base layer of encoded data produced by layer encoding of image data, information on each of partial areas of an image of the base layer, information on a whole of an enhancement layer of the encoded data, and information on each of partial areas of an image of the enhancement layer such that each of the information is stored in corresponding one of tracks different from each other.

(11) An information processing device comprising a metadata generation unit that generates metadata that contains information on a whole of a base layer of encoded data produced by layer encoding of image data, information on each of partial areas of an image of the base layer, information on a whole of an enhancement layer of the encoded data, and information on each of partial areas of an image of the enhancement layer.

(12) The information processing device according to (11), wherein the information storing information on the whole of the base layer contains encoding information indicating an encoding system of the base layer, the information on each of the partial areas of the base layer contains encoding information indicating that only the information on the corresponding partial area of the base layer is contained, the information on the whole of the enhancement layer contains encoding information indicating an encoding system of the enhancement layer, and the information on each of the partial areas of the enhancement layer contains encoding information indicating that only the information on the corresponding partial area of the enhancement layer is contained.

(13) The information processing device according to (11) or (12), wherein the information on the whole of the base layer contains information indicating reference to the information on the partial areas of the base layer, and information indicating a type of the reference, the information on each of the partial areas of the base layer contains information indicating reference to the information on the whole of the base layer, and information indicating a type of the reference, the information on the whole of the enhancement layer contains information indicating reference to the information on the whole of the base layer and information indicating a type of the reference, and information indicating reference to the information on the partial areas of the enhancement layer and information indicating a type of the reference, and the information on each of the partial areas of the enhancement layers contains information indicating reference to the information on the whole of the enhancement layer, and information indicating a type of the reference.

(14) The information processing device according to (13), wherein the information on each of the partial areas of the enhancement area further contains information indicating reference to the information on the partial area of the base layer in correspondence with the corresponding partial area of the enhancement layer, and information indicating a type of the reference.

(15) The information processing device according to any one of (11) through (14), wherein each of the information on the partial areas of the base layer, and the information on the partial areas of the enhancement layer contains position information indicating a position of the corresponding partial area.

(16) The information processing device according any one of (11) through (15), wherein the metadata generation unit sets, the information on the whole of the base layer, a file that stores a sample of reference information for the encoded data of the partial areas of the base layer, the metadata generation unit sets, in the information on the partial areas of the base layer, a file that stores a sample of the encoded data of the corresponding partial area of the base layer, the metadata generation unit sets, in the information on the whole of the enhancement layer, a file that stores a sample of reference information for the encoded data of the partial areas of the enhancement layer, and the metadata generation unit sets, in the information on the partial areas of the enhancement layer, a file that stores a sample of the encoded data of the corresponding partial area of the enhancement layer.

(17) The information processing device according to any one of (11) through (16), wherein the metadata generation unit sets a file that stores the encoded data of the base layer in an order higher than the information on the whole of the base layer and the information on the partial areas of the base layer, and the metadata generation unit sets a file that stores the encoded data of the enhancement layer in an order higher than the information on the whole of the enhancement layer and the information on the partial areas of the enhancement layer.

(18) The information processing device according any one of (11) through (17), wherein the metadata generation unit sets a file that stores the encoded data of all of the layers in an order higher than the information on the whole of the base layer, the information on the partial areas of the base layer, the information on the whole of the enhancement layer, and the information on the partial areas of the enhancement layer.

(19) The information processing device according to any one of (11) through (18), wherein the metadata generation unit sets the information oil the whole of the base layer, the information on each of the partial areas of an image of the base layer, the information on the whole of the enhancement layer, and the information each of the partial areas of an image of the enhancement layer such that each of the information is set in corresponding one of adaptation sets different from each other, or in corresponding one of sub representations different from each other.

(20) An information processing method generating metadata that contains information on a whole of a base layer of encoded data produced by layer encoding of image data, information on each of partial areas of an image of the base layer, information on a whole of an enhancement layer of the encoded data, and information on each of partial areas of an image of the enhancement layer.

REFERENCE SIGNS LIST

100 File generation device
101 Base layer encoding unit
102 Enhancement layer encoding unit
103 MP4 file generation unit
104 MPD generation unit
200 File reproduction device
201 MPD analysis unit
202 MP4 file reproduction unit
203 Base layer decoding unit
204 Enhancement layer decoding unit
300 Distribution system
301 Distribution data generation device
302 Distribution server
303 Network
304 and 305 Terminal device
400 Computer

The invention claimed is:

1. A file reproduction device comprising:
circuitry configured to
receive a file that includes a plurality of tracks that are different from each other, the plurality of tracks including
a track storing information on a whole of an enhancement layer of encoded data produced by layer encoding of image data, and
a plurality of respective tracks that each store information on a different respective partial area of an image of the enhancement layer, and
reproduce a distributed content based on the received file.

2. The file reproduction device according to claim 1, wherein the plurality of tracks further includes a track storing information on a whole of a base layer of the encoded data.

3. The file reproduction device according to claim 2, wherein the plurality of tracks further includes a plurality of respective tracks that each store information on a different respective partial area of an image of the base layer of the encoded data.

4. The file reproduction device according to claim 3, wherein the track storing the information on the whole of the base layer further stores encoding information indicating an encoding system of the base layer, the plurality of respective tracks, which each store the information on the different respective partial area of the base layer, each further stores a respective encoding information indicating that the respective track stores only the information on the respective partial area of the base layer, the track storing the information on the whole of the enhancement layer further stores encoding information indicating an encoding system of the enhancement layer, and the plurality of respective tracks, which each store the information on the different respective partial area of the enhancement layer, each further stores a respective encoding information indicating that the respective track stores only the information on the respective partial area of the enhancement layer.

5. The file reproduction device according to claim 3, wherein the track storing the information on the whole of the base layer further stores information indicating reference to the tracks storing the information on the partial areas of the base layer, and information indicating a type of the reference, the plurality of respective tracks, which each store the information on the different respective partial area of the base layer, each further stores a respective information indicating reference to the track storing the information on the whole of the base layer, and information indicating a type of the reference, the track storing the information on the whole of the enhancement layer further stores information indicating reference to the track storing the information on the whole of the base layer and information indicating a type of the reference, and information indicating reference to the tracks storing the information on the partial areas of the enhancement layer and information indicating a type of the reference, and the plurality of respective tracks, which each store the information on the different respective partial area of the enhancement layer, each further stores a respective information indicating reference to the track storing the information on the whole of the enhancement layer, and information indicating a type of the reference.

6. The file reproduction device according to claim 5, wherein the plurality of respective tracks, which each store the information on the different respective partial area of the enhancement layer, each further stores a respective information indicating reference to the track storing the information on the partial area of the base layer in correspondence with the corresponding partial area of the enhancement layer.

7. The file reproduction device according to claim 3, wherein the track that stores the information on the whole of the enhancement layer and the track that stores the information on the whole of the base layer both further store a sample of reference information for the encoded data on the partial areas of the corresponding layer, and the plurality of respective tracks, which each store the information on the different respective partial area of the enhancement layer and the base layer, each further stores a respective sample of the encoded data on the corresponding partial area.

8. The file reproduction device according to claim 3, wherein the plurality of respective tracks, which each store the information on the different respective partial area of the enhancement layer and the base layer, each further stores respective position information indicating a position of the corresponding partial area.

9. The file reproduction device according to claim 1, wherein the received file includes all of the tracks stored thereon.

10. The file reproduction device according to claim 1, wherein the track storing the information on the whole of the enhancement layer further stores encoding information indicating an encoding system of the enhancement layer, and the plurality of respective tracks, which each store the information on the different respective partial area of the enhancement layer, each further stores a respective encoding information indicating that the respective track stores only the information on the respective partial area of the enhancement layer.

11. A file reproduction method comprising:

receiving a file that includes a plurality of tracks that are different from each other, the plurality of tracks including a track storing information on a whole of an enhancement layer of encoded data produced by layer encoding of image data, and a plurality of respective tracks that each store information on a different respective partial area of an image of the enhancement layer; and reproducing a distributed content based on the received file.

12. The file reproduction method according to claim 11, wherein the track storing the information on the whole of the enhancement layer further stores encoding information indicating an encoding system of the enhancement layer, and the plurality of respective tracks, which each store the information on the different respective partial area of the enhancement layer, each further stores a respective encoding information indicating that the respective track stores only the information on the respective partial area of the enhancement layer.

* * * * *